United States Patent
Sasaki

(10) Patent No.: US 8,200,089 B2
(45) Date of Patent: Jun. 12, 2012

(54) OPTICAL PULSE TIME SPREADING APPARATUS AND OPTICAL MULTIPLEX TRANSMITTING SYSTEM WITH MULTIPLEXED CHANNELS AND S/N RATIO INCREASED

(75) Inventor: Kensuke Sasaki, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 448 days.

(21) Appl. No.: 12/585,750

(22) Filed: Sep. 24, 2009

(65) Prior Publication Data

US 2010/0074617 A1 Mar. 25, 2010

(30) Foreign Application Priority Data

Sep. 25, 2008 (JP) ................................ 2008-245380

(51) Int. Cl.
H04J 4/00 (2006.01)
H04J 14/00 (2006.01)
(52) U.S. Cl. ........................................................ 398/77
(58) Field of Classification Search .................... 398/77, 398/188–189
See application file for complete search history.

(56) References Cited

U.S. PATENT DOCUMENTS 7,983,561 B2 * 7/2011 Sasaki .............................. 398/77

OTHER PUBLICATIONS

Hideyuki Sotobayashi, "Optical Code Division multiplexing network", Oyo Buturi publication of the Japan Society of Applied Physics, vol. 71, No. 7, 2002, pp. 853-859.

Akihiko Nishiki, et al., "Development of Encoder/Decoder for OCDM using an SSFBG", Technical Report of IEICE (The Institute of Electronics, Information and Communication Engineers), OFT2002-66, (Nov. 2002).

Naoya Wada, et al., "A 10 Gb/s Optical Code Division Multiplexing Using 8-chip OPtical Bipolar Code and Coherent Detection", Journal of Lightwave Technology, vol. 17, No. 10, Oct. 1999.

P.C. Teh, et al., "Demonstration of a Four-channel WDM/OCDMA System Using 255-chip 320-Gchip/s Quartemary Phase Coding Gratings", IEEE (Institute of Electrical and Electronics Engineers) Photonics Technology Letters, vol. 14, No. 2, Feb. 2002.

Gabriella Cincotti, "Full Optical Encoders/Decoders for Photonic IP Routers", Journal of Lightwave Technology, vol. 22, No. 2, pp. 337-342, Feb. 2004.

Jing Cao, et al., "Spectral Encoding and Decoding of Monolithic InP OCDMA Encoder", Paper We. 3.6.6, vol. 3, ECOC 2005.

Wei Cong, et al., "An Error-Free 100 Gb/s Time-Slotted SPECTS O-CDMA Network Testbed", Paper Th. 1.4.6, vol. 3, ECOC 2005.

* cited by examiner

Primary Examiner — Shi K Li
(74) Attorney, Agent, or Firm — Rabin & Berdo, P.C.

(57) ABSTRACT

Super-structured fiber Bragg gratings (SSFBGs) of s optical pulse time spreaders are provided with N unit FBGs disposed starting from an input/output end in the order of first to N-th unit FBGs, where s is a parameter less than or equal to a parameter N, a natural number. The unit FBGs are configured such that the reflectivities of the unit FBGs placed from one end to the center of the SSFBG formed in an optical fiber are monotonically increased, while the reflectivities of the unit FBGs placed from the center to the other end of the SSFBG are monotonically decreased. The chip pulses in a pulse train are given relative phases such that the relative phase of the first chip pulse is equal to zero, the relative phase of the second chip pulse is equal to a phase difference $d_1 = 2\pi\{a+(n-1)/N\}, \ldots$, and the relative phase of the N-th chip pulse is equal to $(N-1)d_1$. The parameter a is any real number satisfying the condition of $0 \leq a < 1$.

10 Claims, 29 Drawing Sheets

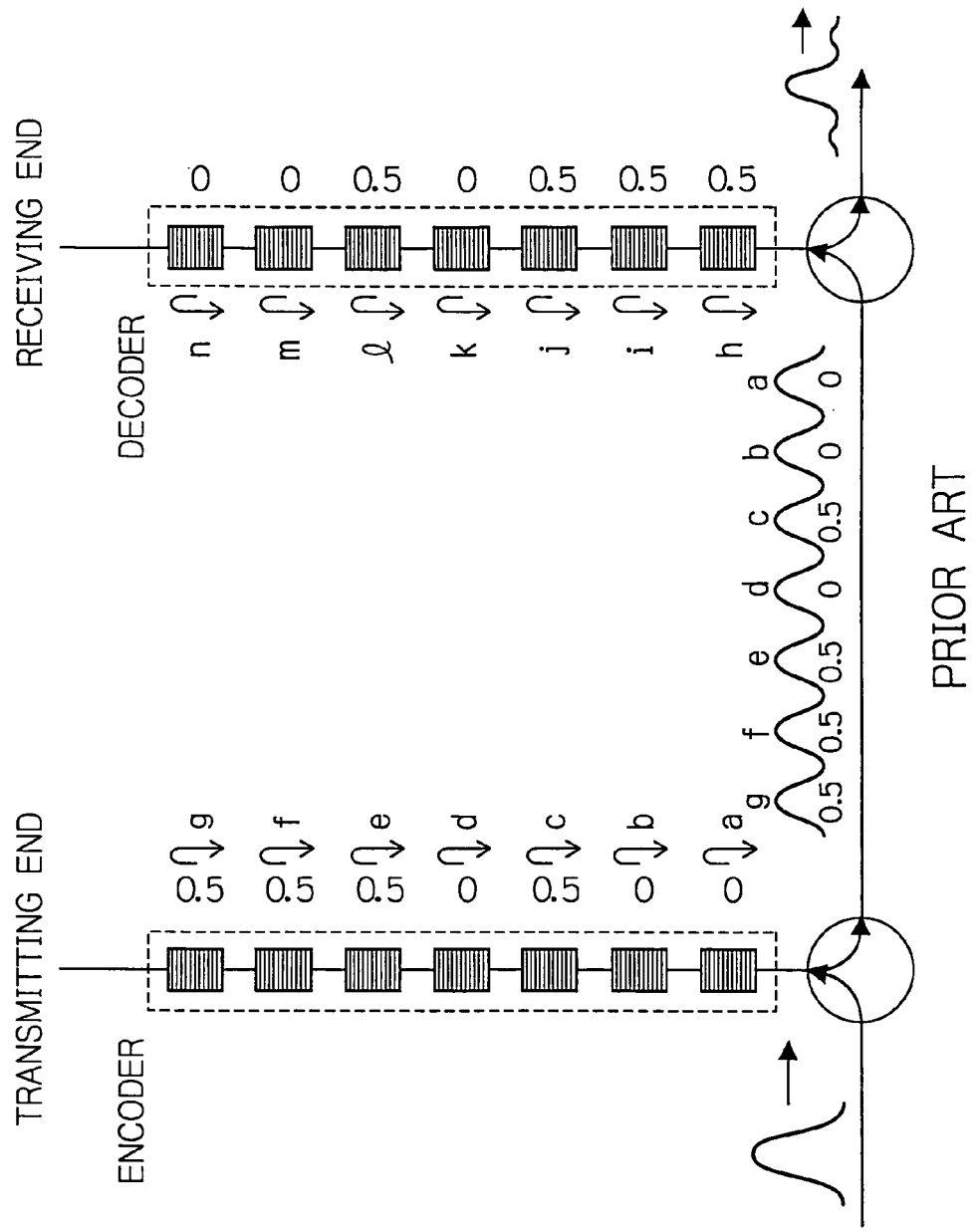

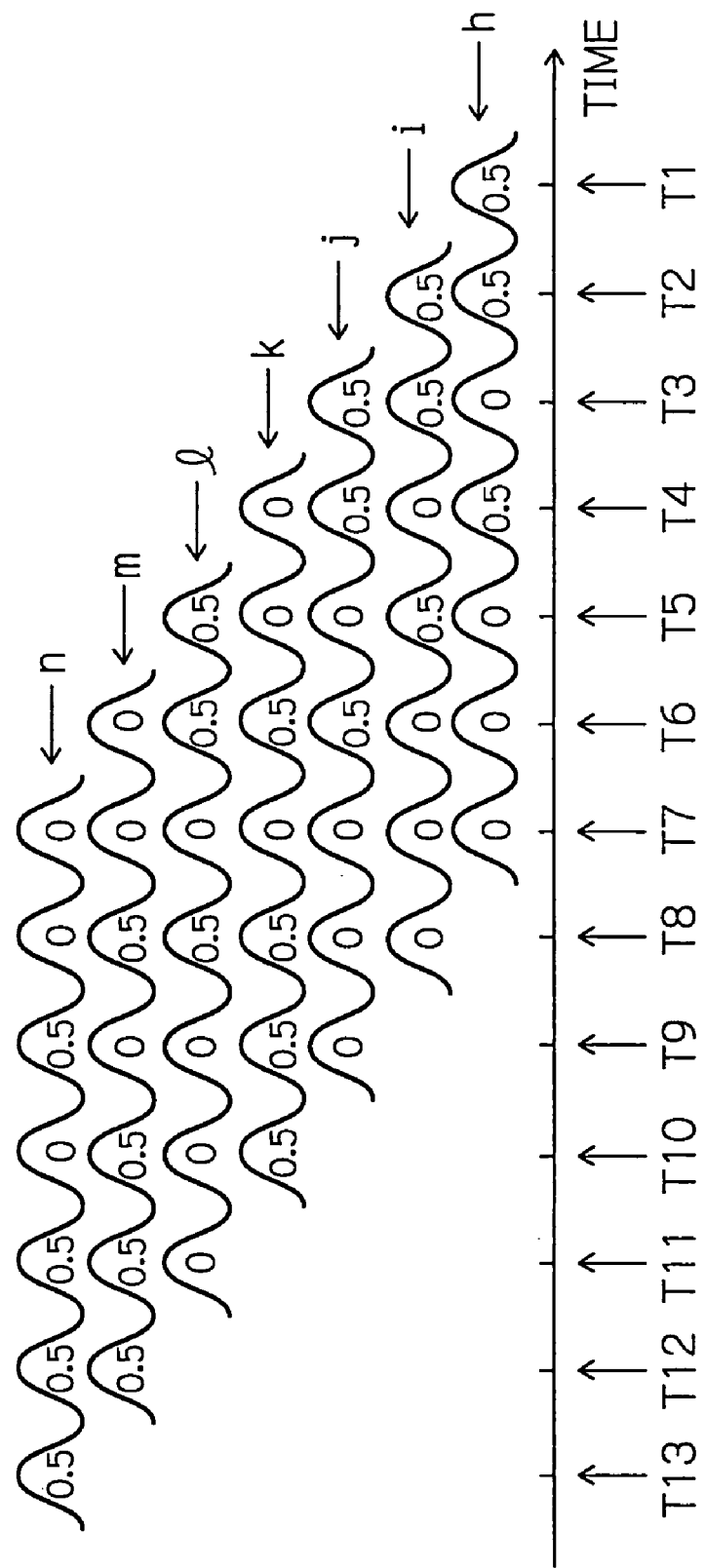

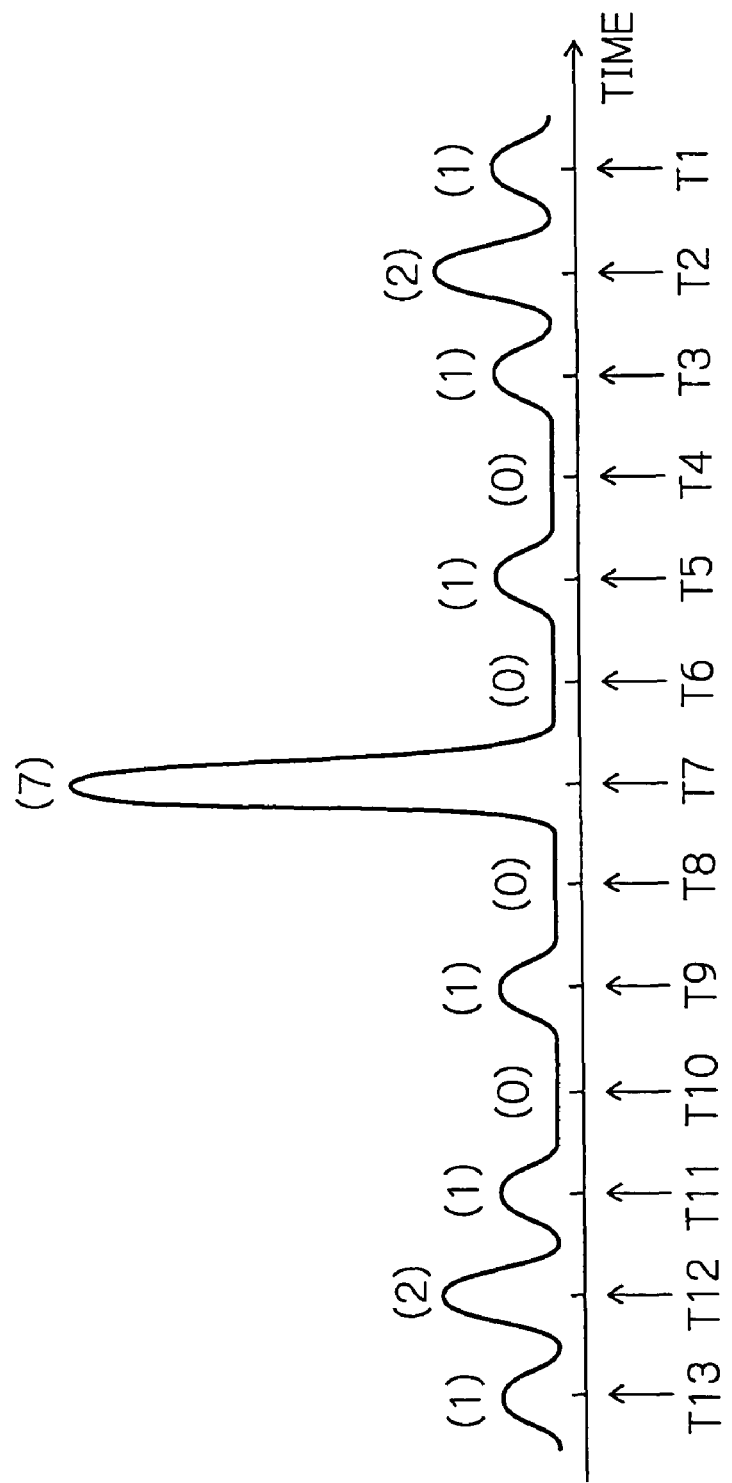

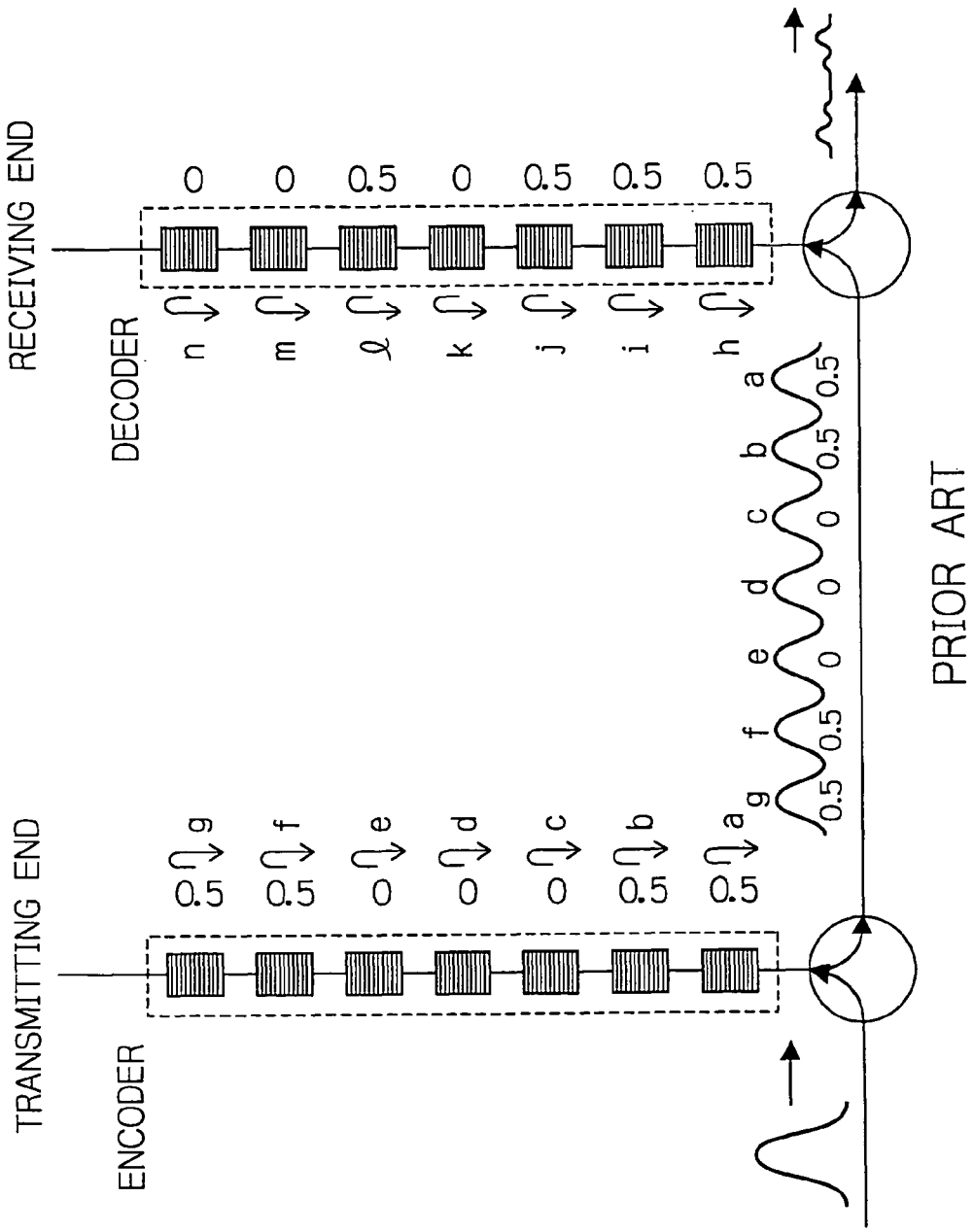

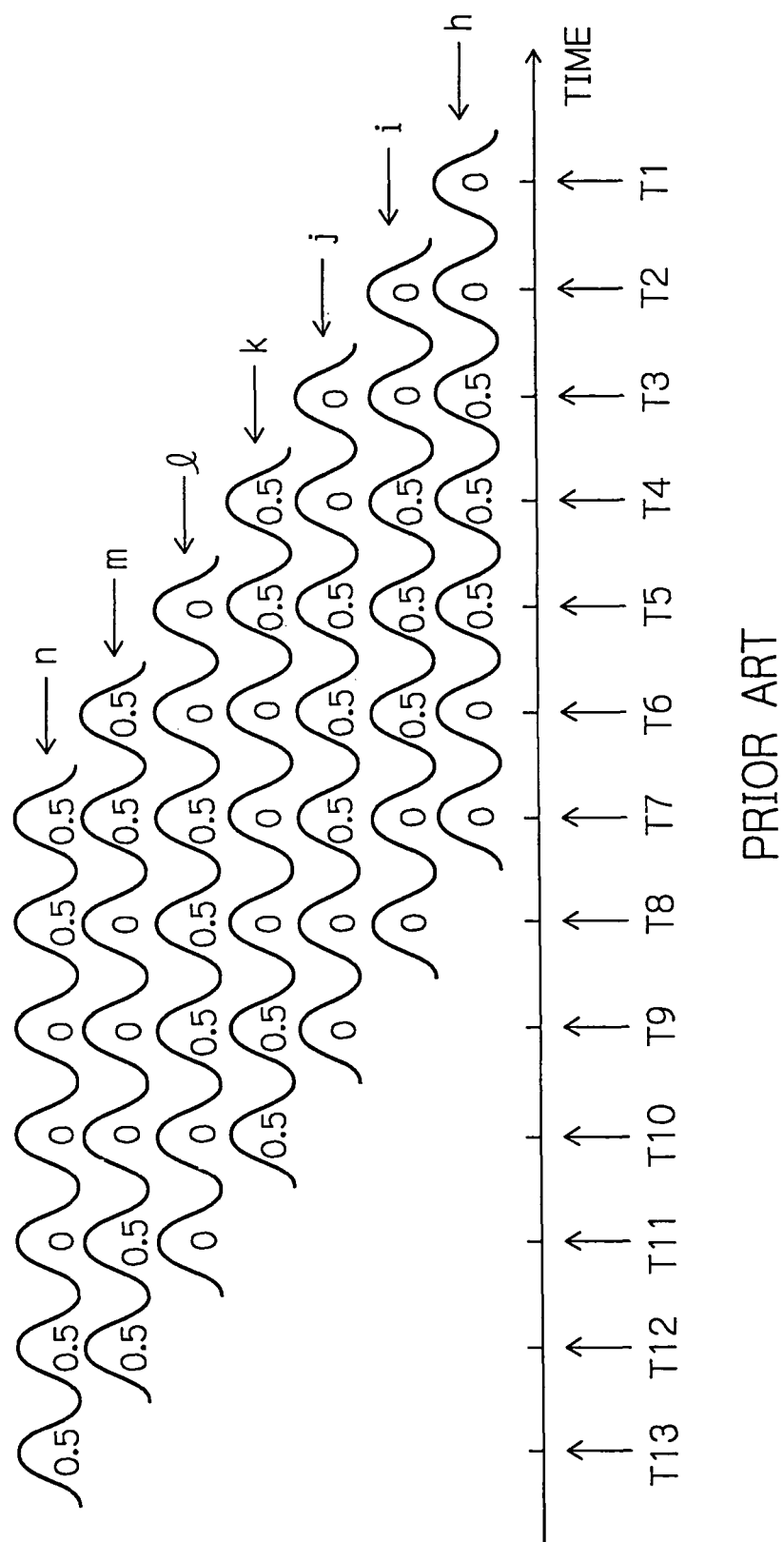

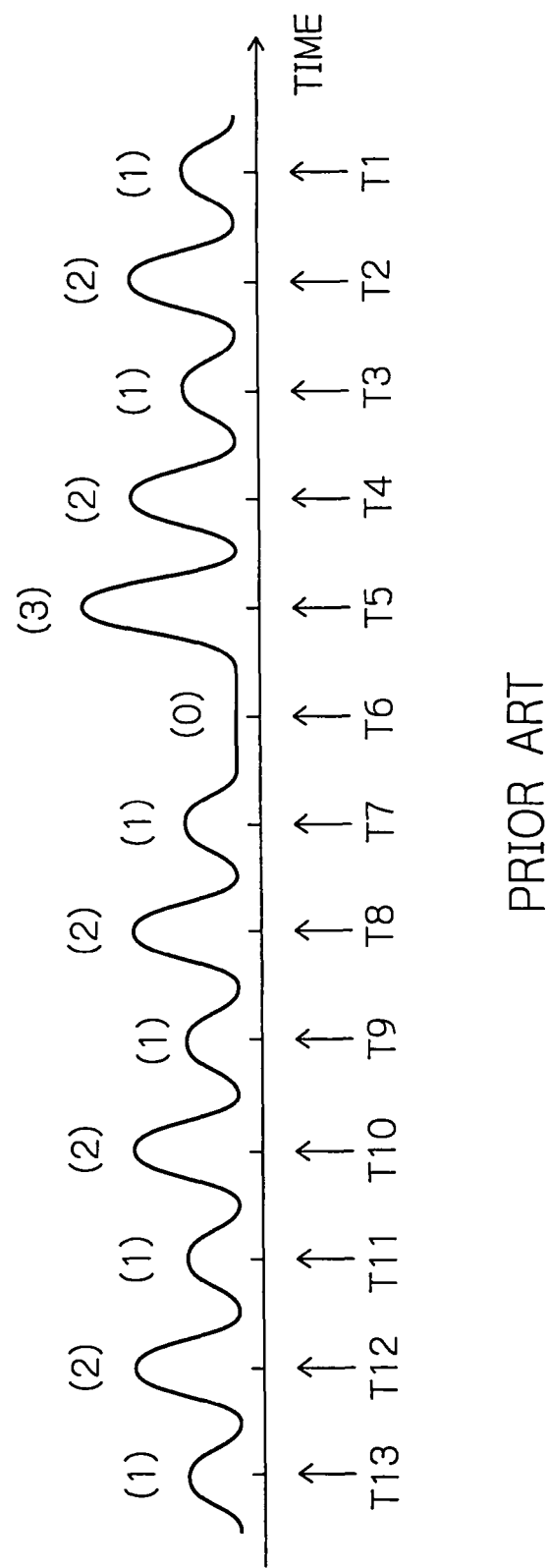

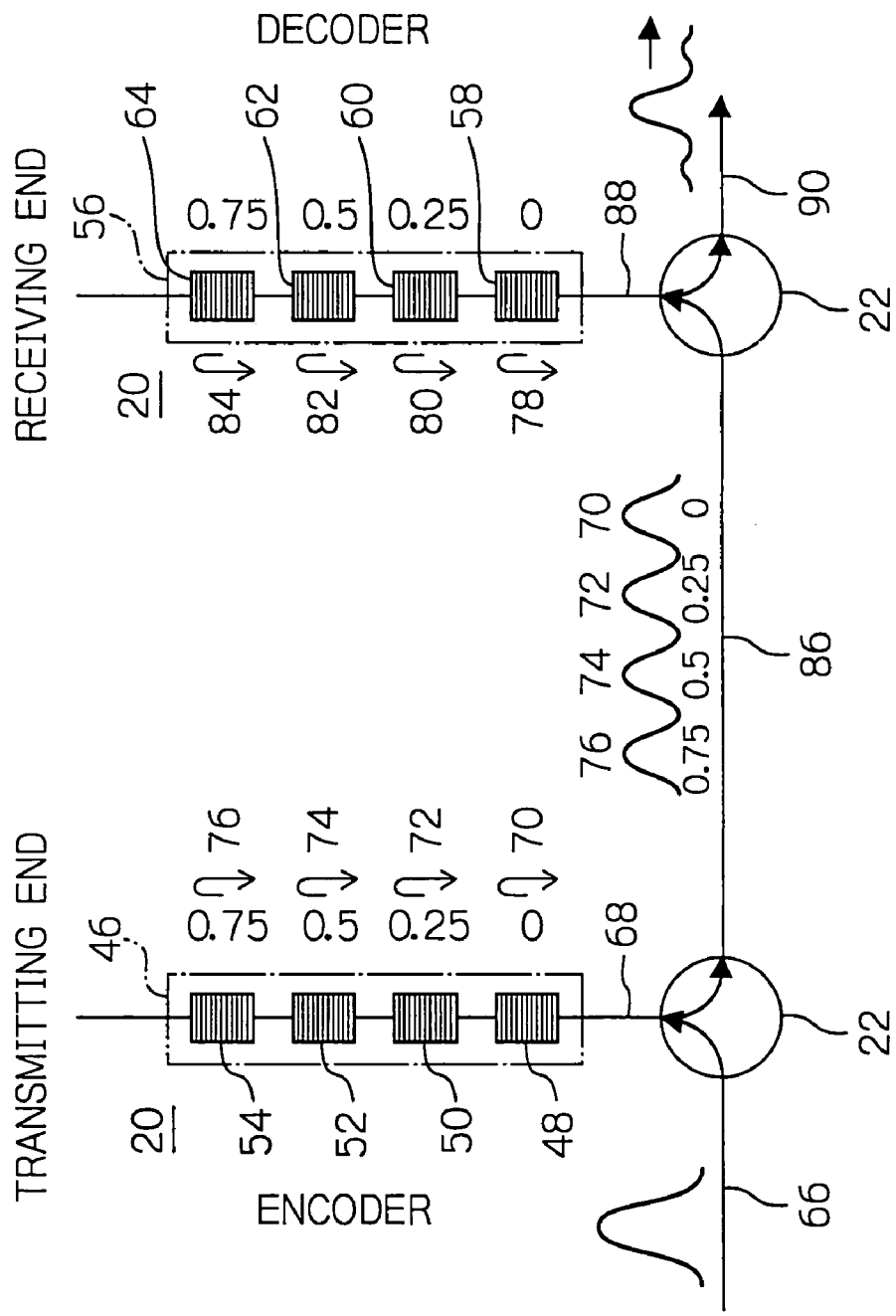

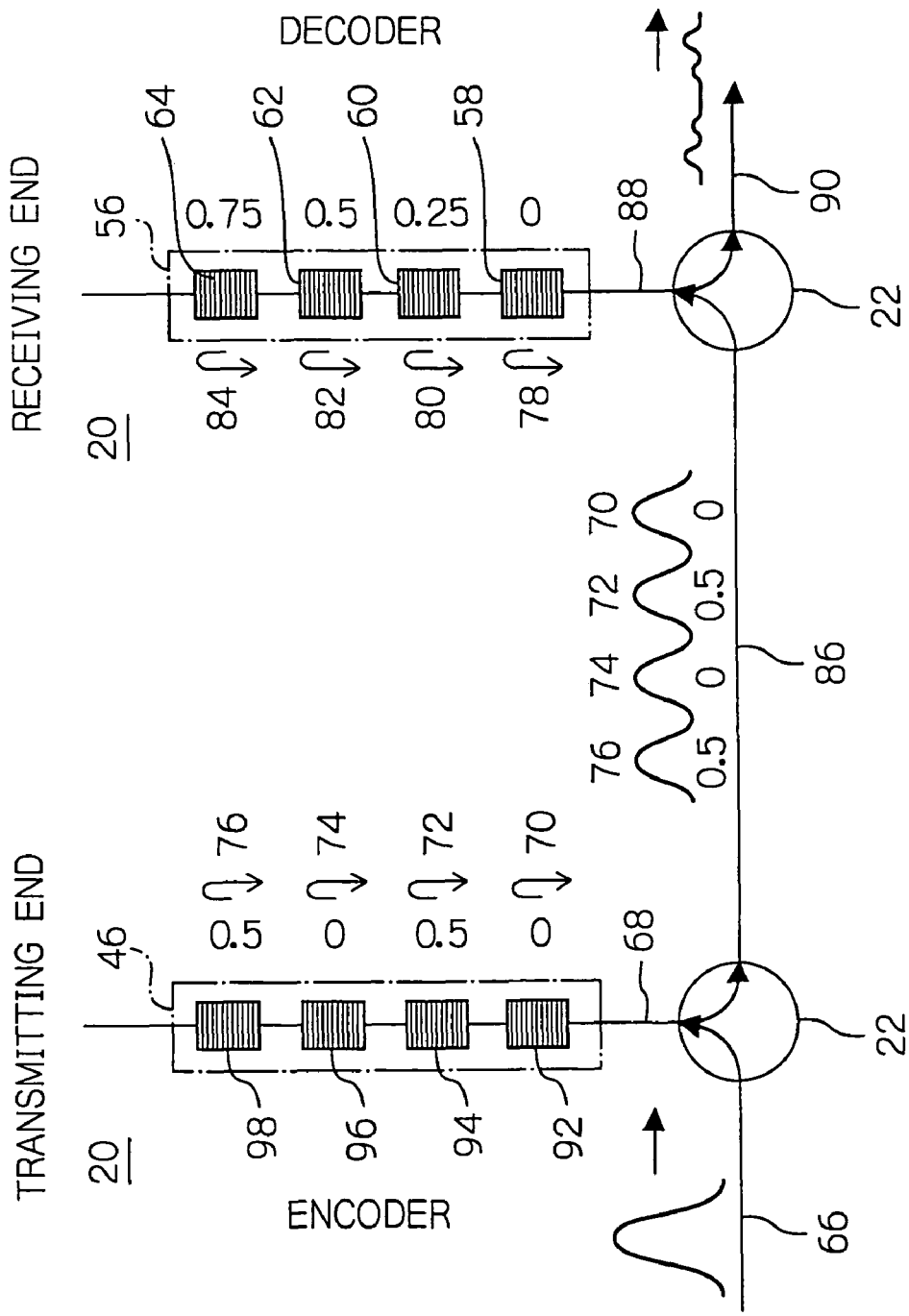

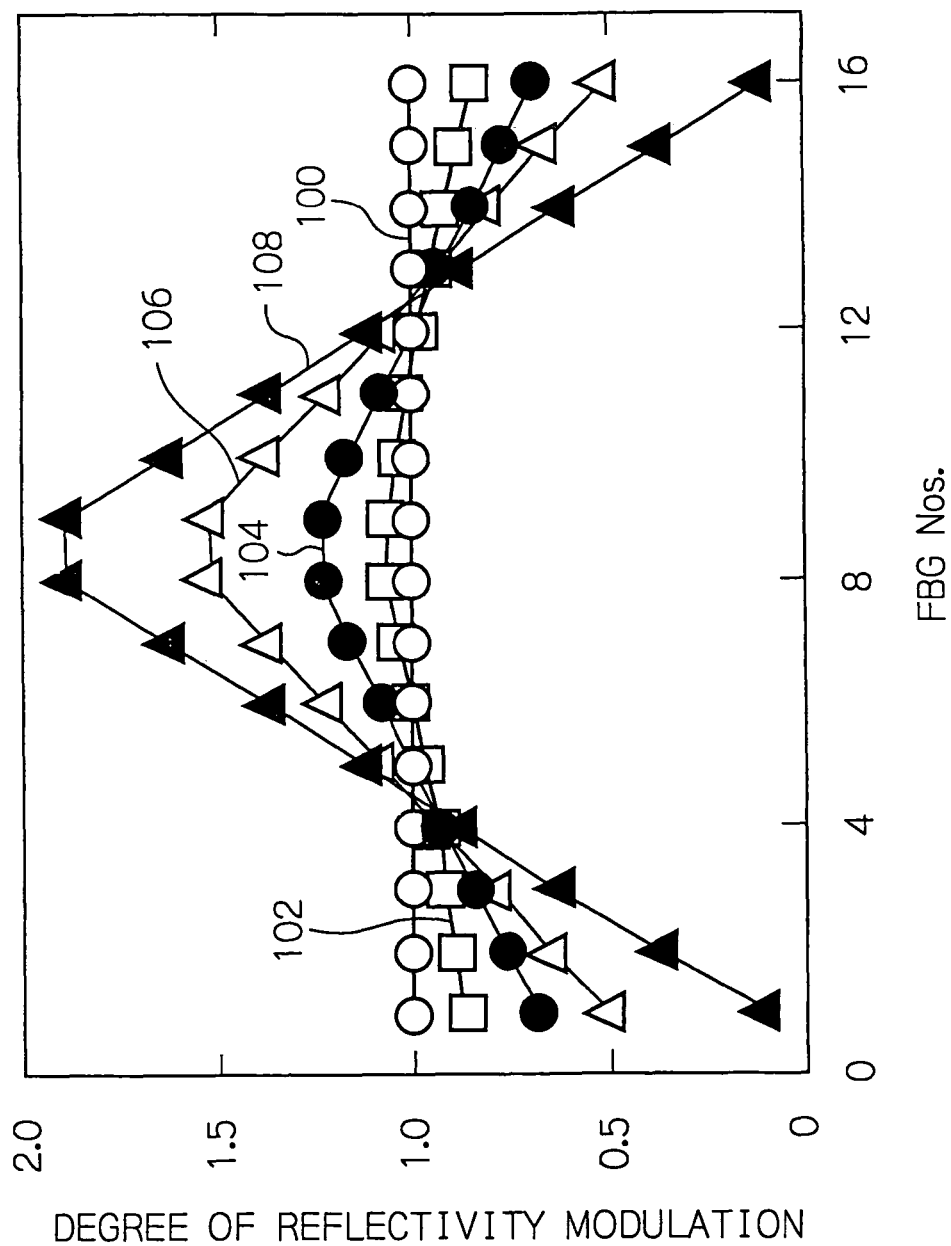

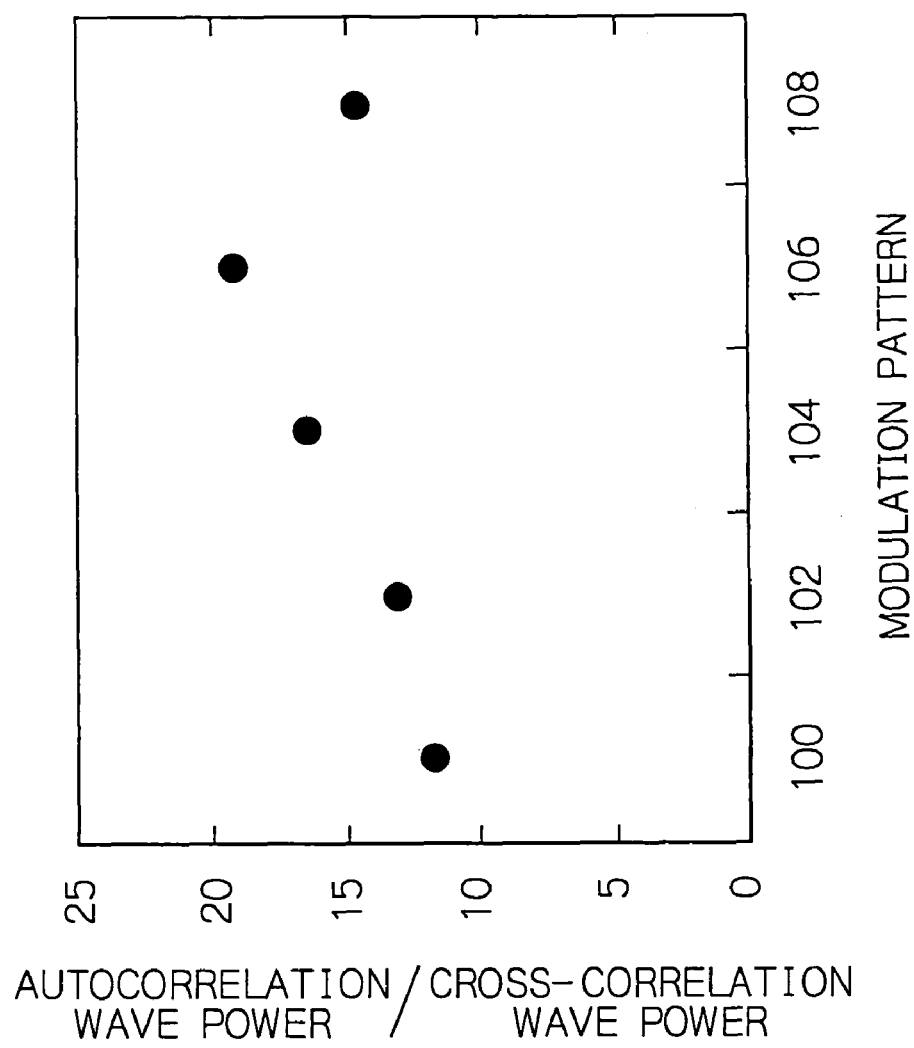

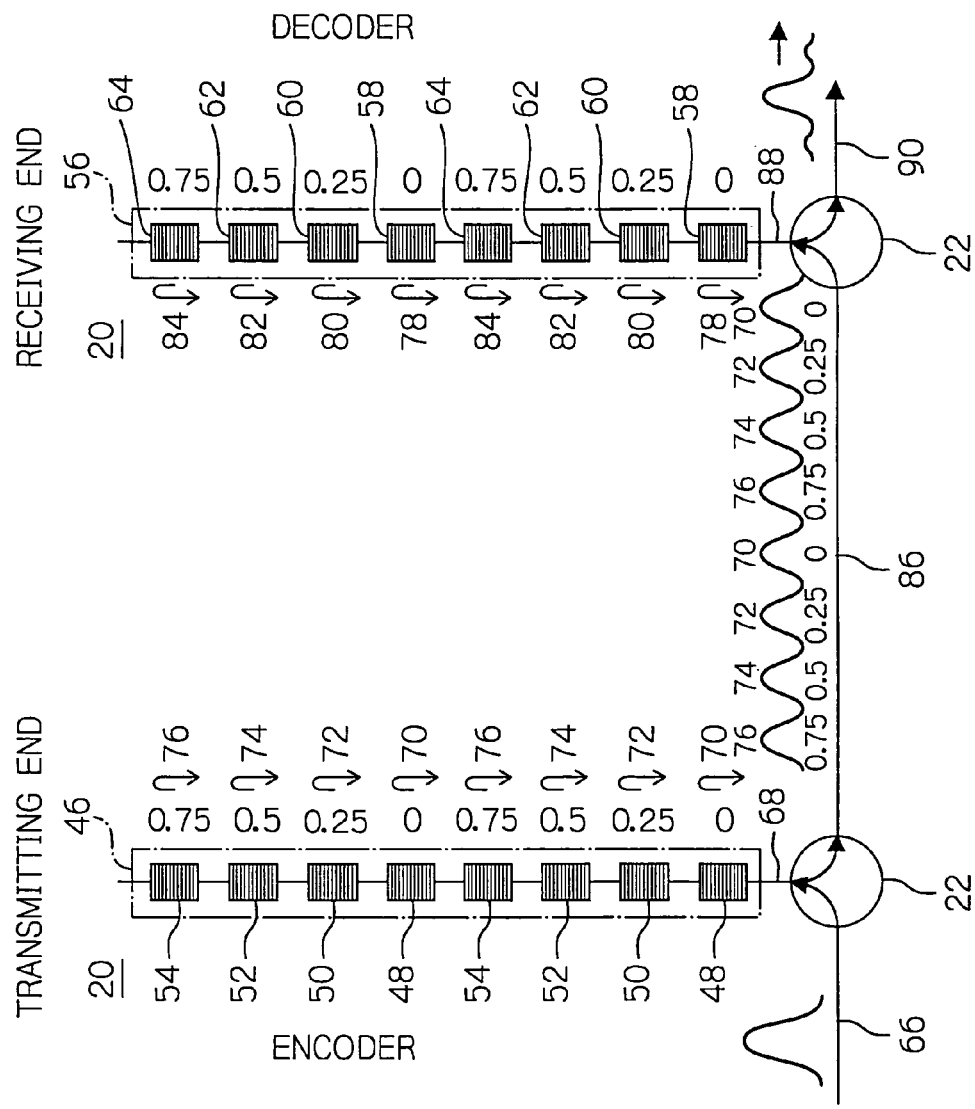

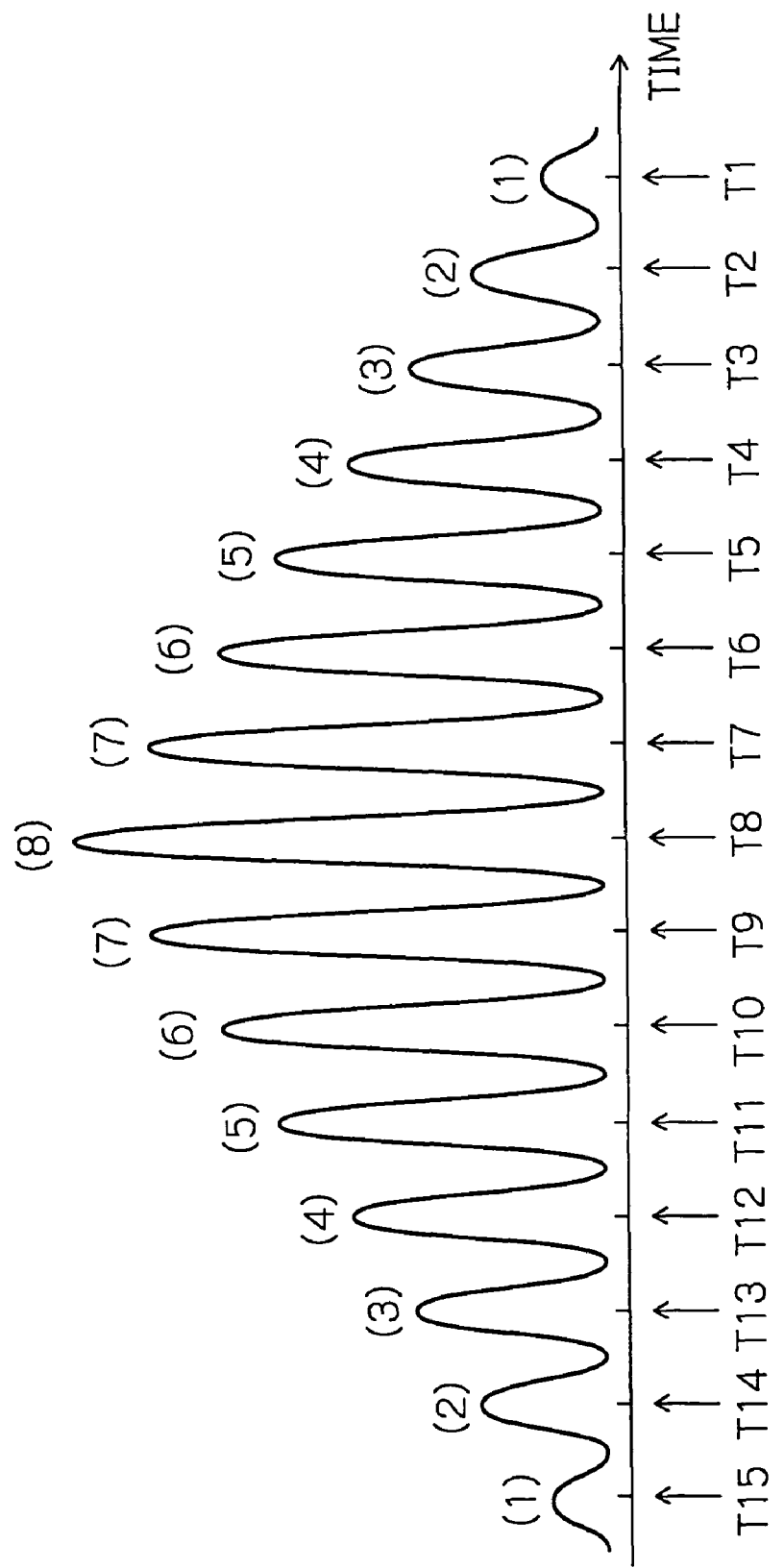

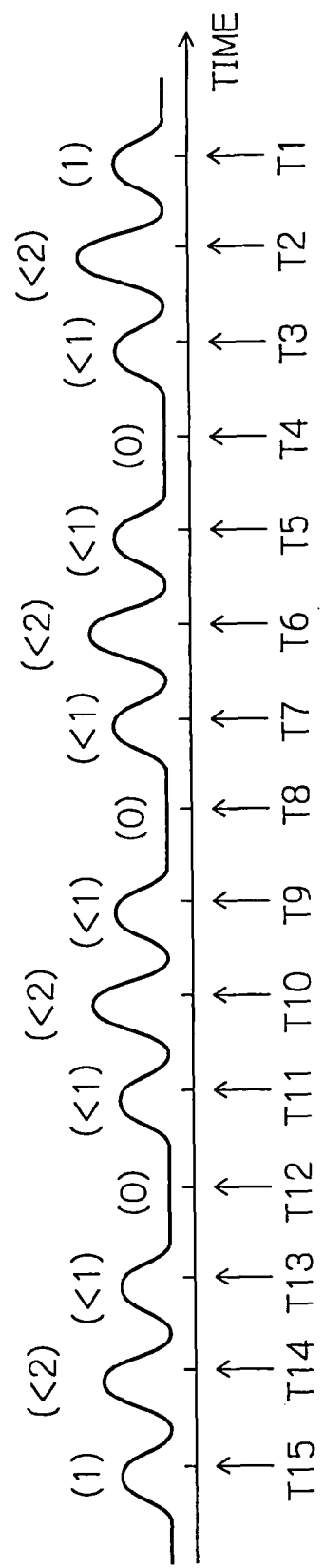

OPTICAL PULSE TIME SPREADING APPARATUS AND OPTICAL MULTIPLEX TRANSMITTING SYSTEM WITH MULTIPLEXED CHANNELS AND S/N RATIO INCREASED

BACKGROUND OF THE INVENTION

1. Field of the Invention

The present invention relates to an optical pulse time spreading apparatus for use in optical multiplex transmission, and, more in particular, to an optical pulse time spreading apparatus utilizing a super-structured fiber Bragg grating (SSFBG) that consists of a plurality of unit diffraction gratings of periodic refractive index distribution structure disposed in the wave-propagating direction of an optical fiber.

2. Description of the Background Art

In recent years, the demand for telecommunications has rapidly increased as a result of, e.g. the spread of the Internet. Aiming at satisfying the increasing demand, high-capacity and high-speed telecommunications networks using optical fiber are now being completed. Furthermore, in order to establish high-capacity communications, a high value has been placed on optical multiplexing technology that transmits plural channels of optical pulse signals multiplexed on a single optical fiber transmission line.

As optical multiplexing technology, optical time division multiplexing (OTDM), wavelength division multiplexing (WDM) and optical code division multiplexing (OCDM) have been intensively researched.

Among those optical multiplexing schemes, the OCDM has the merit of flexibility on the operation side in that no restrictions are imposed on the time axis allocation to the respective bits of optical pulse signals that are transmitted and received. Furthermore, the OCDM is advantageous in that on the time axis a plurality of channels can be established on the same time slot while on the wavelength axis a plurality of communication channels can be established on the same wavelength.

In the context, the words "optical pulse signal" refer to an optical pulse train conveying a digital signal having a binary value. More specifically, an optical pulse signal refers to a train or stream of optical pulses which appear on the time axis at regular intervals corresponding to time intervals defined by the reciprocal of a frequency corresponding to a bit rate and represent a digital signal having binary values by the existence or nonexistence of optical pulses in the optical pulse train.

The OCDM is a telecommunications scheme in which codes that are different from channel to channel are allocated to channels as a pattern to extract signals by means of pattern matching. Such a telecommunications scheme is disclosed in Hideyuki Sotobayashi, "Optical Code Division Multiplexing Network", Japanese Journal of Applied Physics, Vol. 71, No. 7, 2002, pp. 853-859, published by The Japan Society of Applied Physics. The OCDM is a solution for optical multiplexing in which an optical pulse signal is encoded on the transmitter side with an optical code that is different from communication channel to channel and the pulse signal is decoded on the receiver side with the same codes as on the transmitter side to restore the original optical pulse signal.

Since, during decoding, only the optical pulse signals whose codes correspond to ones used for encoding are extracted and processed as effective signals, it is possible to allocate an optical pulse signal of the same wavelength or a plurality of wavelengths combined to a plurality of communication channels. Furthermore, in order to carry out the decoding on the receiver side, the OCDM requires using the same codes as used in the encoding. Thus in the OCDM, the decoding side cannot execute decoding unless it knows the codes used for encoding. That ensures the security on data transmission.

The OCDM can multiplex a plurality of channels at the same time and on the same wavelength. In comparison with the OTDM and WDM, the OCDM can remarkably increase the communication capacity, so that the attention has been focused on establishing large-capacity data communications.

As means for encoding and decoding an optical pulse signal, passive optical devices, e.g. SSFBG and arrayed waveguide grating (AWG), are applicable which do not consume electric power. Since the passive optical devices can operate without incurring limitations on electrical processing speed, a communication apparatus utilizing a passive optical device can facilitate the increase in communication rate.

As a specific telecommunications scheme employing the OCDM technology, an OCDM communication scheme using binary phase codes has been known. Such an OCDM communication scheme is taught in Akihiko Nishiki, et al., "Development of Encoder/Decoder for OCDM using an SSFBG", Technical Report of IEICE (The Institute of Electronics, Information and Communication Engineers), OFT2002-66, (2002-11). In addition, an OCDM communication employing multilevel phase codes which use multilevel phases has lately been studied. Such an OCDM communication is taught in P.C. Teh, et al., "Demonstration of a Four-channel WDM/OCDMA System Using 255-chip 320-Gchip/s Quarternary Phase Coding Gratings", IEEE (Institute of Electrical and Electronics Engineers) Photonics Technology Letters, Vol. 14, No. 2, February 2002, and in Gabriella Cincotti, "Full Optical Encoders/Decoders for Photonic IP Routers", Journal of Lightwave Technology, Vol. 22, No. 2, pp. 337-342, February 2004.

Hereinafter, a binary phase code or multilevel phase code will simply be referred to as phase code. An OCDM communication scheme using phase codes establishes communication through the following steps. Firstly, a transmitter according to the OCDM communication scheme uses an output from a multiple-wavelength continuous wave light source to produce a series, or train, of optical pulses, and then converts, or modulates, the optical pulse train with a transmitting signal, i.e. digital signal to be transmitted having binary values, to produce an optical pulse signal in the RZ (Return to Zero) format to be sent out. The optical pulse signal in an RZ format will simply be called as optical pulse signal in the following description.

The transmitter encodes the optical pulse signal to be transmitted by its encoder into an encoded optical pulse signal, and then transmits the latter. On the receiver side, a receiver receives the encoded optical pulse signal and decodes the encoded signal by means of a decoder, in which the same codes as in the encoder of the transmitter is set. Consequently, the transmitted optical pulse signal is reproduced.

In accordance with the OCDM communication scheme using phase codes, an optical pulse signal is spread in time on the time axis by an encoder according to a encoding rule set in the encoder into an encoded optical pulse signal. The above rule set in the encoder is defined by codes. Hereinafter, an encoded optical pulse of an optical pulse signal resultant from time-spreading on the time axis will be referred to as a chip pulse. In other words, the encoder has a function of spreading each optical pulse contained in the optical pulse signal into a train of chip pulses that are present on the time axis.

The encoded optical pulse signal is decoded to the original optical pulse signal by a decoder. The decoder restores each optical pulse from the chip pulse train in the encoded optical pulse signal to thereby decode the original optical pulse signal. Note that, if the transmitter generates an optical pulse signal to be transmitted by using a multiple-wavelength continuous wave light source, the obtained chip pulses are single-wavelength optical pulses whereas the individual optical pulses in the optical pulse signal contain light components of plural wavelengths.

In the relationship between an encoder and a decoder each utilizing SSFBGs, the codes set in the SSFBGs are the same as one another, but the settings in the input and output ends of the SSFBGs are reversed. More specifically, by referring to one and the other end of each SSFBG as A and B, respectively, in the encoder, each SSFBG has its input end A and its output end B while in the decoder, each SSFBG has its input end B and its output end A. Hence, in the encoder, the end part A of the SSFBGs is supplied with an optical pulse signal while the end part B outputs an encoded optical pulse signal, whereas in the decoder the end part B of the SSFBG is fed with the encoded optical pulse signal while the end part A outputs a decoded optical pulse signal.

As described above, the encoder and decoder using the SSFBGs are reversed as to the settings in the input and output ends, but are identical as to the devices per se, to each other. Therefore, either of the encoder and decoder may be called as an optical pulse time spreader in the following description.

The term "fiber Bragg grating (FBG)" specifically refers to an optical fiber having its core forming Bragg diffraction gratings having the refractive index thereof periodically modulated so that an optical signal having multiple wavelengths impinging thereon is rendered periodically intensified and weakened in refractive index. The FBG can therefore achieve a periodic refractive index modulation in the longitudinal direction of the optical fiber, and has a filtering function of reflecting light having a specific wavelength corresponding to a predetermined period while passing optical signals having the remaining wavelengths without detecting the periodic changes in refractive index. Such an FBG is taught in Naoya Wada, et al., "A 10 Gb/s Optical Code Division Multiplexing Using 8-Chip Optical Bipolar Code and Coherent Detection", Journal of Lightwave Technology, Vol. 17, No. 10, October 1999. The FBG has a unique feature in that the refractive index of the core of an optical fiber is periodically modulated, but is the same in geometric form as an optical fiber for use in an optical transmission path in an optical communications system by ODDM. Hence, if the FBGs are used as a constituent element in an optical communication apparatus, the connection between the FBGs and the optical transmission path is made by connecting optical fibers. The connection between optical fibers can be attained much easier than connecting an optical fiber to a type of optical transmission path, such as a planer lightwave circuit (PLC), other than optical fiber.

The optical pulse time spreader uses an SSFBG formed by serially disposing a plurality of unit FBGs each having a certain length at a certain spatial period in the lengthwise direction of the core of an optical fiber. The unit FBG means a series of consecutive FBGs having no in between portions which change in modulation period or abruptly shift in phase of the refractive index.

The SSFBG for use in the encoder or decoder has phase shift parts provided between the neighboring unit FBGs. The amount of phase shift set in the phase shift parts is determined in dependent upon the codes set in the encoder or decoder. For example, if the SSFBG has a plurality (t) of unit FBGs, it has (t−1) phase shift parts formed, where t is a natural number more than unity. Consequently, the codes set in the SSFBG are determined depending on the amount of phase shifts set in those (t−1) positions.

As taught in the aforementioned reference, Wada et al., an encoder or decoder can employ, other than the SSFBG, a PLC having transversal filter configuration. Alternatively, AWG can be used. As an example of using AWG, there is a reference literature, Jing Cao et al., "Spectral Encoding and Decoding of Monolithic InP OCDMA Encoder", Paper We. 3.6.6, Vol. 3, ECOC 2005. The encoders and decoders utilizing PLC or AWG have the feature that they are free from limitation on setting codes. However, the encoders and decoders using PLC or AWG are disadvantageous over the ones using SSFBG in that light loss is large and downsizing of devices is difficult.

In the following, the principle of encoding and decoding carried out by SSFBGs having the same codes will be described with reference to the accompanying drawings. An SSFBG encoder and an SSFBG decoder employ SSFBGs. In FIG. 1, each unit FBG of the SSFBGs is indicated by a rectangle with a pattern of lateral stripes. In addition, relative phases set in the unit FBGs are depicted with the numerical values presented beside the corresponding unit FBGs.

Now, arbitrary one of the unit FBGs, the constituent elements of the SSFBGs, is taken as a reference unit FBG. The phase of Bragg-reflected light output from the reference unit FBG is defined to zero. Furthermore, when a difference in phase of the Bragg-reflected light from another unit FBG with respect to the reference unit FBG is expressed as the phase of the former unit FBG, the phase of the reflected light from the reference unit FBG is referred to as a relative phase. Under those definitions, the phase of the Bragg-reflected light from each unit FBG in the SSFBGs is determined as a phase difference from the reference unit FBG. In order to describe the operation of SSFBGs that constitute optical pulse time spreaders, with respect to the phases of the Bragg-reflected light from the unit FBGs, only the mutual phase differences between the reflected lights output from the respective unit FBGs are critical.

In FIG. 1, the relative phase 0's (zeros) indicated beside some unit FBGs mean that the phases of the Bragg-reflected light output from the unit FBGs are equal to one another. Likewise, the phases of the reflected light from the unit FBGs represented by the relative phases 0.5 are equal to each other. The phase difference between the phase 0 of the reflected light from the unit FBGs and the phase 0.5 of the reflected light from the unit FBGs is shifted by a half wavelength, namely $0.5\lambda$, where $\lambda$ represents the wavelength of an optical pulse. In terms of an angular phase difference, it is shifted by ($2\pi \times 0.5$). By setting the wavelength of an optical pulse to be encoded and decoded to $\lambda$, the phase difference between the relative phase 0 of the Bragg-reflected light from the unit FBG and the relative phase 0.5 of the Bragg-reflected light from the unit FBG is equal to $0.5\lambda$.

Taking into account of the nature of the phase described above, a relative phase, when taking a specific numerical value, will be represented in the following manner. For instance, the relative phase having a value 0 of the Bragg-reflected light from a unit FBG is simply denoted as 0 (or zero) and the relative phase having a value 0.5 of the Bragg-reflected light from a unit FBG is as 0.5, with the constant part $\lambda$ or $2\pi$ thus omitted.

With regard to the reference unit FBG, it is useful to describe a unit FBG placed on either end of the SSFBG. Thus, as for a reference unit FBG, a unit FBG placed on either the input/output end or on the end opposite to the input/output end of the SSFBG will be described, but no reference will be made to which unit FBG is chosen as the reference unit FBG.

As a reference unit FBG, selected is one of the unit FBGs having the relative phase of the Bragg-reflected light denoted as zero in the figure and provided on the opposite ends, which one unit FBG is either the input/output end or the end opposite to the input/output end of the SSFBG.

Now, a detailed description will be made about the phase of the Bragg-reflected light. The shape of an optical pulse observed as a time-serial waveform exhibits a time-serial waveform of the envelope of an optical carrier wave forming the optical pulse. Accordingly, the phase of Bragg-reflected light represents the phase of an optical carrier wave that forms an optical pulse reflected by a unit FBG.

An encoder spreads on the time axis an optical pulse having entered its SSFBG comprising a plurality (t) of unit FBGs into t optical pulses aligned on the time axis to be sent out. The spread of the optical pulse on the time axis will simply be called as time spread. As a result of the time spread, the optical pulse entering the SSFBG is encoded and then output. The t optical pulses resultant from time spreading the input optical pulse by the encoder is referred to as chip pulses.

The position of the peak of the chip pulses on the time axis is dependent on the location of the unit FBGs in the SSFBG that have generated respective chip pulses. Furthermore, the phase of the optical carrier waves that form the respective chip pulses is dependent upon the relative position of the periodic refractive index structure of each unit FBG in the SSFBG.

As shown in FIG. 1, the input optical pulse is supplied to the SSFBG of the encoder via an optical circulator which is denoted by an circle on the transmission end. The encoder spreads the received optical pulse in time and transmits it as a train of chip pulses through the optical circulator. In the SSFBG of the encoder shown in FIG. 1, seven unit FBGs are arranged in the wave-propagating direction of an optical fiber. Thus, the number of chip pulses aligned on the time axis and output by the SSFBG in the encoder is seven in this case.

In the following specific example, the SSFBG of the encoder is given seven bits of binary codes (0, 0, 1, 0, 1, 1, 1) representing a pattern of pseudo-random numbers (PNs) in an M-series. The number of terms in a numerical sequence consisting of 0's and 1's and providing codes may be called as code length. In this example, the code length is seven. Furthermore, the numerical sequence providing the codes may be called as code series, and the terms 0's and 1's in the code series may be referred to as chips. The values 0 and 1 per se may be referred to as code value.

The seven unit FBGs in the SSFBG of the encoder respectively correspond to the first chip 0, second chip 0, third chip 1, fourth chip 0, fifth chip 1, sixth chip 1 and seventh chip 1 of the above optical phase codes. The code value 0 or 1 is determined on the basis of the relative phase set in the respective unit FBGs.

When an optical pulse enters the SSFBG of the encoder, the pulse is reflected by the seven unit FBGs and is sent out as Bragg-reflected light a, b, c, d, e, f and g. In this case, the relative phases of the Bragg-reflected light a, b and d are value 0, whereas the relative phases of the Bragg-reflected light c, e, f and g are value 0.5. The train of chip pulses consisting of the Bragg-reflected light having the above relative phases is indicated by a sequence of relative phase values (0, 0, 0.5, 0, 0.5, 0.5, 0.5) which also represent the appearance order of the chip pulses. A chip whose code value is 0 corresponds to a chip pulse having a relative phase of 0, while a chip whose code value is 0.5 corresponds to a chip pulse having a relative phase of 1.

The first and second chips from the optical circulator have the same code values of 0. That is, the phase of the light reflected by the unit FBG corresponding to the first chip is equal to the phase of the light reflected by the unit FBG corresponding to the second chip. Furthermore, since the code value of the second chip is 0 while the code value of the third chip is 1, both chips are different from one another. In other words, the light reflected by the unit FBG corresponding to the second chip and the light reflected by the unit FBG corresponding to the third chip have a phase difference $\pi$.

Similarly, as the third chip has the code value of 1 and the fourth chip has the code value of 0, these chips have different codes. Thus, the light reflected by the unit FBG corresponding to the third chip and the unit FBG corresponding to the fourth chip also have a phase difference $\pi$. Phase differences with respect to the fifth and remaining chips are the same as above and therefore a description thereon will be omitted.

In this way, the encoder generates the Bragg-reflected light based on the single incoming optical pulse by means of the seven unit FBGs, and then time-spreads the seven reflected light into an encoded chip pulse train. In FIG. 1, a train of seven optical pulses aligned on the time axis at a particular interval depending on the arrangement of the unit FBGs are illustrated above an optical fiber transmission path which connects the transmitting and receiving ends. As is clear from FIG. 1, a chip pulse train is an optical pulse train obtained by spreading in time an optical pulse entering the encoder into a plurality of optical pulses on the time axis. The individual optical pulses spread and arranged on the time axis correspond to the respective chip pulse.

As described, the relative phase of the chip pulses are (0, 0, 0.5, 0, 0.5, 0.5, 0.5). In addition, the Bragg-reflected light a and b have the same phases. Furthermore, the phase differences between the Bragg-reflected light b and c and between the light c and d are equal to $\pi$. The same is true in the cases of the reflected light e, f and g. In other words, when the phase of the Bragg-reflected light a is used as a benchmark, the phases of the reflected light a, b and d are equal to each other, whereas the phases of the reflected light c, e, f and g are different from the former ones by $\pi$. The train of chip pulses output from the optical circulator on the transmitting end is passed on the optical fiber transmission path and input into the SSFBG of the decoder via the optical circulator on the receiving end.

The SSFBG in the decoder has the same configuration as the SSFBG in the encoder except that the unit FBGs of the SSFBG in the decoder are placed reversely with respect to the optical circulator. It is clear from the figure in which the relative phase values (0.5, 0.5, 0.5, 0, 0.5, 0, 0) are presented in sequence starting from the input/output end of the SSFBG of the decoder that is the reverse order of the relative phase sequence (0, 0, 0.5, 0, 0.5, 0.5, 0.5) in the encoder.

The SSFBG of the decoder is supplied with, as shown in FIGS. 2A and 2B, the train of chip pulses a to g from the SSFBG of the encoder to generate an autocorrelation wave. FIG. 2A illustrates the temporal waveforms of seven chip pulses h to n which are produced through Bragg reflection performed by the seven unit FBGs in the decoder. In this figure, the horizontal axis denotes the time and indicates the progress of time depicted as time points T1 to T13 for descriptive purpose. The time denoted with a smaller numerical value represents the prior time.

A chip pulse train entering the SSFBG of the decoder is reflected by the unit FBG closest to the optical circulator. The light reflected by this unit FBG is referred to as Bragg-reflected light h. Likewise, the light reflected by the subsequent unit FBGs is referred to as Bragg-reflected light j, k, l, m and n.

The chip pulses a, b, c, d, e, f and g contained in the chip pulse train are reflected by the unit FBG closest to the optical circulator in the decoder so as to be aligned on the time axis as indicated by the symbol h in FIG. 2A. The input chip pulse a is an optical pulse with its peak at time T1 on the time axis. The chip pulse b reflected by the unit FBG closest to the circulator is an optical pulse having its peak at time T2 on the time axis. Similarly, the chip pulses c, d, e, f and g reflected by the unit FBG closest to the circulator are optical pulses with their peaks at times T3, T4, T5, T6 and T7 on the time axis, respectively.

The chip pulses a, b, c, d, e, f and g in the chip pulse train are also reflected by the unit FBG, which is second closest to the optical circulator, so as to be aligned on the time axis as indicated by the symbol i in FIG. 2A. The Bragg-reflected light i from this unit FBG has the same phase as the reflected light h. Hence, the optical pulse train denoted on the time axis as the reflected light h has the same phase as the optical pulse train denoted on the time axis as the reflected light i.

Likewise, the chip pulses in the chip pulse train are reflected by the third and fourth unit FBGs from the optical circulator to thereby be aligned on the time axis as indicated by the symbols j and l in FIG. 2A. The phase relationships between the Bragg-reflected light h and the Bragg-reflected light j and l output from the third and fifth unit FBGs are identical. Therefore, the reflected light j and l line up on the time axis in FIG. 2A as the optical pulse trains indicated by the symbols j and l. Although the optical pulses associated with the Bragg-reflected light i, j, k and l shift on the time axis in parallel, the phase relationship between the optical pulses relevant to the reflect light is mutually equivalent.

By contrast, the Bragg-reflected light output by the fourth, sixth and seventh unit FBGs from the optical circulator has the phase difference π with respect to the reflected light by the first to third and fifth unit FBGs. Consequently, the relative phase sequence of the chip pulses in the chip pulse trains h, i, j and l is (0.5, 0.5, 0, 0.5, 0, 0, 0), whereas the relative phase sequence of the chip pulses in the chip pulse trains k, m and n is (0, 0, 0.5, 0, 0.5, 0.5, 0.5). Note that the sequence of the relative phases of the chip pulses in the chip pulse trains is indicated by sequentially presenting the relative phases of the chip pulses from right to left with respect to the time axis shown in FIG. 2A.

FIG. 2B plots an autocorrelation wave of the input optical pulse decoded by the SSFBG in the decoder. The horizontal axis in this figure depicts the time axis corresponding to that in FIG. 2A. The autocorrelation wave is obtained by combining the Bragg-reflected light h to n output from the unit FBGs in the decoder, that is, the autocorrelation wave is the sum of the reflected light h to n shown in FIG. 2A. At time T7 on the time axis shown in FIG. 2B, all optical pulses with the same phases associated with the reflected light h to n are combined, thereby providing the maximum peak of the autocorrelation wave. At other times than time T7 on the time axis in FIG. 2B, not all the seven chip pulses are superimposed and the chip pulses having the same relative phases are not always superimposed.

Consequently, an optical pulse having greater intensity than that of the optical pulse produced at time T7 is not produced at any other times than time T7 on the time axis shown in FIG. 2B. In other words, the optical pulse is spread into the chip pulse train by the SSFBG in the encoder, and the chip pulse train is supplied to the SSFBG in the decoder, so that the decoder generates the autocorrelation wave. In the illustrative example, seven bits, namely the code length equal to seven, of optical phase codes (0, 0, 1, 0, 1, 1, 1) are used, but are not limitative, and the above description will also be effective to other optical phase codes than those described above.

It is interpreted that the autocorrelation wave shown in FIG. 2B is formed via the mechanism described above. The peak waveform in the position of time T1 on the time axis is formed of the Bragg-reflected light h corresponding to the chip pulse a which is reflected by the first unit FBG from the optical circulator in the decoder. Thus, the amplitude of the peak waveform formed at time T1 on the time axis is equal to the amplitude of the chip pulse.

The peak waveform in the position of time T2 is formed as the sum of the Bragg-reflected light i corresponding to the chip pulse b reflected by the second unit FBG in the decoder and the Bragg-reflected light h corresponding to the chip pulse a reflected by the second unit FBG in the decoder. Since the above sum consists of the chip pulses having the same relative phases of 0.5, the amplitude thereof is twice as large as the amplitude of one chip pulse, that is the chip pulse a.

As described, the peak waveforms indicated in the position of times T3 to T13 on the time axis are formed via the same mechanism as the above-mentioned one. The amplitude of the respective peak waveforms varies by factors of 1, 0, 1, 0, 7, 0, 1, 0, 1, 2 and 1 in the temporal order with respect to the amplitude of the chip pulses. The amplitudes of the peak waveforms are indicated by the respective multiple numbers in parentheses in corresponding peak positions as shown in FIG. 2B.

The sum of the amplitudes of the peak waveforms sequentially added up from the peak waveforms at time T1 to time T13 is 1+2+1+0+1+0+7+0+1+0+1+2+1=17. By converting the sum of the amplitudes into an energy equivalent, the energy of the sum of the peak waveforms is 289 times, equal to $17^2$ times, as high as the energy of one chip pulse. That is, the gross energy of the autocorrelation wave is 289 times as high as the energy of one chip pulse. In addition, the amplitude of the peak of the autocorrelation wave is 7 times as large as that of one chip pulse, and therefore it becomes 49 times in terms of energy equivalent. In this way, when the same codes are set in the encoder and decoder, the encoder time-spreads the chip pulse train to supply it to the decoder, and the decoder in turn converts the chip pulse train into the autocorrelation wave.

Next, with reference to FIGS. 3, 4A and 4B, a description will be made on the case where an encoder and a decoder have different codes. The encoder and decoder shown in FIG. 3 have distinctive difference in that the codes set in an SSFBG serving as the encoder on the transmitting end differs from the codes set in an SSFBG serving as the decoder on the receiving end. The other constituent factors than this factor are the same as in FIG. 1.

An optical pulse included in a transmission signal enters the SSFBG of the encoder via an optical circulator. The SSFBG of the encoder is provided with seven unit FBGs arranged sequentially from the end of the SSFBG close to the optical circulator. The relative phases of Bragg-reflected light a, b, c, d, e, f and g output from the unit FBGs are (0.5, 0.5, 0, 0, 0, 0.5, 0.5). The Bragg-reflected light correspond to respective chip pulses.

A train of chip pulses output from the optical circulator on the transmitting end corresponds to the train of chip pulses a, b, c, d, e, f and g shown above an optical fiber transmission path provided between the optical circulators on the transmitting and receiving ends shown in FIG. 3. The chip pulses indicated by the symbols a to g are output in succession from the optical circulator on the transmitting end. The relative phases of the chip pulses are (0.5, 0.5, 0, 0, 0, 0.5, 0.5) in serial order.

The train of chip pulses output from the optical circulator on the transmitting end pass over the optical fiber transmission path and enter the SSFBG of the decoder via the optical circulator on the receiving end. The SSFBG of the decoder is provided with seven unit FBGs arranged sequentially from the end of the SSFBG close to the optical circulator. The relative phases of Bragg-reflected light h to n output from the unit FBGs are (0.5, 0.5, 0.5, 0, 0.5, 0, 0). That is, the codes set in the SSFBG of the decoder differ from the codes set in the SSFBG of the encoder.

FIGS. 4A and 4B show a process in which the train of chip pulses output from the SSFBG of the encoder are decoded by the SSFBG of the decoder to produce a cross-correlation wave. The chip pulse trains h to n represent the temporal waveforms of the optical pulses reflected by the seven unit FBGs. In the figure, the horizontal axis denotes the time axis. The temporal order on the time axis is depicted as times T1 to T13 for descriptive purpose. The time having a smaller numerical value represents the prior time.

The train of chip pulses entering the SSFBG of the decoder is reflected by the first unit FBG that is closest to the optical circulator. The light reflected by this unit FBG is referred to as Bragg-reflected light h. Likewise, the light reflected by the second to seventh unit FBGs is referred to as Bragg-reflected light i to n, respectively.

The chip pulses a to g contained in the chip pulse train are reflected by the unit FBG closest to the optical circulator so as to be aligned on the time axis as indicated by the symbol h shown in FIG. 4A. The chip pulse a reflected by the first unit FBG is an optical pulse with its peak at time T1 on the time axis. The chip pulse b reflected by the first unit FBG is an optical pulse having its peak at time T2 on the time axis. Similarly, the chip pulses c, d, e, f and g are optical pulses with their peaks at times T3, T4, T5, T6 and T7 on the time axis, respectively.

In the second unit FBG from the optical circulator, the chip pulses contained in the train of chip pulses a to g is reflected and aligned on the time axis as indicated by the symbol i shown in FIG. 4A. In FIG. 4A, since the relative phase of each chip pulse in the chip pulse trains indicated by the symbols h to n is defined on the principle described with reference to FIG. 2A, the relative phases are set to 0 or 0.5 as assigned to the respective chip pulses shown in FIG. 4A.

FIG. 4B shows a cross-correlation wave of the input optical pulse decoded by the SSFBG of the decoder. In this figure, the horizontal axis indicates the time axis, of which the scale corresponds to that of the time axis in FIG. 4A. Since the cross-correlation wave is obtained from the Bragg-reflected light h to n output from the unit FBGs of the decoder, it corresponds to the reflected light h to n, shown in FIG. 4A, superimposed on each other. More specifically, the optical pulse is spread into a train of chip pulses by the SSFBG of the encoder, and the chip pulse train is in turn supplied to the SSFBG of the decoder to generate a cross-correlation wave. The mechanism to generate the cross-correlation wave shown in FIG. 4B is the same as the autocorrelation wave shown in FIG. 2B.

In FIG. 4B, the multiples of the amplitude of the peak waveforms comparing to the amplitude of the chip pulses are indicated in parentheses shown above the corresponding peak positions of the peak waveforms. The sum of the amplitudes of the peak waveforms of the cross-correlation wave sequentially added up from the peak waveforms at time T1 to time T13 is 1+2+1+2+3+0+1+2+1+2+1+2+1=19. By converting the sum of the amplitudes into an energy equivalent, it is 361 times, equal to $19^2$ times, as high as the energy of one chip pulse. It means that the gross energy of the cross-correlation wave takes a value 361 times as high as the energy of one chip pulse. Furthermore, the amplitude of the peak of the cross-correlation wave is merely three times as large as that of one chip pulse. That is merely about nine times as high as the energy of one chip pulse in terms of energy equivalent.

The amplitude of the maximum of the peaks forming the cross-correlation wave shown in FIG. 4B is three times as large in magnitude as the amplitude of the chip pulse. On the receiving end, the autocorrelation wave is distinguished from the cross-correlation wave based on the intensity ratio between the peaks forming the autocorrelation and cross-correlation waves. The amplitude of the maximum peak in the autocorrelation wave shown in FIG. 2B is seven times as large in magnitude as the amplitude of the input chip pulse. Furthermore, the amplitude of the maximum of the peaks forming the cross-correlation wave shown in FIG. 4B is three times larger than that of the input chip pulse. Thus, the peak intensity ratio between them is $7^2:3^2=49:9$.

As described, the gross energy of the autocorrelation wave is 289 times and the gross energy of the cross-correlation wave is 361 times as high as the energy of one chip pulse, thus there being almost no difference in order of gross energy between both waves. In general in conventional encoding and decoding, the gross energy is comparative between an autocorrelation wave and a cross-correlation wave. As a consequence, when the number of channels to be multiplexed increases in the OCDM, the energy of the autocorrelation wave component becomes smaller than that of the cross-correlation wave component.

By way of example, when two channels are to be multiplexed, the ratio of the energy partitioned into the components of autocorrelation and cross-correlation waves, which corresponds to an S/N ratio of a signal, is about 1:1. However, when four channels are to be multiplexed, the ratio of the energy partitioned into the components of the autocorrelation and cross-correlation waves is 1:3.

This is because the autocorrelation wave is generated for one multiplexed channel, whereas the cross-correlation wave is generated for the three channels other than the channel reproduced as the autocorrelation wave. That is, the S/N ratio becomes smaller as the number of channels to be multiplexed increases in the OCDM. For this reason, the receiving end in the OCDM has to perform time gate processing or utilize a nonlinear optical device, or requires special means. Such special means are disclosed in Wei Cong et al., "An Error-Free 100 Gb/s Time-Slotted SPECTS O-CDMA Network Testbed", Paper Th. 1.4.6, Vol. 3, ECOC 2005.

As described above, an optical multiplex transmitting system typified by the conventional OCDM for transmitting and receiving a transmitting optical pulse signal by time-spreading with codes or the equivalent and multiplexing the signal required special means for overcoming the problem of the decrease of the S/N ratio due to the increase in number of channels to be multiplexed. As a consequence, a conventional apparatus comprised a lot of constituent elements, resulting in complication in structure of the apparatus and also in cost escalation.

SUMMARY OF THE INVENTION

It is an object of the present invention to provide an optical pulse time spreading apparatus that can spread a transmitting optical pulse signal in time to perform optical multiplex transmission in which an S/N ratio is not reduced even if the number of channels to be multiplexed increases, and also to provide an optical multiplex transmitting system using such an optical pulse time spreading apparatus.

In accordance with the present invention, an optical pulse time spreading apparatus comprises a plurality (s) of optical pulse time spreaders for spreading input optical pulses in time and outputting it as a train of chip pulses having a plurality (N) of chip pulses sequentially arranged on a time axis, where N is a parameter of a natural number more than two and s is a parameter of a natural number not exceeding N. With use of a parameter n of a natural number ranging from unity to s, inclusive, each of the n optical pulse time spreaders comprises N phase controllers for controlling phases to produce a train of chip pulses in which the first to N-th chip pulses are arranged on the time axis in sequence. With use of parameter a of a predetermined real number not less than zero but below unity, the chip pulses are arranged such that a phase difference equal to $2\pi\{a+(n-1)/N\}$ is given between adjacent ones on the time axis of the first to N-th chip pulses. If the parameter N is an odd number, the first to $\{(1/2)(N+1)\}$-th phase controllers are configured to monotonically increase the reflectivity of the optical pulse in numeric order of the phase controllers while the $\{(1/2)(N+1)\}$-th to N-th phase controllers are configured to monotonically decrease the reflectivity of the optical pulse in numeric order of the phase controllers, or if the natural number N is an even number, the first to (N/2)-th phase controllers are configured to monotonically increase the reflectivity of the optical pulse in numeric order of the phase controllers while the $\{(N/2)+1\}$-th to N-th phase controllers are configured to monotonically decrease the reflectivity of the optical pulse in numeric order of the phase controllers. Furthermore, the reflectivities of the optical pulse in the (N/2)-th and $\{(N/2)+1\}$-th phase controllers are equally defined.

Also in accordance with the present invention, an optical pulse time spreading apparatus comprises a plurality (s) of optical pulse time spreaders for spreading input optical pulses in time and outputting the pulses as a train of chip pulses having a plurality (N) of chip pulses sequentially arranged on a time axis, where N is a parameter of a natural number more than two and s is a parameter of a natural number not exceeding N. With use of a parameter n of a natural number ranging from unity to s, inclusive, N unit diffraction gratings diffract the optical pulses passing through optical waveguides connected to n optical pulse time spreaders. The N unit diffraction gratings diffracts the optical pulses to produce a train of chip pulses in which the first to N-th chip pulses are arranged on the time axis. With use of a parameter a of a predetermined real number not less than zero but below unity, the chip pulses are arranged serially in the direction of the optical waveguide in numeric order of the first to N-th unit diffraction gratings in such a manner that a phase difference equal to $2\pi\{a+(n-1)/N\}$ is given between adjacent ones on the time axis of the first to N-th chip pulses. If the parameter N is an odd number, the first to $\{(1/2)(N+1)\}$-th unit diffraction gratings are configured to monotonically increase the reflectivity of the optical pulse in numeric order of the unit diffraction gratings while the $\{(1/2)(N+1)\}$-th to N-th unit diffraction gratings are configured to monotonically decrease the reflectivity of the optical pulse in numeric order of the unit diffraction gratings, or if the parameter N is an even number, the first to (N/2)-th unit diffraction gratings are configured to monotonically increase the reflectivity of the optical pulse in numeric order of the unit diffraction gratings while the $\{(N/2)+1\}$-th to N-th unit diffraction gratings are configured to monotonically decrease the reflectivity of the optical pulse in numeric order of the unit diffraction gratings. The reflectivities of the optical pulse in the (N/2)-th and $\{(N/2)+1\}$-th unit diffraction gratings are equally defined.

Furthermore, in accordance with the present invention, an optical pulse time spreading apparatus comprises a plurality (s) of optical pulse time spreaders for spreading input optical pulses in time and outputting the spread optical pulses as a train of chip pulses having first to jN-th chip pulses sequentially arranged on the time axis, where N is a parameter of a natural number more than two, s is a parameter of a natural number not exceeding N, and j is a parameter of a natural number more than unity. With use of the parameter n of a natural number ranging from unity to s, inclusive, each of the n optical pulse time spreaders comprises first to jN-th phase controllers. The first to jN-th phase controllers produce first to jN-th chip pulses to be used for generating a train of chip pulses in which first to jN-th chip pulses are arranged on the time axis in sequence, and with use of a parameter a of a predetermined real number not less than zero but below unity, arrange the chip pulses such that a phase difference equal to $2\pi\{a+(n-1)/N\}$ is given between adjacent ones on the time axis of the first to jN-th chip pulses. If the parameter jN is an odd number, the first to $\{(1/2)(jN+1)\}$-th phase controllers are configured to monotonically increase the reflectivity of the optical pulse in numeric order of the phase controllers while the $\{(1/2)(jN+1)\}$-th to jN-th phase controllers are configured to monotonically decrease the reflectivity of the optical pulse in numeric order of the phase controllers, or if the parameter jN is an even number, the first to (jN/2)-th phase controllers are configured to monotonically increase the reflectivity of the optical pulse in numeric order of the phase controllers while the $\{(jN/2)+1\}$-th to jN-th phase controllers are configured to monotonically decrease the reflectivity of the optical pulse in numeric order of the phase controllers. In addition, the reflectivities of the optical pulse in the (jN/2)-th and $\{(jN/2)+1\}$-th phase controllers are equally defined.

Also in accordance with the present invention, an optical pulse time spreading apparatus comprises a plurality (s) of optical pulse time spreaders for spreading input optical pulses in time and outputting the spread optical pulses as a train of chip pulses having first to jN-th chip pulses sequentially arranged on a time axis, where s is a parameter of a natural number not exceeding N, N is a parameter of a natural number more than two and j is a parameter of a natural number more than unity. With use of the parameter n of a natural number ranging from unity to s, inclusive, each of the n optical pulse time spreaders comprises first to jN-th unit diffraction gratings formed in optical waveguides. The first to jN-th unit diffraction gratings produces first to jN-th chip pulses to be used for generating a train of chip pulses in which first to jN-th chip pulses are arranged on the time axis in sequence, and with use of a parameter a of a predetermined real number not less than zero but below unity, arranges the chip pulses serially in the direction of the optical waveguide in numeric order of the first to jN-th unit diffraction gratings such that a phase difference equal to $2\pi\{a+(n-1)/N\}$ is given between adjacent ones on the time axis of the first to jN-th chip pulses. If the parameter jN is an odd number, the first to $\{(1/2)(jN+1)\}$-th unit diffraction gratings are configured to monotonically increase the reflectivity of the optical pulse in numeric order of the unit diffraction gratings while the $\{(1/2)(jN+1)\}$-th to jN-th unit diffraction gratings are configured to monotonically decrease the reflectivity of the optical pulse in numeric order of the unit diffraction gratings, or if the parameter jN is an even number, the first to (jN/2)-th unit diffraction gratings are configured to monotonically increase the reflectivity of the optical pulse in numeric order of the unit diffraction gratings while the {(jN/2)+1}-th to jN-th unit diffraction gratings are configured to monotonically decrease the reflectivity of the optical pulse in numeric order of the unit diffraction gratings. The reflectivities of the optical pulse in the (jN/2)-th and {(jN/2)+1}-th unit diffraction gratings are equally defined.

The optical pulse time spreading apparatus of the present invention therefore can implement optical pulse time-spread that can achieve, in comparison with a conventional optical pulse time spreading apparatus which has no features described above, a large energy partition ratio of the component of autocorrelation wave to the component of cross-correlation wave as well as the peak intensity of the autocorrelation wave sufficiently larger than that of the cross-correlation wave.

Now, the present invention will be summerized. In the optical pulse time spreading apparatus of the present invention, a plurality ($m_E$) of optical chip pulse time spreaders, where $m_E=1, 2, \ldots, s$, convert an input optical pulse into a train of chip pulses which has first to N-th time-spread chip pulses sequentially aligned on the time axis and then send out the chip pulse train. To the chip pulses mutually adjacent on the time axis, a phase difference equal to $2\pi\{a+(m_E-1)/N\}$ is given, and a k-th chip pulse in relation to the first chip pulse, where k is any natural number of unity to N, inclusive, is given a relative phase equal to $2\pi\{a+(m_E-1)/N\}\times(k-1)$.

Similarly, a plurality ($m_D$) of optical chip pulse time spreaders of the optical pulse time spreading apparatus, where $m_D=1, 2, \ldots, s$, convert an input optical pulse into a train of chip pulses which has first to N-th time-spread chip pulses aligned on the time axis and then send out the pulse train, and to a k-th chip pulse constituting the chip pulse train in relation to the first chip pulse, a relative phase equal to $2\pi\{a+(m_D-1)/N\}\times(k-1)$ is given.

Thus, when $m_E$ is equal to $m_D$, $2\pi\{a+(m_E-1)/N\}\times(k-1)$ is equal to $2\pi\{a+(m_D-1)/N\}\times(k-1)$, whereas $m_E$ is not equal to $m_D$, $2\pi\{a+(m_E-1)/N\}\times(k-1)$ is not equal to $2\pi\{a+(m_D-1)/N\}\times(k-1)$. Accordingly, s patterns of chip pulse train output by the first to s-th optical chip pulse time spreaders on the transmitting end are superimposed and then sent out as a multiple signal to the receiving end. The multiple signal input into the optical pulse time spreaders on the receiving end is formed in an autocorrelation wave ($m_E=m_D$) only by the optical pulse time spreaders on the receiving end which are identical relative phase with the time spreaders on the transmitting end, whereas a cross-correlation wave ($m_E \neq m_D$) is formed by the optical pulse time spreaders other than the former ones. That is, on the receiving end, the $m_E$-th optical pulse time spreader converts the chip pulse component generated from the multiple signal and transmitted by the $m_E$-th optical pulse time spreader on the transmitting end and then sends it out as an autocorrelation wave.

In the optical pulse time spreading apparatus of the present invention, the n-th optical chip pulse time spreader converts an input optical pulse into a chip pulse train which has first to jN-th time-spread chip pulses sequentially aligned on the time axis and then sends out the pulse train. The chip pulse train including jN chip pulses is formed such that first to j-th chip pulse groups are arranged in series for every N chips.

The first chip pulse group includes the first to N-th chip pulses in the chip pulse train. In addition, the $k_1$-th chip pulse in the first chip pulse group, where $k_1$ is any natural number of 1 to N, inclusive, is given a relative phase equivalent to $2\pi\{a+(n-1)/N\}\times(k_1-1)$ with respect to the first chip pulse.

The second chip pulse group includes the (N+1)-th to (2N)-th chip pulses in the chip pulse train. Furthermore, the $k_2$-th chip pulse in the second chip pulse group, where $k_2$ is any natural number of N+1 to 2N, inclusive, is given a relative phase equivalent to $2\pi\{a+(n-1)/N\}\times(k_2-1)$ with respect to the (N+1)-th chip pulse.

In a similar manner, the third to j-th chip pulse groups are sequentially arranged. The last j-th chip pulse group includes the ((j-1)N+1)-th to ((j-1)N+N)-th chip pulses in the chip pulse train, i.e. the jN-th chip pulse. In addition, the $k_j$-th chip pulse in the j-th chip pulse group, where $k_j$ is any natural number of (j-1)N+1 to jN, inclusive, is given a relative phase equivalent to $2\pi\{a+(n-1)/N\}\times(k_j-1)$ with respect to the ((j-1)N+1)-th chip pulse.

Thus, the optical pulse time spreading apparatus of the present invention in this case differs from the former cases in that the optical pulse time spreading apparatuses in the former cases generate and output the chip pulse train containing the first to N-th chip pulses, whereas the apparatus in this case generates and outputs the chip pulse train which contains the first to j-th chip pulse groups, where the number of chip pulses is jN.

The optical multiplex transmitting system in accordance with the present invention can achieve, with use of the optical pulse time spreaders of the optical pulse time spreading apparatus to be used for the encoding and decoding processes, a large energy partition ratio between the component of auto-correlation wave and the component of cross-correlation wave as well as the peak intensity of the autocorrelation wave sufficiently larger than that of the cross-correlation wave, thereby easily splitting a received signal.

BRIEF DESCRIPTION OF THE DRAWINGS

The objects and features of the present invention will become more apparent from consideration of the following detailed description taken in conjunction with the accompanying drawings in which:

FIG. 1 shows the principle of a conventional encoder and a conventional decoder employing SSFBGs which have the same codes;

FIG. 2A shows the temporal waveforms of seven chip pulses reflected by seven unit FBGs in the process of forming an autocorrelation wave from trains of chip pulses;

FIG. 2B shows the temporal waveform of an autocorrelation wave of an input optical pulse decoded by an SSFBG of the decoder in FIG. 1 in the process of forming the autocorrelation wave from the train of chip pulses;

FIG. 3 shows the principle of a conventional encoder and a conventional decoder employing SSFBGs which have the different codes;

FIG. 4A shows the temporal waveforms of seven chip pulses reflected by seven unit FBGs in the process of forming cross-correlation wave from trains of chip pulses;

FIG. 4B shows the temporal waveform of a cross-correlation wave of an input optical pulse decoded by an SSFBG of the decoder in FIG. 3 in the process of forming the cross-correlation wave from the train of chip pulses;

FIG. 8A shows the principle of generating a train of chip pulses and restoring an optical pulse from the chip pulses by the optical pulse time spreading apparatus using the SSFBGs having the same codes, the SSFBGs being a set of the optical pulse time spreaders on the transmitting and receiving ends shown in FIG. 7;

FIG. 9A shows the principle of generating a train of chip pulses and restoring an optical pulse from the chip pulse train by the optical pulse time spreading apparatus using the SSFBGs having different codes, the SSFBGs being a set of the optical pulse time spreaders on the transmitting and receiving ends shown in FIG. 7;

FIG. 10 plots the degrees of reflectivity modulation of the unit FBGs of the optical pulse time spreaders used in the optical pulse time spreading apparatus in accordance with the invention;

FIG. 11 plots the power values of autocorrelation wave/cross-correlation wave in relation to the degree of apodization to the unit FBGs of optical pulse time spreaders used in the optical pulse time spreading apparatus in accordance with the invention;

FIG. 14 shows the principle of generating a train of chip pulses and restoring an optical pulse from the chip pulses in the optical pulse time spreading apparatus by using the SSFBGs having the same codes for the transmitting and receiving ends optical pulse time spreaders shown in FIG. 13;

FIG. 15B shows the temporal waveform of an autocorrelation wave of an input optical pulse generated by the SSFBG in FIG. 14;

FIG. 17B shows the temporal waveform of a cross-correlation wave of an input optical pulse generated by the SSFBG in FIG. 16;

DESCRIPTION OF THE PREFERRED EMBODIMENTS

Figure 5:
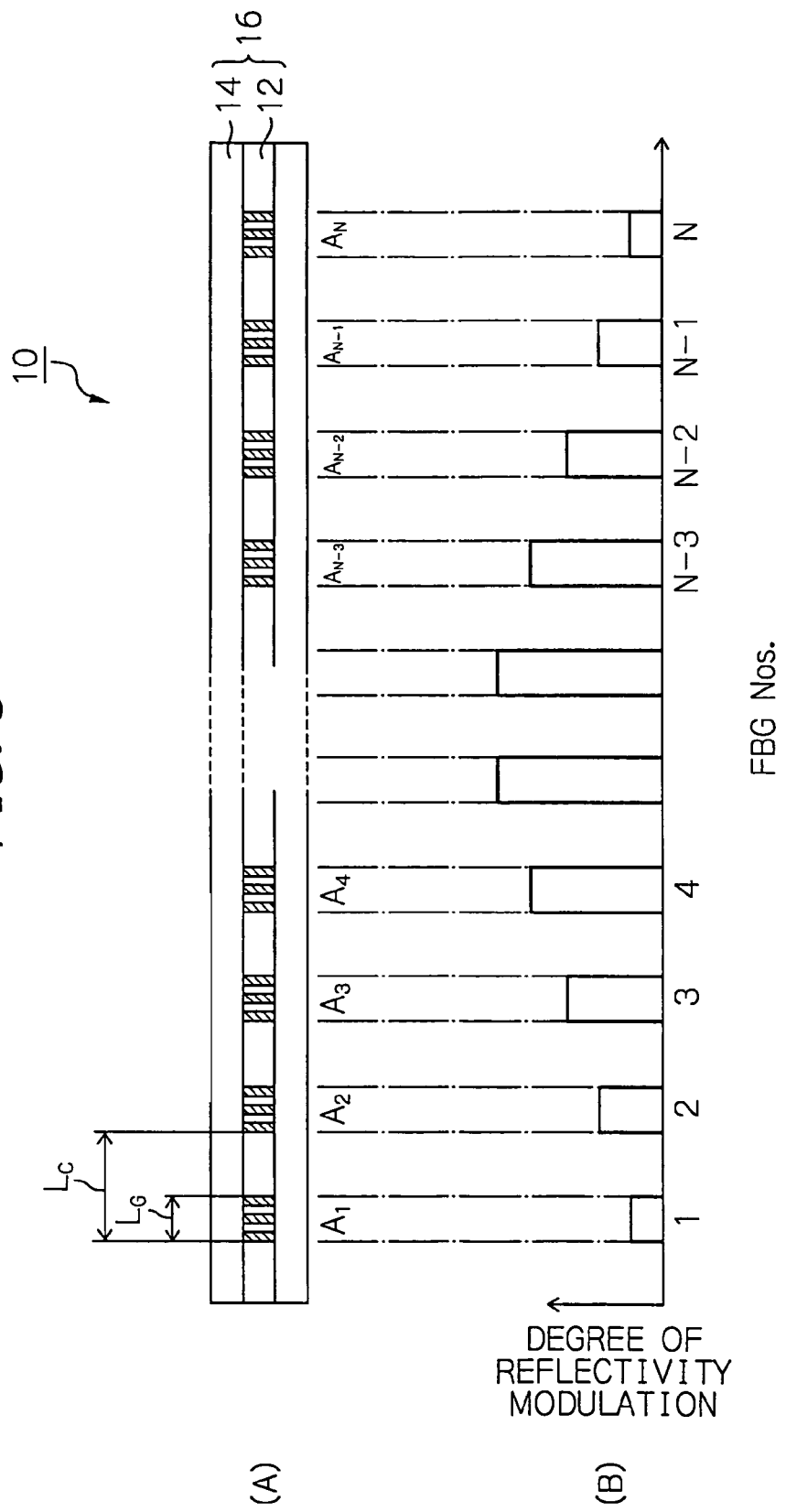
FIG. 5 is a schematic sectional view showing an SSFBG for use in an optical pulse time spreader applied in an embodiment of an optical pulse time spreading apparatus in accordance with the present invention, and shows the degrees of reflectivity modulation of the first to N-th unit FBGs contained in the SSFBG.

Preferred embodiments of an optical pulse time spreading apparatus in accordance with the present invention will now be described in detail with reference to the accompanying drawings. With reference to FIG. 5, an optical pulse time spreading apparatus of the invention comprises a plurality (s) of optical pulse time spreaders having super-structured fiber Bragg gratings (SSFBGs) 10 for spreading an input optical pulse in time and outputting it in the form of a series, or train, of chip pulses having a plurality (N) of chip pulses sequentially arranged on the time axis, where N is a natural number more than two and s is a natural number not exceeding N. Each SSFBG 10 of a plurality (n) of optical pulse time spreaders comprises N unit FBGs (Fiber Bragg Gratings) for controlling phases, where n is a natural number not exceeding s. The N unit FBGs produce a train of chip pulses in which the first to N-th chip pulses are arranged on the time axis. The chip pulses are arranged in relation to a phase difference equal to $2\pi\{a+(n-1)/N\}$ given between the chip pulses mutually adjacent on the time axis, where a is a predetermined real number not less than 0 but below 1. As shown in FIG. 5, part (B), if the natural number N is an odd number, the first to $\{(1/2)(N+1)\}$-th unit FBGs are configured to monotonically increase the reflectivity of the optical pulse in numeric order of these unit FBGs while the $\{(1/2)(N+1)\}$-th to N-th unit FBGs are configured to monotonically decrease the reflectivity of the optical pulse in numeric order of these unit FBGs. If the natural number N is an even number, the first to (N/2)-th unit FBGs are configured to monotonically increase the reflectivity of the optical pulse in numeric order of these unit FBGs while the $\{(N/2)+1\}$-th to N-th unit FBGs are configured to monotonically decrease the reflectivity of the optical pulse in numeric order of these unit FBGs. Furthermore, the reflectivities of the optical pulse in the (N/2)-th and $\{(N/2)+1\}$-th unit FBGs are substantially equally defined. It is therefore possible to implement optical pulse time-spread that can achieve, in comparison with the conventional optical pulse time spreading apparatus which has no features described above, a larger energy partition ratio of a component of autocorrelation wave to a component of cross-correlation wave as well as a peak intensity of the autocorrelation wave sufficiently larger than that of the cross-correlation wave.

Furthermore, in the optical pulse time spreading apparatus 18 according to the present invention, a plurality (jN) of unit FBGs, where jN is the number of unit FBGs in the SSFBG 10 of each optical pulse time spreader 20 and j is a natural number more than unity, are defined individually depending on whether the number jN is odd or even.

The latter optical pulse time spreading apparatus has j-fold more chip pulses, obtained by the time spreading and arranged on the time axis, than the former optical pulse time spreading apparatus. Thus, the existing range of the chip pulses on the time axis generated from one optical pulse is also j-fold wider. Hence, chip pulse trains, or streams, produced from adjacent optical pulses contained in an optical pulse signal may possibly be superimposed on the time axis. Consequently, interference caused by the chip pulses overlaid may cause a problem, e.g. distortion in the temporal waveform of a reproduced optical pulse. It is therefore a design choice to define the value of j by taking, e.g. the bit rate of the optical pulse signal into account to design the latter optical pulse time spreading apparatus. For reference, if the parameter value j is set to one, the former optical pulse time spreading apparatus will be manufactured.

It is to be noted that part or components of the system not directly relevant to the understanding of the present invention will not be illustrated or described. In the following description, signals appearing on connection lines in the drawings are denoted by the reference numerals of the corresponding connection lines. Furthermore, like constituent elements will be identified by the same reference numerals and the description thereof will be omitted to avoid redundancy.

In the description below, the terms "encoding" and "decoding" shall be comprehended broader than their conventional meanings. More specifically, a rule for spreading an optical pulse constituting an optical pulse signal on the time axis is not limitatively be comprehended only to codes which are common and narrowly defined, but extensively to any codes, in a broader sense, so far as they uniquely define some rule. Such a rule may be referred to as encoding and decoding. Thus, in connection with such codes in a broader sense, the terms such as "encoded optical pulse signal" and "chip pulse" may be used.

In addition, a train of chip pulses output from the optical pulse time spreader of the optical pulse time spreading apparatus may not be a pulse stream produced by spreading an optical pulse in time according to codes in a stricter sense as with a train of chip pulses output from an encoder in which normal codes are defined. However, the terms "encoding" and "decoding" are used for sake of simplicity to respectively describe the conversion of an optical pulse into a train of chip pulses and the conversion of a train of chip pulses into the autocorrelation wave or cross-correlation wave.

Next, a description will be made on the inventive concept of an optical pulse time spreader to which the present invention is applied. The optical pulse time spreader comprises the SSFBG 10, FIG. 5. The optical pulse time spreader may be implemented by, rather than the SSFBG, a planar lightwave circuit (PLC) having transversal filter configuration, an arrayed waveguide grating (AWG) or equivalent. Consequently, it is possible to implement the aforementioned optical pulse time-spreading that has advantages over the conventional optical pulse time spreading apparatus in terms of attaining a large energy partition ratio of a component of autocorrelation wave to a component of cross-correlation wave as well as the peak intensity of the autocorrelation wave sufficiently larger than that of the cross-correlation wave. The following description on the optical pulse time spreader is applicable to an optical pulse time spreader, which employs the PLC having transversal filter configuration or the AWG, by replacing the unit FBG for giving a relative phase to a chip pulse with constituent parts for giving a relative phase to a chip pulse in the PLC of transversal filter configuration or the AWG.

With reference to FIG. 5, a schematic configuration of the SSFBG 10 used in the optical pulse time spreader will now be described. As shown in a schematic sectional view (A) of FIG. 5, a length of optical fiber 16 includes a core 12 and a cladding 14 surrounding the core 12, on which the SSFBG 10 is formed. In the SSFBG 10, the plurality (N) of unit FBGs are disposed in series in the wave-propagating direction of the core 12 which functions as an optical waveguide for the optical fiber 16.

In FIG. 5, part (A), the first to N-th unit FBGs are assigned with sequential reference numbers $A_1$ to $A_N$ indicative of the amplitude of the degree of reflectivity modulation so as to identify the respective unit FBGs.

The degrees of reflectivity modulation in the first to N-th unit FBGs of the SSFBG 10 illustrated in FIG. 5, part (A), is depicted in part (B) in numeric order of the first to N-th unit FBGs $A_1$ to $A_N$. A refractive index modulation cycle of the first to N-th unit FBGs is $\Lambda$, so that Bragg reflection wavelengths $\lambda$ of the first to N-th unit FBGs are given by $\lambda = 2N_{eff}\Lambda$.

In the context, the refractive index $N_{eff}$ means an effective refractive index of the optical fiber 16. An optical pulse input to the SSFBG 10 having N unit FBGs is spread in time into N chip pulses.

In the SSFBG 10 shown in FIG. 5, the first to N-th unit FBGs, denoted by the FBG $A_1$ to $A_N$ and arranged in the left-to-right direction of the SSFBG 10, correspond one-to-one with the chip pulses delivered by the SSFBG 10.

The SSFBG 10 is configured such that the reflectivity monotonically increases from that of the first unit FBG to that of the unit FBG disposed in the center of the SSFBG 10 and monotonically decreases from that of the unit FBG in the center of the SSFBG 10 to that of the N-th unit FBG. That configuration can be achieved by configuring the SSFBG 10 in such a manner that the degree of the refractive index modulation of each unit FBG is monotonically increased from that of the first unit FBG to that of the unit FBG in the center of the SSFBG 10 and monotonically decreased from that of the unit FBG in the center of the SSFBG to N-th unit FBG.

More specifically, the SSFBG 10 is configured, in the case where the parameter N is an odd number, such that the degree of the refractive index modulation is monotonically increased in the order of the first unit FBG to $((½)(N+1))$-th unit FBG while being monotonically decreased in the order of $\{(½)(N+1)\}$-th unit FBG to N-th unit FBG. Furthermore, in the case where the parameter N is an even number, the SSFBG 10 is configured such that the degree of the refractive index modulation is monotonically increased in the order of the first unit FBG to (N/2)-th unit FBG and monotonically decreased in the order of $\{(N/2)+1\}$-th unit FBG to N-th unit FBG to thereby equalize the degree of the refractive index modulation of the (N/2)-th unit FBG with that of the $\{(N/2)+1\}$-th unit FBG.

Figure 6A:
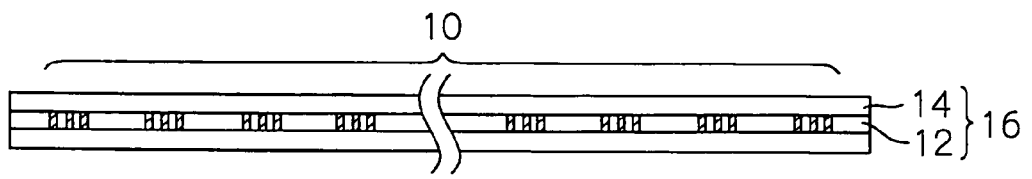
FIG. 6A is a schematic sectional view of another SSFBG for use in the optical pulse time spreader applied in the optical pulse time spreading apparatus in accordance with the invention.
Figure 6B:
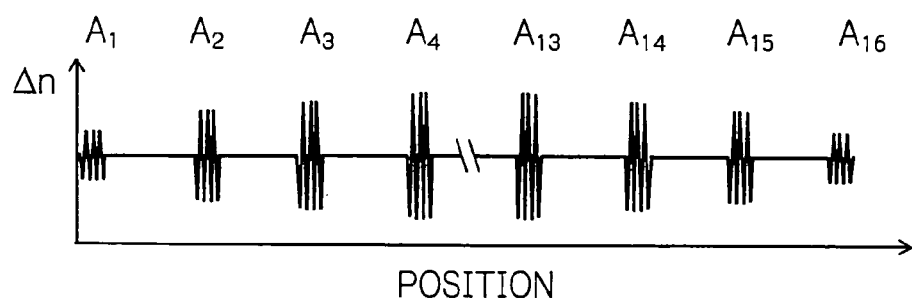
FIG. 6B shows differences Δn between the maximum and minimum refractive index modulations in relation to the positions of unit FGBs in FIG. 6A.
Figure 6C:
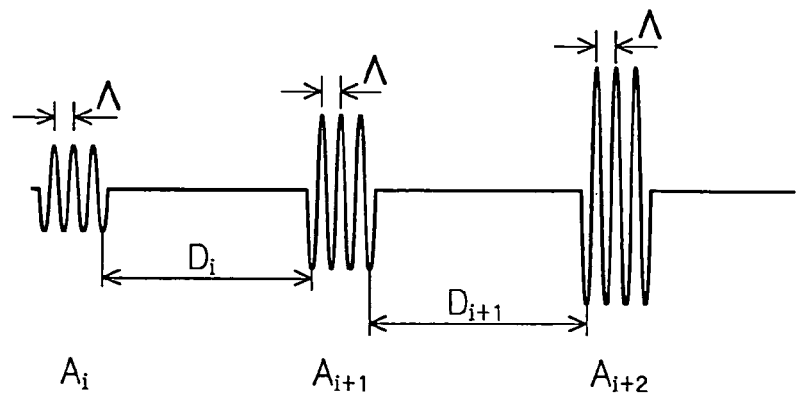
FIG. 6C shows an enlarged substantial part of refractive index modulation in the core of an optical fiber.

Next, the configuration of the SSFBG used in the optical pulse time spreader will be described in detail with reference to FIGS. 6A, 6B and 6C. FIG. 6A illustrates the same cross-section of the SSFBG 10 as in FIG. 5, part (A). FIG. 6B plots in the vertical axis the difference Δn between the maximum and minimum of the refraction index modulation of the SSFBG 10 in the optical fiber 16 with respect to the position coordinate in the longitudinal direction of the optical fiber 16 on which the SSFBG is formed in the horizontal axis. In the illustrative embodiment, the number of unit FBGs is set to 16. FIG. 6C depicts the substantial part of the core 12 in the optical fiber 16 in an enlarged scale.

In the areas between the adjacent unit FBGs shown in FIG. 6C, the refractive indices are not modulated. An interval $D_i$ represents a given peak-to-peak modulation interval or distance of the refractive indices between $A_i$-th unit FBG and $A_{i+1}$-th unit FBG. The relative phases of the $A_i$ unit FBG and $A_{i+1}$ unit FBG are defined as $P_i$ and $P_{i+1}$, respectively. In this case, a phase difference $d_i$ between them is $P_{i+1}-P_i$, where the variable subscript i is any natural number of 1 to (N−1), inclusive.

In addition, if the effective refractive index of the optical fiber between the $A_i$ and $A_{i+1}$ unit FBGs is set to $N_{eff}$, the relationship between the interval $D_i$ and the phase difference $d_i$ is indicated by an expression $D_i=(M+d_i)\lambda/2$. Here, the natural number M is a given number, and when the refractive index of the optical pulse in a vacuum is defined as $\lambda_0$, the refractive index $\lambda$ has a relationship of $\lambda=\lambda_0/N_{eff}$. When $(M+d_i)\lambda/2$ is presented by an angular phase, it becomes $\pi(M+d_i)$.

In manufacturing the n-th optical pulse time spreader of the optical pulse time spreading apparatus, a unit FBG disposed to the input/output end of the SSFBG 10 has its relative phases set to value 0 so that the relative phase of the unit FBG next to the first one becomes $2\pi\{a+(n-1)/N\}$ and the relative phase of the further next unit FBG becomes $2\pi\{a+(n-1)/N\}\times2$. In order to obtain such configuration, the distance between the first and second unit FBGs is set to be $D_1=(M+a+(n-1)/N)\lambda$, and the distance between the second and third unit FBGs is set to be $D_2=(M+\{a+(n-1)/N\})\times2\lambda$. In general, if the first unit FBG disposed to the input/output end of the SSFBG 10 is defined as the first FBG, then the k-th unit FBG is set to be equal to $$D_k=(M+\{a+(n-1)/N\})\times(k-1)\lambda$$

so that the relative phase of the k-th unit FBG becomes $2\pi\{a+(n-1)/N\}\times(k-1)$.

Figure 7:
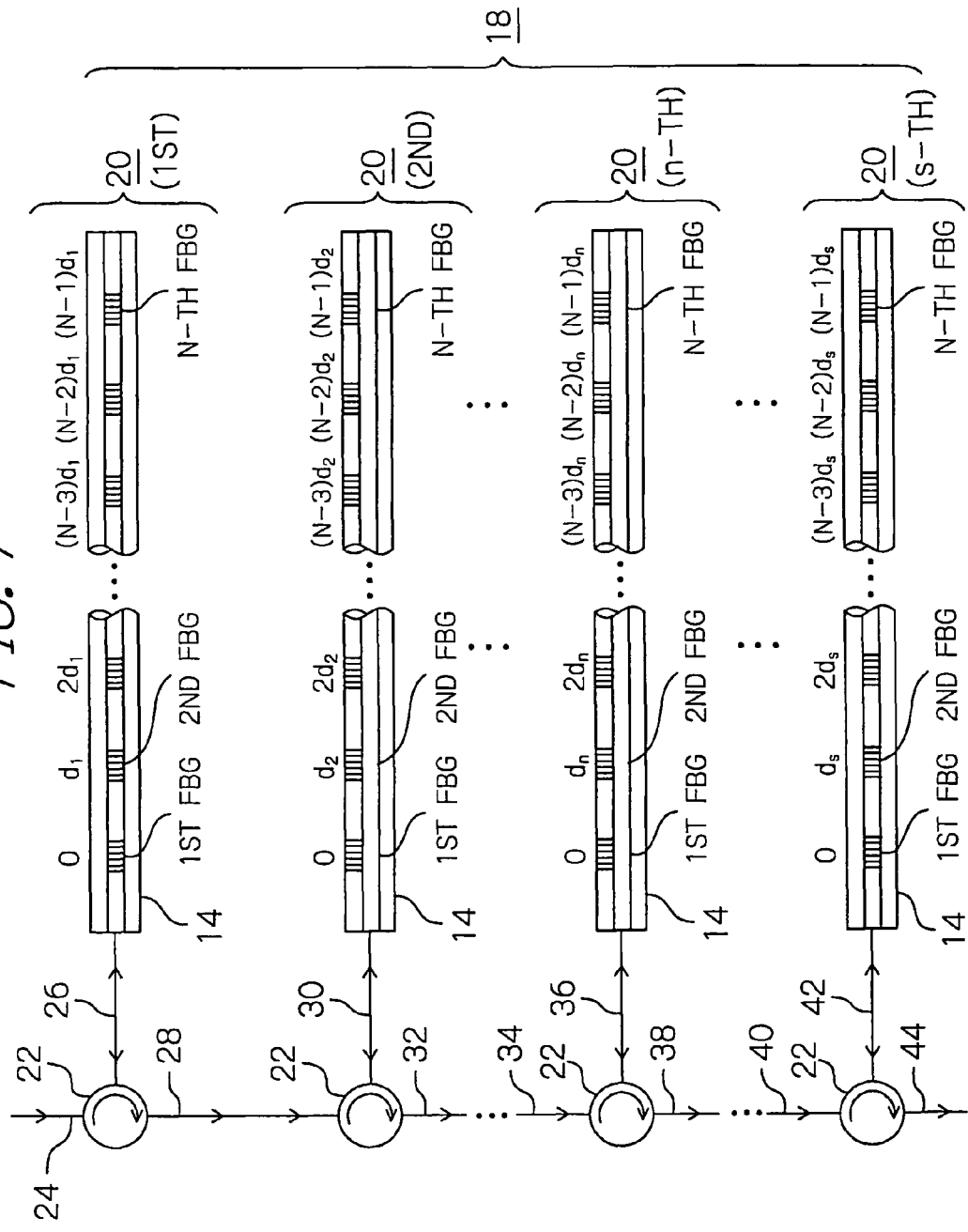
FIG. 7 is a schematic block diagram showing the optical pulse time spreaders applied in the optical pulse time spreading apparatus in accordance with the invention.

As shown in FIG. 7, the optical pulse time spreading apparatus 18 comprises a plurality (s) of optical pulse time spreaders 20, where s is an integer satisfying the condition s≦N. Mutual constituent elements of the s optical pulse time spreaders 20 are assigned with the same reference numerals, and the description about them will be omitted for simplicity. To each optical pulse time spreader 20, the plurality (N) of unit FBGs are disposed beginning from the input/output end of the optical pulse time spreader in the order of 1 to N. FIG. 7 does not specifically show the first to N-th FBG, but indicates vertically-striped patterns which denote cores 12 of the optical fiber 16 representing the first to N-th unit FBG corresponding to phase controllers.

To each optical pulse time spreader 20 connected is an optical circulator 22. When the optical pulse time spreading apparatus 18 is used as a chip pulse converter, an optical pulse input to the optical pulse time spreaders via the s optical circulators 22 is converted into a time-spread chip pulse train. The time-spread chip pulse train is output through the optical circulators 22. In this case, the optical pulse input to the optical pulse time spreaders via the optical circulators 22, for instance, is equivalent to an optical pulse which constitutes an optical pulse signal having the first to s-th channels.

When the optical pulse time spreading apparatus 18 shown in FIG. 7 is used as an optical pulse restoring device, a train of chip pulses input via the optical circulators 22 to each optical pulse time spreader 20 is converted into an autocorrelation or cross-correlation wave. The converted chip pulse train is output through the optical circulators 22. In this case, the chip pulse trains input through the optical circulators 22 to the optical pulse time spreaders are equivalent to chip pulse trains on the first to s-th channels.

Now, the configuration of the optical pulse time spreader 20 will be described by taking the first optical pulse time spreader 20 as an example. In the first optical pulse time spreader 20, the optical circulator 22 is supplied with an optical pulse 24. The optical circulator 22 in turn outputs the input optical pulse 24 as an optical pulse 26 to the optical fiber 14. The optical pulse 26 is spread in time by the first to N-th unit FBGs in the first optical pulse time spreader 20. The first optical pulse time spreader 20 generates a chip pulse train 26 in which the first to N-th chip pulses are spread in time and arranged on the time axis, and then outputs the chip pulse train to the optical circulator 22.

Each of the first to N-th unit FBGs gives a relative phase equal to zero to the first chip pulse in the chip pulse train 26. Furthermore, each of the first to N-th unit FBGs gives a relative phase equal to $2\times d_1$ ($=2\pi a$) to the second chip pulse. Likewise, each of the first to N-th unit FBGs gives a relative phase equal to $2\times(N-1)d_1$ ($=2\pi a\times(N-1)$) to the N-th chip pulse. The parameter a in the above expressions is any real number that satisfies the condition 0≦a<1.

The first optical circulator 22 outputs the generated chip pulse train 26 of N chip pulses as an optical pulse 28 to the second optical circulator 22. The second optical circulator 22 in turn feeds the input optical pulse 28 as an optical pulse 30 to the second optical pulse time spreader 20. The second optical pulse time spreader 20 spreads the input optical pulse 30 in time by using its first to N-th unit FBGs. The second optical pulse time spreader 20 then generates a chip pulse train 30 in which the first to N-th chip pulses are spread in time and sequentially arranged on the time axis, and outputs the chip pulse train to the second optical circulator 22.

Each of the first to N-th unit FBGs gives a relative phase equal to zero to the first chip pulse in the chip pulse train 30. Furthermore, each of the first to N-th unit FBGs gives a relative phase equal to $2\times d_2$ ($=2\pi(a+(1/N))$) to the second chip pulse. Likewise, each of the first to N-th unit FBGs gives a relative phase equal to $2\times(N-1)d_2$ ($=2\pi(a+(1/N))\times(N-1)$) to the N-th chip pulse. The second optical circulator 22 outputs the generated chip pulse train 30 of N chip pulses as an optical pulse 32 to the third optical circulator 22.

Correspondingly, the (n−1)-th optical circulator 22, although not shown in the figure, outputs a generated chip pulse train of N chip pulses as an optical pulse 34 to the n-th optical circulator 22. The n-th optical circulator 22 then outputs the optical pulse 34 to the n-th optical pulse time spreader 20. The n-th optical pulse time spreader 20 spreads the input optical pulse 34 in time by using its first to N-th unit FBGs. The n-th optical pulse time spreader 20 then generates a train of chip pulses 36 in which the first to N-th chip pulses are spread in time and arranged on the time axis, and outputs the chip pulse train to the n-th optical circulator 22.

The first to N-th FBGs generates the input optical pulse train 36 as the first to N-th chip pulses 36 which are spread in time and sequentially arranged on the time axis. The generated chip pulse train 36 is sent as an optical pulse 38 via the n-th optical circulator 22 to the (n+1)-th optical circulator 22.

Each of the first to N-th unit FBGs gives a relative phase equal to zero to the first chip pulse in the chip pulse train 36.

Furthermore, each of the first to N-th unit FBGs gives a relative phase equal to $2 \times d_n$ ($=2\pi\{a+(n-1)/N\}$) to the second chip pulse. Likewise, each of the first to N-th unit FBGs gives a relative phase equal to $2\times(N-1)d_n$ ($=2\pi\{a+(n-1)/N\}\times(N-1)$)) to the N-th chip pulse.

Last of all, the s-th optical circulator 22 is supplied from the (s−1)-th optical circulator 22 with an optical pulse 40. The s-th optical circulator 22 outputs the input chip pulse 40 as an optical pulse 42 to the s-th optical pulse time spreader 20. The s-th optical pulse time spreader 20 spreads the input optical pulse 42 in time by using its first to N-th unit FBGs. The s-th optical pulse time spreader 20 then generates a chip pulse train 42 in which the first to N-th chip pulses are spread in time and sequentially arranged on the time axis, and outputs the chip pulse train to the s-th optical circulator 22.

The first to N-th FBGs generates the input optical pulse train 42 as the first to N-th chip pulses 42 which are spread in time and sequentially arranged on the time axis. The generated chip pulse train 42 is sent as an optical pulse 44 via the s-th optical circulator 22.

Each of the first to N-th unit FBGs gives a relative phase equal to zero to the first chip pulse in the chip pulse train 42. Furthermore, each of the first to N-th unit FBGs gives a relative phase equal to $2\times d_s$ ($=2\pi\{a+(s-1)/N\}$) to the second chip pulse. Likewise, each of the first to N-th unit FBGs gives a relative phase equal to $2\times(N-1)d_s$ ($=2\pi\{a+(s-1)/N\}\times(N-1)$)) to the N-th chip pulse.

Reflectivities $R_1$ to $R_N$ of the first to N-th unit FBGs included in the first to s-th optical pulse time spreaders are defined as below.

The first to N-th unit FBGs are configured, in the case where the parameter N is an odd number, such that the reflectivities in the unit FBGs monotonically increases in the order of reflectivity $R_1$ to reflectivity $R_{\{(1/2)(N+1)\}}$ while monotonically decreasing in the order of reflectivity $R_{\{(1/2)(N+1)\}}$ to reflectivity $R_N$. Furthermore, in the case where the parameter N is an even number, the first to N-th unit FBGs are configured such that the reflectivities thereof monotonically increases in the order of reflectivity $R_1$ to reflectivity $R_{N/2}$ and monotonically decreases in the order of reflectivity $R_{\{(N/2)+1\}}$ to reflectivity $R_N$ to thereby equalize the degrees of the reflectivity $R_{N/2}$ with that of the reflectivity $R_{\{(N/2)+1\}}$.

Figure 8B:
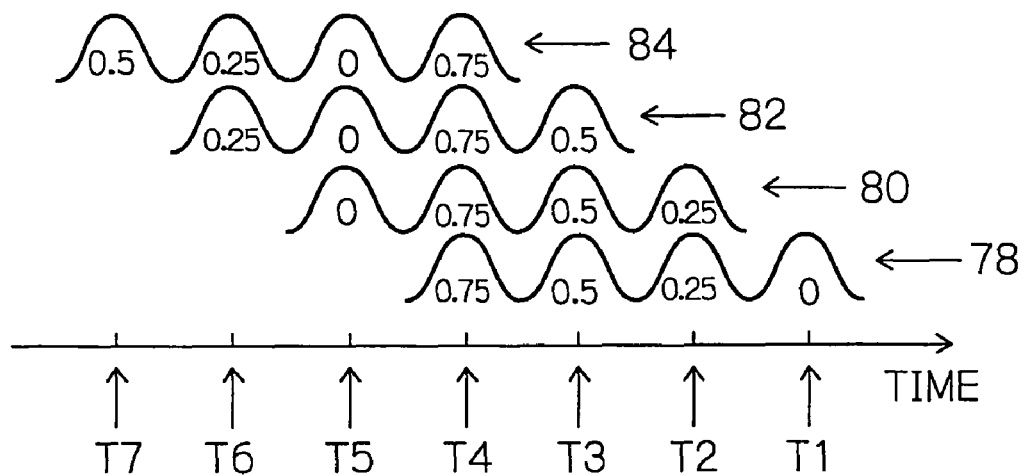
FIG. 8B shows the temporal waveforms of chip pulses reflected by four unit FBGs arranged on the receiving end SSFBG in FIG. 8A.

Next, with reference to FIGS. 8A, 8B and 8C, a description will be made on the principle of the optical pulse time spreader 20 in the optical pulse time spreading apparatus 18 for generating a chip pulse train and restoring an optical pulse from the chip pulse train. The optical pulse time spreading apparatus 18 of the illustrative embodiment comprises, as shown in FIG. 8A, the optical circulators 22 on its transmitting and receiving ends as well as an optical pulse time spreader 20 on its transmitting end and another optical pulse time spreader 20 on its receiving end. As shown in FIG. 8A, if the optical pulse time spreader 20 on the transmitting end of the apparatus has the parameters N=4 and a=¼, four unit FBGs 48, 50, 52 and 54 are included in an encoder of the optical fiber 16 or in an SSFBG 46 of the chip pulse converter, and reflectivity of each FBG is defined to satisfy the relationship of reflectivities of $(R_1 < R_2)$, $(R_2 = R_3)$ and $(R_3 > R_4)$. The optical pulse time spreader 20 on the receiving end includes four unit FBGs 58, 60, 62 and 64 in an SSFBG 56 serving as a decoder or optical pulse restoring device in the optical fiber 16.

The transmitting end optical circulator 22 is fed with an optical pulse 66. The transmitting end optical circulator 22 in turn outputs the optical pulse 66 as an optical pulse 68 to the encoder SSFBG 46. The encoder SSFBG 46 reflects the optical pulse 68 by means of the unit FBGs 48, 50, 52 and 54 to thereby generate chip pulses 70, 72, 74 and 76. Note that a transmitting end optical circulator 22 described later in relation to FIG. 9A also comprises constituent elements that have the same relationship as the above optical circulator. Furthermore, the decoder SSFBG 56 uses four unit FBGs 58, 60, 62 and 64 to reflect an optical pulse received from the optical circulator 22 so as to generate chip pulses 78, 80, 82 and 84.

In the illustrative embodiment, the following description will be based on the case where the SSFBG 46 is defined to serve as an encoder while the SSFBG 56 is defined as a decoder. In other words, an optical pulse is encoded by the SSFBG 46, where n=1, of the transmitting end optical pulse time spreader 20 and decoded by the SSFBG 56 of the receiving end optical pulse time spreader 20.

The SSFBG 46 shown in FIG. 8A comprises four unit FBGs 48, 50, 52 and 54 disposed in the wave-propagating direction of an optical fiber. The SSFBG 46 uses the unit FBGs 48, 50, 52 and 54 to generate Bragg-reflected light 70, 72, 74 and 76 as N (=4) chip pulse arranged on the time axis, and then spreads the chip pulses in time into a train of chip pulses 70, 72, 74 and 76 to return the train to the optical circulator 22. The transmitting end optical circulator 22 then transmits to the receiving end optical circulator 22 an optical pulse 86 as a train of chip pulses 70, 72, 74 and 76.

More specifically, the transmitting end optical pulse time spreader 20 in the illustrative embodiment is defined as a=0.25, n=1 and N=4. The SSFBG 46 therefore gives a relative phase equal to zero to the chip pulse 70 present at the forefront on the time axis. The SSFBG 46 also gives to the chip pulse 72 a relative phase equivalent to $2\pi\{a+(n-1)/N\}$. Consequently, the phase given to the chip pulse 72 can be presented by $2\pi\{a+(n-1)/N\}=2\pi(0.25+(1-1)/4)=2\pi\times 0.25$, so that the value of the relative phase of the chip pulse 72 can be indicated as 0.25 with $2\pi$ omitted.

Likewise, a relative phase given to the chip pulse 74 is $2\pi\{a+(n-1)/N\}\times 2=2\pi(0.25+(1-1)/4)\times 2=2\pi\times 0.25\times 2=2\pi\times 0.5$, so that the value of the relative phase is 0.5 with $2\pi$ omitted. Furthermore, a relative phase given to the chip pulse 76 is $2\pi\{a+(n-1)/N\}\times 3=2\pi(0.25+(1-1)/4\times 3=2\pi\times 0.25\times 3=2\pi\times 0.75$, so that the value of the relative phase is 0.75 with $2\pi$ omitted. Consequently, the sequence of relative phases set in each unit FBG constituting the SSFBG 46 of the transmitting end optical pulse time spreader 20 is (0, 0.25, 0.5, 0.75). In the following description, the form $\{a+(n-1)/N\}$, where $2\pi$ is dropped, will be referred to as a minimum unit of relative phase.

The SSFBG 56 of the receiving end optical pulse time spreader 20 has a configuration that can perform modulation with the same refractive index as in the SSFBG 46 as shown in FIG. 8A. Moreover, the refractive index of the input/output end of the SSFBG 56 is set to the same relationship as the SSFBG 46. It is different from the relationship between the conventional encoder and decoder that use SSFBGs in which codes are set. In other words, the sequence of codes set in the input/output end of the conventional encoder is in reverse order to that of the conventional decoder.

The sequence of relative phases set in each unit FBG of the SSFBG 56 of the receiving end optical pulse time spreader 20 is (0, 0.5, 1, 1.5). That is, in the receiving end optical pulse time spreader 20, the parameter a is 0.25, n is 2 and N is 4, and therefore the SSFBG 56 gives a relative phase equal to zero to the chip pulse 78 present at the forefront on the time axis. The SSFBG 56 also gives to the chip pulse 80 a relative phase equivalent to $2\pi\{a+(n-1)/N\}$. Consequently, a phase given to the chip pulse 80 can be presented by $2\pi\{a+(n-1)/N\}=2\pi(0.25+(2-1)/4)=2\pi(0.25+0.25)=2\pi\times 0.5$, so that the value of the relative phase of the chip pulse 80 can be indicated as 0.5 with $2\pi$ omitted. Likewise, a phase given to the chip pulse 82 is $2\pi\{a+(n-1)/N\}\times2=2\pi(0.25+(2-1)/4)\times2=2\pi(0.25+0.25)\times2=2\pi\times0.5\times2\pi\times1$, so that the value of the relative phase is 1 with $2\pi$ omitted. Furthermore, a phase given to the chip pulse 84 is $2\pi\{a+(n-1)/N\}\times3=2\pi(0.25+(2-1)/4)\times3=2\pi(0.25+0.25)\times3=2\pi\times0.5\times3=2\pi\times1.5$, so that the value of the relative phase is 1.5 with $2\pi$ omitted.

As mentioned above, as the constant $\lambda$ or $2\pi$ is omitted, the value 1 represents one cycle. This leads to the phase value "0" and "1" meaning the same phase. Hence, the sequence of relative phases set in the unit FBGs of the SSFBG of the receiving end optical pulse time spreader 20 is (0, 0.5, 1, 1.5)=(0, 0.5, 0, 0.5). In the following description, a relative phase value is indicated with a real number not less than zero but below one.

In this way, the optical pulse 66 is encoded to a chip pulse 86 by the encoder SSFBG 46, and the chip pulse 86 is supplied to the optical circulator 22 on the receiving end. Through the receiving end optical circulator 22 supplied is an optical pulse 88 which is then converted by the decoder SSFBG 56 into an optical pulse 90 and output by the optical circulator 22. Now the formation process of a time-spread chip pulse train or the optical pulse 88 by the SSFBG 56 will be described about an autocorrelation wave.

The unit FBGs 48, 50, 52 and 54 of the SSFBG 46 produce Bragg-reflected light 70, 72, 74 and 76, respectively. The produced reflected light 70, 72, 74 and 76 are transmitted to the decoder in the form of four chip pulses, i.e. a train of time-spread optical pulses 70, 72, 74 and 76 illustrated in FIG. 8A along the time axis above the optical fiber 86 which is a transmission path between the encoder and decoder. As described, a train of chip pulses is a chip pulse train obtained by spreading in time an optical pulse input to an encoder into a plurality of chip pulses.

The relative phase values of the train of chip pulses or Bragg-reflected light 70, 72, 74 and 76 in the illustrative embodiment is (0, 0.25, 0.5, 0.75). The phase difference between the reflected light 70 and 72 is 0.25. Similarly, the phase differences between the reflected light 72 and 74 and reflected light 74 and 76 are also 0.25.

The chip pulse train 86 output from the optical circulator 22 on the transmitting end is fed via the optical circulator 22 on the receiving end to the decoder SSFBG 56. The SSFBG 56 has the same configuration as the SSFBG 46, and the input/output end of the SSFBG 56 close to the optical circulator also has the same configuration as the input/output end of the SSFBG 46. In other words, the unit FBGs 58, 60, 62 and 64 sequentially disposed from the input/output end side of the SSFBG 56 is identical with the unit FBGs 48, 50, 52 and 54 sequentially disposed from the input/output end side of the SSFBG 46.

FIG. 8B shows a train of chip pulses 78, 80, 82 and 84 generated through Bragg reflection by the unit FBGs 58, 60, 62 and 64. In the figure, the horizontal axis denotes the time and indicates the progress of time as time points T1 to T7 for descriptive purpose. In this figure, the smaller values of the time points represent older time points in connection with the waveforms of the chip pulses 78, 80, 82 and 84.

The chip pulse train 88 input to the decoder SSFBG 56 is firstly reflected by the unit FBG 58. The light reflected by the unit FBG 58 is expressed as Bragg-reflected light 78. Correspondingly, the light reflected by the unit FBGs 60, 62 and 64 are expressed as the reflected light 80, 82 and 86, respectively.

When the train of chip pulses 70, 72, 74 and 76 are reflected by the unit FBG 58, the chip pulse train 78 aligned on the time axis shown in FIG. 8B can be obtained. In this figure, the chip pulse 70 reflected by the unit FBG 58 is an optical pulse having its peak at time T1 on the time axis. Likewise, the chip pulse 72 reflected by the unit FBG 58 is an optical pulse having its peak at time T2, and the chip pulses 74 and 76 reflected by the unit FBG 58 are optical pulses having their peaks at the times T3 and T4, respectively.

The unit FBG 60 also reflects the optical pulses 70, 72, 74 and 76, which constitute a chip pulse train, thereby producing a chip pulse train 80 aligned on the time axis shown in FIG. 8B. The reflected light 80 thus reflected by the unit FBG 60 becomes greater than the reflected light 78 by 0.25. Thus, in comparison with the chip pulse train 78 on the time axis, the relative phase of each chip pulse of the chip pulse train 80 on the time axis becomes larger by 0.25. That is, the relative phase of the chip pulse train 78 shifts from right to left as (0, 0.25, 0.5, 0.75), whereas the relative phase of the chip pulse train 80 is incremented from right to left by 0.25 so as to be (0.25, 0.5, 0.75, 0).

Note that, when the relative phase is simply incremented by 0.25, the relative phase values of the chip pulse train 80 should be (0.25, 0.5, 0.75, 1). However, the last fourth phase value is not one but zero, because the relative phase value zero is equivalent to the value one in terms of phase.

The relative phase of the chip pulse train 82 is similarly incremented by adding 0.5 to the phase values (0, 0.25, 0.5, 0.75) of the chip pulse train 78, i.e. the value shifts (0.5, 0.75, 0, 0.25) which is equal to (0.5, 0.75, 1, 1.25). Furthermore, the relative phase of the chip pulse train 84 on the time axis is incremented by adding 0.75 to the phase values (0, 0.25, 0.5, 0.75) of the chip pulse train 78, i.e. the phase values are (0.75, 0, 0.25, 0.5) which are equal to (0.75, 1, 1.25, 1.5).

Figure 8C:
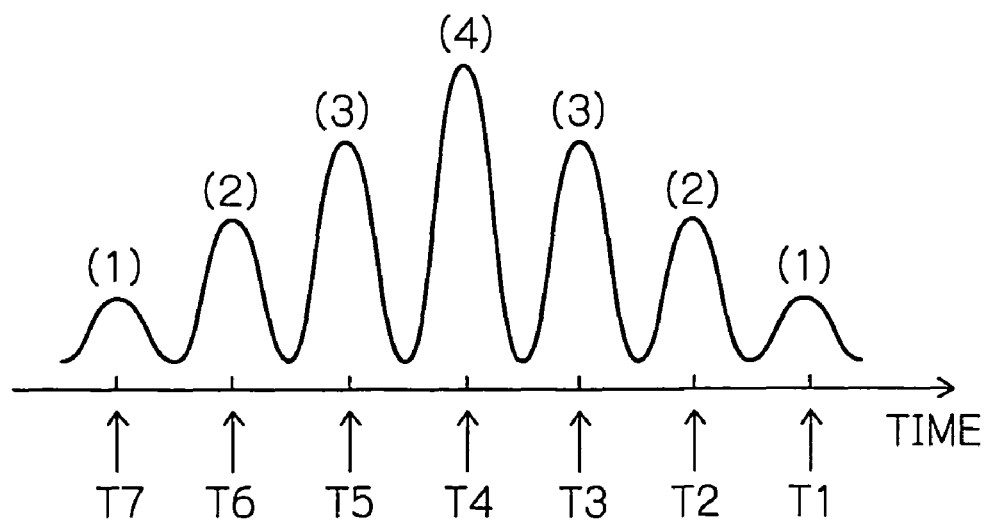
FIG. 8C shows the temporal waveform of an autocorrelation wave of an input optical pulse generated by the SSFBG in FIG. 8A.

FIG. 8C shows an autocorrelation waveform indicative of an input optical pulse restored by the SSFBG 56. In this figure, the horizontal axis denotes the time axis, which is identical with the time axis shown in FIG. 8B. An autocorrelation wave is obtained from the reflected light 78, 80, 82 and 84 output from the unit FBG of the SSFBG 56 in such a way that the reflected light 78, 80, 82 and 84 in FIG. 8B are added up. The optical pulse related to the Bragg-reflected light 78, 80, 82 and 84 has its maximum peak at time T4 shown in FIG. 8C because the chip pulses in the identical phase level are combined at time T4. The chip pulses having the same phase are superimposed on one another at times other than time T4, but the number of pulses overlaid at other times is less than four, which is smaller than the number of pulses in the maximum peak at time T4.

In this way, the optical pulse 66 is spread in time in the SSFBG 46 and converted into the chip pulse train 86, and the chip pulse train 86 is delivered to the SSFBG 56 so as to generate the autocorrelation wave 88. The illustrative embodiment is directed to the 4-bit relative phase (0, 0.25, 0.5, 0.75), but is not limited thereto. The above description can be effected by applying different types of relative phase.

In the mechanism for generating an autocorrelation wave illustrated in FIG. 8C, it is explicable that the peak waveform in the position at time T1 is formed from the Bragg-reflected light 78 which is comprised of the chip pulse 70 reflected by the unit FBG 48. Thus, the amplitude of the peak waveform appearing at time T1 is equal to the amplitude of the chip pulse.

The peak waveform appearing at time T2 is the sum of the Bragg-reflected light 80 of the chip pulse 72 reflected by the unit FBG 48 and the Bragg-reflected light 78 of the chip pulse 70 reflected by the unit FBG 60. The sum of both light corresponds to the sum of the optical chip pulses, each having the relative phase value of 0.25, so that the amplitude of the peak waveform at time T2 is twice as large as the amplitude of the chip pulse.

Likewise, the amplitudes of peak waveforms appearing at times T3 through T7 represent peak waveforms produced by the same mechanism as the above. Accordingly, the amplitude of each waveform varies by factors of 3, 4, 3, 2 and 1 with respect to the amplitude of respective chip pulses. In FIG. 8C, the magnitude of the amplitudes of the peak waveforms comparing to the amplitudes of the chip pulses is indicated by the numerical values in parentheses above the corresponding peak positions. The sum of the amplitudes of the peak waveforms sequentially added up from the peak waveform at time T1 to the peak waveform at time T7 is 1+2+3+4+3+2+1=16. By converting the sum of the amplitudes into an energy equivalent, the energy of the sum of the peak waveforms is 256 times, equal to $16^2$ times, as high as the energy of one chip pulse. That is, the gross energy of the autocorrelation wave is 256 times as high as the energy of one chip pulse.

As described, the illustrative embodiment employs the unit FBGs of the SSFBG 46 serving as an encoder and of the SSFBG 56 serving as a decoder having the same relative phases, i.e. the SSFBG 46 executes the time-spreading to generate a train of chip pulses and the SSFBG 56 generates an autocorrelation wave from the obtained chip pulse train. The invention is however not limited thereto, but the SSFBG serving as the encoder and the SSFBG serving as the decoder may have codes set which are different from each other.

Figure 9B:
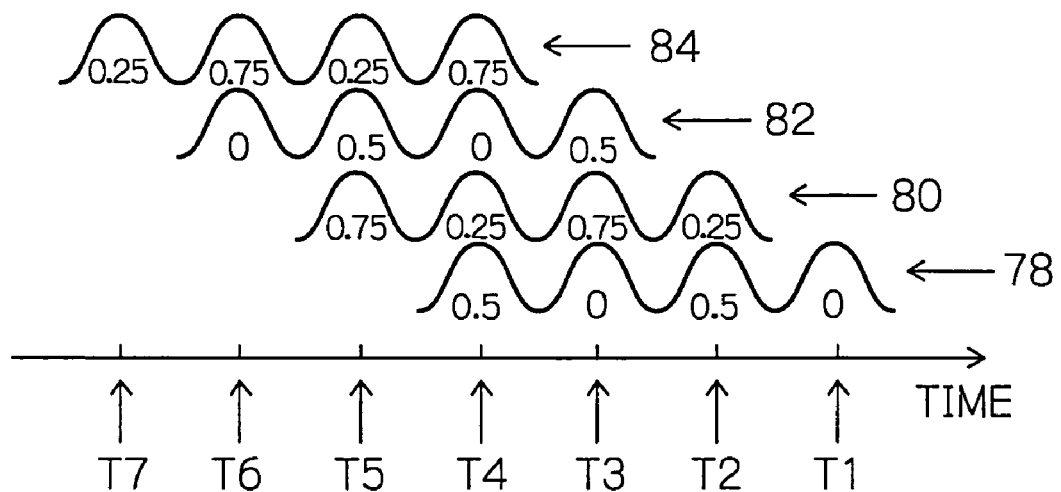
FIG. 9B shows the temporal waveforms of chip pulses reflected by four unit FBGs arranged on the receiving end SSFBG in FIG. 9A.

Next, a description will be made on an alternative embodiment of the present invention with reference to FIGS. 9A, 9B and 9C, in which an SSFBG working as an encoder and an SSFBG working as a decoder have codes which are different from each other. The optical pulse time spreader 20 of the optical pulse time spreading apparatus 18 is provided with, as shown in FIG. 9A, a set of the SSFBGs 46 and 56 which have different refractive index modulation structures.

The set of SSFBGs 46 and 56 comprises a set of unit FBGs 92, 94, 96, 98 and unit FBGs 78, 80, 82, 84. The unit FBGs 92, 94, 96 and 98 correspond to the first chip 70, second chip 72, third chip 74 and fourth chip 76 of an optical phase code, respectively.

When an optical pulse 68 enters the SSFBG 46, the unit FBGs 92, 94, 96 and 98 generate the Bragg-reflected light 70, 72, 74 and 76, respectively, to form a chip pulse train 68. The chip pulse train 68 is sent to an optical circulator 22 on a transmitting end. In the alternative embodiment, the relative phases of the chip pulse train 68 are 0, 0.5, 0 and 0.5. It can be expressed in a sequence of relative phase values as (0, 0.5, 0, 0.5). Such values are given when the SSFBG 46 has the parameters n=2, N=4 and a=0.25. In other words, the minimum unit of relative phase $a+(n-1)/N$ is $a+(n-1)/N=0.25+(2-1)/4=0.5$.

Correspondingly, the SSFBG 56 has the above-described parameters, i.e. n=1, N=4 and a=0.25, thereby producing the Bragg-reflected light 78, 80, 82 and 84. Consequently, the sequence of relative phase values of the reflected light 78, 80, 82 and 84 is (0, 0.25, 0.5, 0.75). The minimum unit of relative phase is $a+(n-1)/N$ is $a+(n-1)/N=0.25+(1-1)/4=0.25$. Thus, the sequence of relative phase values set in the set of unit FGBs of the SSFBG 56 is given in the sequence of (0, 0.25, 0.5, 0.75).

In FIG. 9A, the single optical pulse 66 is input to the input/output end optical circulator 22. The optical circulator 22 then sends out the optical pulse 66 as an optical pulse 68 to the encoder SSFBG 46. The SSFBG 46 in turn produces Bragg-reflected light 68 by the unit FBGs 92, 94, 96 and 98. At this time, the reflected light 68 is converted into a train of time-spread chip pulses.

The relative phases of the reflected light 70, 72, 74 and 76 constituting the chip pulse train are shown with the values (0, 0.5, 0, 0.5) in FIG. 9A. The phase difference between the reflected light 70 and 72 is 0.5. The phase differences between the reflected light 72 and 74 and between the light 74 and 76 are also equal to 0.5.

The optical circulator 22 on the receiving end receives a transmitted chip pulse train 86 and outputs it to the SSFBG 56. The SSFBG 56 reflects the chip pulse train 86 by means of the aforementioned constituent elements, and then sends out the reflected chip pulse train 86 to the receiving end optical circulator 22. The receiving end optical circulator 22 outputs the reflected chip pulse train 86 in the form of cross-correlation wave 90.

More specifically, as shown in FIG. 9B, the SSFBG 56 with the parameter N=4 reflects the input pulse train by the unit FBGs 58, 60, 62 and 64 to generate chip pulses 78, 80, 82 and 84. In FIG. 9B, the horizontal axis is the time axis and indicates the progress of time as time points T1 to T7 for descriptive purpose. Time points having a smaller value indicated represent more prior time.

The chip pulses 70, 72, 74 and 76 in the chip pulse train are reflected by the unit FBG 58, and thereby the chip pulse train 78 can be obtained. The chip pulse 70 is an optical pulse having its peak at time T1 on the time axis. Furthermore, the chip pulse 72 reflected by the unit FBG 58 is an optical pulse having its peak at time T2. Likewise, the chip pulses 74 and 76 reflected by the unit FBG 58 are optical pulses having their peaks at times T3 and T4, respectively.

The unit FBG 60 also reflects the optical pulses 70, 72, 74 and 76, which constitute a chip pulse train, thereby producing a chip pulse train 80. The reflected light 80 thus reflected by the unit FBG 60 becomes greater than the reflected light 78 by 0.25. Thus, in comparison with the chip pulse train 78, the relative phase of each chip pulse of the chip pulse train 80 becomes larger by 0.25. That is, the relative phase of the chip pulse train 78 shifts from right to left as (0, 0.5, 0.0, 0.5), whereas the relative phase of the chip pulse train 80 is incremented from right to left by 0.25 so as to be (0.25, 0.75, 0.25, 0.75).

Similarly, the relative phase of the chip pulse train 82 is incremented by adding 0.5 to the phase values (0, 0.5, 0, 0.5) of the chip pulse train 78, i.e. the value shifts (0.5, 0, 0.5, 0). Furthermore, the relative phase of the chip pulse train 84 is incremented by adding 0.75 to the phase values (0, 0.5, 0, 0.5) of the chip pulse train 78, i.e. the phase values are (0.75, 1.25, 0.75, 1.25) which are equal to (0.75, 0.25, 0.75, 0.25).

Figure 9C:
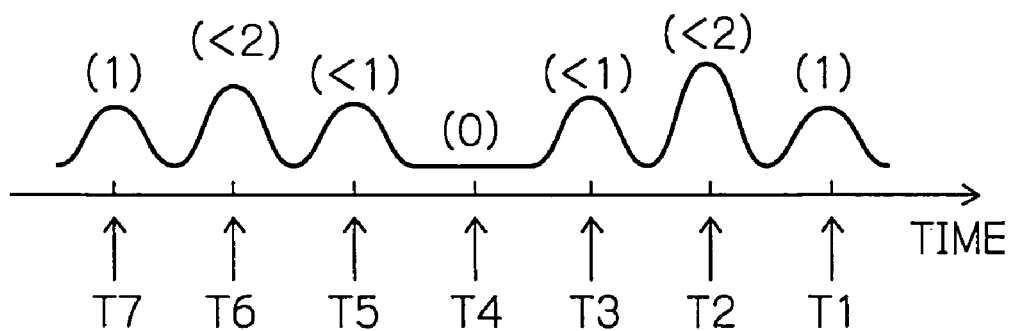
FIG. 9C shows the temporal waveform of a cross-correlation wave of an input optical pulse generated by the SSFBG in FIG. 9A.

FIG. 9C shows a cross-correlation waveform indicative of an input optical pulse restored by the SSFBG 56. As in FIG. 9B, the horizontal axis is the time axis. A cross-correlation wave is obtained from the light 78, 80, 82 and 84 reflected from the unit FBGs of the SSFBG 56. Therefore, the cross-correlation wave is obtained by combining all the reflected light 78, 80, 82 and 84.

Since the peak waveform at time T1 is formed from the rightmost chip pulse in the reflected light 78, the amplitude thereof is equal to that of one chip pulse. The peak waveform at time T2 is formed by adding the second right chip pulse in the reflected light 78 to the rightmost chip pulse in the reflected light 80. In this case, the phases of the former and latter chip pulses are 0.5 and 0.25, respectively. Thus, the amplitude of the peak waveform produced from the sum of both pulses is smaller than the value corresponding to the simply added amplitudes of two chip pulses "(<2)".

By the same token, the peak waveform at time T3 has a smaller amplitude than that of one chip pulse, and the peak waveform at time T5 also has a smaller amplitude than that of one chip pulse. At time T6, the amplitude of the peak waveform becomes smaller than the amplitudes of two chip pulses.

Furthermore, the amplitude of the waveform at time T4 becomes zero because the chip pulses, thus overlaid, are set off. At time T7, the peak waveform is obtained from the leftmost chip pulse in the reflected light 84, so that the amplitude thereof is equivalent to that of one chip pulse.

In FIG. 9C, the magnitude of the amplitudes of the peak waveforms comparing to the amplitudes of the chip pulses is indicated in the parentheses above the corresponding peak positions. The sum of the amplitudes of the peak waveforms sequentially added up from the peak waveform at time T1 to the peak waveform at time T7 is smaller than 1+2+1+0+1+2+1=8. By converting the sum of the amplitudes into an energy equivalent, the gross energy of the cross-correlation wave takes a value 64 times, equal to $8^2$ times, smaller than the energy of one chip pulse.

In the first embodiment described earlier with reference to FIG. 1, when an optical pulse is spread by the transmitting end optical pulse time spreader 20 and then decoded by the receiving end optical pulse time spreader 20, the energy of an autocorrelation wave becomes 256 times as high as the energy of one chip pulse. In contrast to this, when an optical pulse is spread by the transmitting end optical pulse time spreader 20 of the alternative embodiment and decoded by the optical pulse time spreader 20 of the first embodiment, the energy of a cross-correlation wave becomes 64 times as high as the energy of one chip pulse. If an optical pulse is spread and decoded by a transmitting end optical pulse time spreader 20 and a receiving end optical pulse time spreader 20 having the same conditions, the energy of an autocorrelation wave becomes 4=256/64 times as high as the energy of a cross-correlation wave. In addition, as shown in FIG. 8C, the peak intensity of the autocorrelation wave is four times as high as the intensity of one chip pulse, so that the energy of the autocorrelation wave is 16 times as high as the energy of one chip pulse. On the contrary, as shown in FIG. 9C, the peak intensity of the cross-correlation wave is zero.

The above evaluations of the magnitude of the energy of the autocorrelation and cross-correlation waves were made under the condition that all unit FBGs have one and the same reflectivity. As described below, the reflectivity modulation of each unit FBG, which is a remarkable feature of the present invention, further increases the energetic ratio (S/N ratio) between the energy of the autocorrelation wave and cross-correlation wave.

In the following, a generalization will be made on an effect produced by apodizing unit FBGs, in which the number of unit FBGs contained in an optical pulse time spreader 20 is assumed to be N. The optical pulse time spreading apparatus 18 includes the optical pulse time spreader 20. The optical pulse time spreader 20 is configured such that if N is an odd number, the reflectivities $R_1$ to $R_N$ of the respective first to N-th unit FBGs are $R_1<R_2<R_3, \ldots <R_{\{(1/2)(N+1)\}}, R_{\{(1/2)(N+1)\}}> \ldots >R_N$. Furthermore, if N is an even number, the reflectivities $R_1$ to $R_N$ of the respective first to N-th unit FBGs are set to be $R_1<R_2<R_3 \ldots, <R_{N/2}, R_{N/2}=R_{\{(N/2)+1\}}, R_{\{(N/2)+1\}}> \ldots >R_N$. Thus, the intensity of reflection gets weaker where closer on the time axis to both ends of a chip pulse train output from the optical pulse time spreader 20.

In the optical pulse time spreader 20 having the encoding function, a phase difference between adjacent chip pulses is given by $2\pi\{a+(e-1)/N\}$. Additionally, in the optical pulse time spreader 20 having the decoding function, a phase difference between adjacent chip pulses is given by $2\pi\{a+(f-1)/N\}$. The parameters e and f are integers ranging from 1 to s, inclusive, and the integer s satisfies the condition $s \leq N$.

In the encoder, the phase of a chip pulse generated by the p-th unit FBG in relation to the phase of a chip pulse generated by the first unit FBG is $2\pi\{a+(e-1)/N\}\times(p-1)$. Correspondingly, in the decoder, the phase of a chip pulse generated by the q-th unit FBG in relation to the phase of a chip pulse generated by the first unit FBG is $2\pi\{a+(f-1)/N\}\times(q-1)$. The parameters p and q are integers that satisfy the respective conditions $1 \leq p \leq N$ and $1 \leq q \leq N$.

On the above conditions, the phase of a chip pulse produced by the p-th unit FBG of the encoder and decoded by the q-th unit FBG of the decoder is given by an expression (1).

$$2\pi\{a+(e-1)/N\}\times(p-1)+2\pi\{a+(f-1)/N\}\times(q-1) \quad (1)$$

The reflectivity in the p-th unit FBG of the encoder is set to $R_p$, while the reflectivity in the q-th unit FBG of the decoder is set to $R_q$. Description will be made with the light intensity of an optical pulse input to the encoder normalized as unity. The intensity of the chip pulse encoded by the p-th unit FBG and decoded by the q-th unit FBG is given by the reflectivity $R_p \times R_q$.

If a time interval of the chip pulse output from the encoder and decoder is set to $\tau$, then the delay time of the chip pulse generated by the p-th unit FBG with respect to the chip pulse generated by the first unit FBG in the encoder is expressed by $(p-1)\tau$. Correspondingly, the delay time of the chip pulse generated by the q-th unit FBG with respect to the chip pulse generated by the first unit FBG in the decoder is expressed by $(q-1)\tau$. In addition, the total delay time occurring in the process where the q-th unit FBG in the decoder generates a chip pulse by reflecting the chip pulse generated by the p-th unit FBG in the encoder is expressed by $(p+q-2)\tau$.

The output chip pulses decoded by the decoder are superimposed on one another on the time axis under a predetermined condition as described above. However, the chip pulses overlaid at the moment of delay time DT on the time axis are a combination of chip pulses satisfying the condition DT=p+q−2. For example, when the delay time DT is 4, (p, q) can be (1, 5), (2, 4), (3, 3), (4, 2) and (5, 1). That is, all of the chip pulses are superimposed on the time axis that are produced by the first unit FBG in the encoder and decoded by the fifth unit FBG in the decoder; produced by the second unit FBG in the encoder and decoded by the fourth unit FBG in the decoder; produced by the third unit FBG in the encoder and decoded by the third FBG in the decoder; produced by the fourth unit FBG in the encoder and decoded by the second unit FBG in the decoder; and produced by the fifth unit FBG in the encoder and decoded by the first unit FBG in the decoder.

Note that it is a matter of design choice to set the time interval $\tau$ of chip pulse to a given value, and the time interval can be any value in principle.

The expression of the delay time DT=p+q−2 can be transformed into an expression q−1=DT−p+1, and thus the expression (1) can be replaced by an expression (2).

$$2\pi\{(e-f)/N\}(p-1)+2\pi\{a+(f-1)/N\}DT \quad (2)$$

Consequently, the phase difference between the chip pulses overlaid at the delay time DT is obtained by the expression (2). As the first term of the expression (2) is $2\pi\{(e-f)/N\}(p-1)$, it proves that the first term does not stand on the delay time DT, whereas the second term of the expression (2) is $2\pi\{a+(f-1)/N\}DT$ so that it proves that the second term stands on the delay time DT. In other words, an absolute phase difference between the reproduced chip pulses is determined by the first term that is independent of the delay time DT.

Since the condition for the generation of autocorrelation wave is that the parameter e is equivalent to the parameter f, the result of the first term of the expression (2) is zero. That is, under the condition for the generation of autocorrelation wave, the chip pulses are superimposed on one another in the same phase at all delay times on the time axis. Therefore, under this condition, the peak intensity of an autocorrelation wave is fundamentally determined regardless of how the reflectivity is defined for the first to N-th unit FBGs included in the first to s-th optical pulse time spreader.

Correspondingly, the condition of the generation of cross-correlation is that the parameter e is not equivalent to the parameter f. Thus, the absolute phase difference given to the first term of the expression (2) is not zero. Consequently, the chip pulses overlaid at the same delay time on the time axis have the different phases. In this case, the pulses are superimposed such that they mutually reduce, i.e. negate their intensity.

The degree of negation is larger where the number of chips is larger and the value of (e−f) of each pulse is closer to N/2. In other words, the closer the value (e−f) to N/2, the weaker the peak intensity of the cross-correlation wave is. It explains that the peak intensity of the chip pulses closer on the time axis to the center of a chip pulse train forming a cross-correlation wave is rendered smaller.

Furthermore, if a difference between the phase difference $2\pi\{a+(e-1)/N\}$ in the chip pulses produced by adjacent unit FBGs of the encoder and the phase difference $2\pi\{a+(f-1)/N\}$ in the chip pulses produced by adjacent unit FBGs of the decoder is close to $\pi$, the peak intensity of the cross-correlation wave gets smaller. More specifically, when the first to s-th optical pulse time spreaders 20 are provided with the first to s-th channels, respectively, the peak intensity of a cross-correlation wave of the channels, of which the channel number difference is closely related to s/2, gets smaller. Thus, the S/N ratio between the channels having this relation is the largest one.

As shown in FIG. 8B or 9B, if the number of chip pulses formed by time-spreading one optical pulse by the encoder is defined as N, the autocorrelation wave or the cross-correlation wave output from the decoder possesses a time range on the time axis which is taken up by 2N−1 chip pulses. By way of example, when the number of unit FBGs of the encoder and decoder optical pulse time spreaders 20 is N, the use of these optical pulse time spreaders 20 allows the autocorrelation wave or cross-correlation wave output by the decoder to possess the time range on the time axis taken up by 2N−1 chip pulses.

The peaks appearing on both ends of the autocorrelation waveform or cross-correlation waveform on the time axis is formed due to the overlaying of the chip pulses of which the phase difference is not large. However, since the overlay occurs between a small number of chip pulses produced by the unit FBGs having small reflectivity, the amplitude of the waveform will not be large regardless of the increase in intensity of the pulses caused by the interference due to the overlay of the pulses.

By contrast, the peak appearing in the center of the autocorrelation waveform or cross-correlation waveform on the time axis is formed by the interference of the overlay of a large number of chip pulses with different intensity.

For instance, when the difference between the phase difference in the chip pulses produced by the adjacent unit FBGs in the encoder and the phase difference in the chip pulses produced by the adjacent unit FBGs in the decoder is $2\pi/N$, only one pair of chip pulses are superimposed on the time axis with the phase difference $\pi$ and the mutually interfering chip pulses have an intensity difference therebetween, and thereby the reduction of the negation effect by the interference is small. However, when the difference between the phase difference in the chip pulses produced by the adjacent unit FBGs in the encoder and the phase difference in the chip pulses produced by the adjacent unit FBGs in the decoder is $2\times(2\pi/N)$, two pairs of chip pulses are then superimposed on the time axis with the phase difference $\pi$, so that the reduction of the negation effect by the interference is large. Therefore, the intensity of the cross-correlation wave component in total does not change.

As described above, the effect of interference becomes more remarkable when the difference between the phase difference in the chip pulses produced by the adjacent unit FBGs in the encoder and the phase difference in the chip pulses produced by the adjacent unit FBGs in the decoder is closer to $\pi$. Moreover, as in an optical pulse time spreading apparatus described later, even if the difference between the phase difference in the chip pulses produced by the adjacent unit FBGs in the encoder and the phase difference in the chip pulses produced by the adjacent unit FBGs in the decoder is $2\pi/N$, the intensity of the cross-correlation wave component in total is small.

Next, with reference to FIGS. 10 and 11, a description will be made on the effect of improving the S/N ratio by performing apodization in the optical pulse time spreading apparatus 18. The setting of the reflectivity in the first to N-th optical pulse time spreaders of the optical pulse time spreading apparatus 18 is referred to as apodization of optical pulse time spreaders. Similarly, the setting of the reflectivity in the first to N-th unit FBGs is referred to as apodization of reflectivity of unit FBG. When the number of unit FBGs included in the optical pulse time spreader 20 is sixteen, FIG. 10 represents the degrees of reflectivity modulation of the first to sixteenth unit FBGs. FIG. 10 shows on its horizontal axis the number of FBGs indicating the first to sixteenth unit FBGs while showing on its vertical axis the degrees of reflectivity modulation with an arbitrary scale.

In the illustrative embodiment, when the first to sixteenth unit FGBs have an identical reflectivity, the ratio of Fresnel reflection defined due to a difference Δn between the maximum and minimum values of the refractive index of the core of an optical fiber that is the parent body of unit FBGs is set to 1.0 to execute the apodization, the degree of reflectivity modulation is a value denoted by relative numbers of the reflectivity among the first to sixteenth unit FBGs. It means that when the first to sixteenth unit FBGs which are not apodized have the same reflectivity, a difference Δn between the maximum and minimum values of the refractive index of a unit FBG whose degree of reflectivity modulation is smaller than 1.0 is set to be smaller than the difference Δn between the maximum and minimum values of the refractive index of each unit FBG. By contrast, under the condition that the first to sixteenth unit FBGs which are not apodized have the same reflectivity, a difference Δn between the maximum and minimum values of the refractive index of a unit FBG whose degree of reflectivity modulation is larger than 1.0 is set to be larger than the difference Δn between the maximum and minimum values of the refractive index of each unit FBG.

In the optical pulse time spreader, the reflectivity is set to monotonically increase in a linear fashion in the order of the first to eighth unit FBGs and monotonically decrease in a linear fashion in the order of the ninth to sixteenth unit FBGs. FIG. 10 illustrates the intensity of the apodization, i.e. four types of differences in reflectivity between the unit FBG having maximum reflectivity and the unit FBG having minimum reflectivity as well as the reflectivities of the unit FBGs which are not apodized. In the figure, the reflectivity of each unit FBG which is not apodized is indicated with a modulation pattern 100 of white circle. The reflectivity of each unit FBG is indicated, in descending order of the intensity of the apodization, with a modulation pattern 102 of white square, a modulation pattern 104 of black circle, a modulation pattern 106 of white triangle and a modulation pattern 108 of black triangle.

FIG. 11 shows a simulation result of comparing a power ratio between the autocorrelation wave and cross-correlation wave, i.e. S/N ratio when an optical pulse is encoded and decoded by optical pulse time spreaders in which the degree of apodization differs from one another. With regard to the simulation result, the modulation patterns 100 to 108 are presented on the horizontal axis while the power ratio of the autocorrelation wave to the cross-correlation wave is presented on the vertical axis.

The power value in FIG. 11 is based on the cross-correlation wave power in the case where the optical pulse signal is encoded by the first optical pulse time spreader and decoded by the third optical pulse time spreader. The value of the autocorrelation wave power/cross-correlation wave power at the modulation pattern 100 is about 12. By contrast, all values at the modulation patterns 102 to 108 are larger than 12. It proves that the apodization of the difference value Δn in the maximum and minimum refractive indices in the unit FBG enables to increase the value of the autocorrelation wave power/cross-correlation wave power. Moreover, the value of the autocorrelation wave power/cross-correlation wave power at the modulation pattern 106 is the maximum value. It is, however, difficult to generally define an optimum degree of apodization because such a degree is dependent on, e.g. the number of unit FBGs or so. The degree of apodization should be determined on the basis of the number of unit FBGs or the like.

As described above, in FIG. 11, the value of the cross-correlation wave power obtained by encoding the optical pulse signal by the first optical pulse time spreader 20 and decoding the signal by the third optical pulse time spreader 20 is used as the basis for the power. However, if the encoded signal is decoded by the eighth optical pulse time spreader 20 which has the largest difference in the minimum relative phase given by $\{a+(n-1)/N\}$ against the first optical pulse time spreader 20, it is possible to obtain a sufficiently large value of the autocorrelation wave power/cross-correlation wave power without performing the apodization. It is therefore advantageous to execute the apodization on the optical pulse time spreading apparatus 18 used in the first embodiment in accordance with the present invention to carry out the encoding and decoding in the optical pulse time spreaders, which have a small difference in the minimum relative phases between them and cannot obtain a sufficiently large value of the autocorrelation/cross-correlation wave powers.

As shown in FIG. 11, even in the case where the optical pulse signal is encoded by the first optical pulse time spreader and decoded by the third optical pulse time spreader having the small difference in the minimum relative phases against the first optical pulse time spreader, the value of the autocorrelation wave power/cross-correlation wave power can be nearly doubled. That is, in comparison with the autocorrelation wave power/cross-correlation wave power at the modulation pattern 100 whose value is about 12, the value of that at the modulation pattern 106 is about 19.

As described above, in the optical pulse time spreading apparatus 18 in which the apodization is performed on the difference Δn between the maximum and minimum refractive indices in the unit FBGs used in the optical pulse time spreader 20, the energy partition ratio of the component of autocorrelation wave to that of cross-correlation wave can be made larger, and the peak intensity of the autocorrelation wave can also be larger enough than that of the cross-correlation wave.

Next, a description will be made about a further alternative embodiment of the present invention in which an SSFBG acting as an encoder and an SSFBG acting as a decoder are given by different codes from each other. The above description made on the optical pulse time spreaders included in the optical pulse time spreading apparatus in accordance with the first embodiment will be effective if the parameter N denoting the number of unit FBGs is replaced with a parameter jN.

Figure 12:
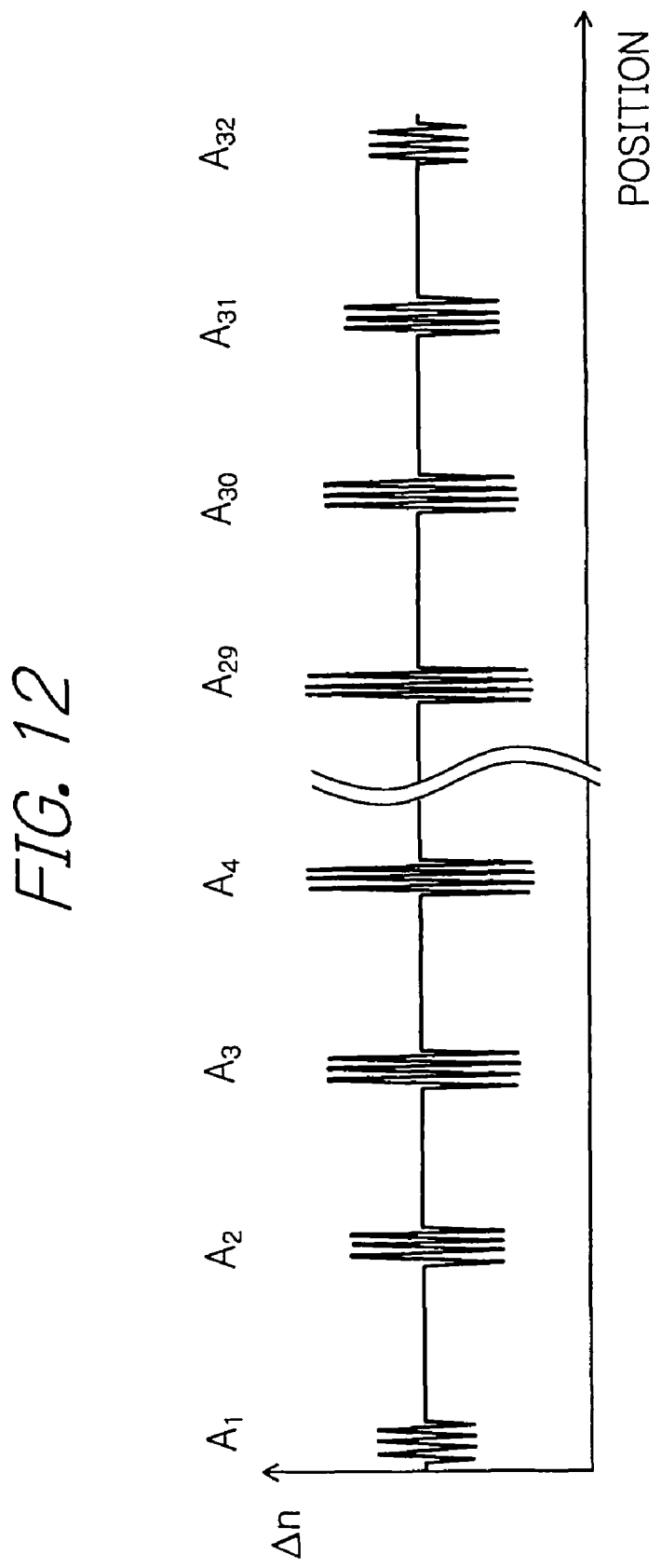
FIG. 12 shows differences Δn between the maximum and minimum refractive index modulations in relation to the positions of unit FGBs in the SSFBG of the optical pulse time spreaders applied in an alternative embodiment of the optical pulse time spreading apparatus in accordance with the invention.

The SSFBG 10 in the further alternative embodiment employs the optical fiber 16 having a cross-sectional structure shown in FIG. 6A. In this embodiment, the SSFBG 10 is adapted to exhibit, as shown in FIG. 12, a difference Δn between the maximum and minimum in refraction index modulation of the core 12 in the optical fiber 16 on the vertical axis with respect to the position coordinate in the longitudinal direction of the optical fiber 16 on which the SSFBG is formed on the horizontal axis. By contrast to the number of unit FBGs in the previously described embodiment which was 16, the number of unit FBGs in the present alternative embodiment is set to 32 by doubling them for two cycles. The refractive index modulation of the core 12 in the optical fiber 16 is similar to that shown in FIG. 6C.

Figure 13:
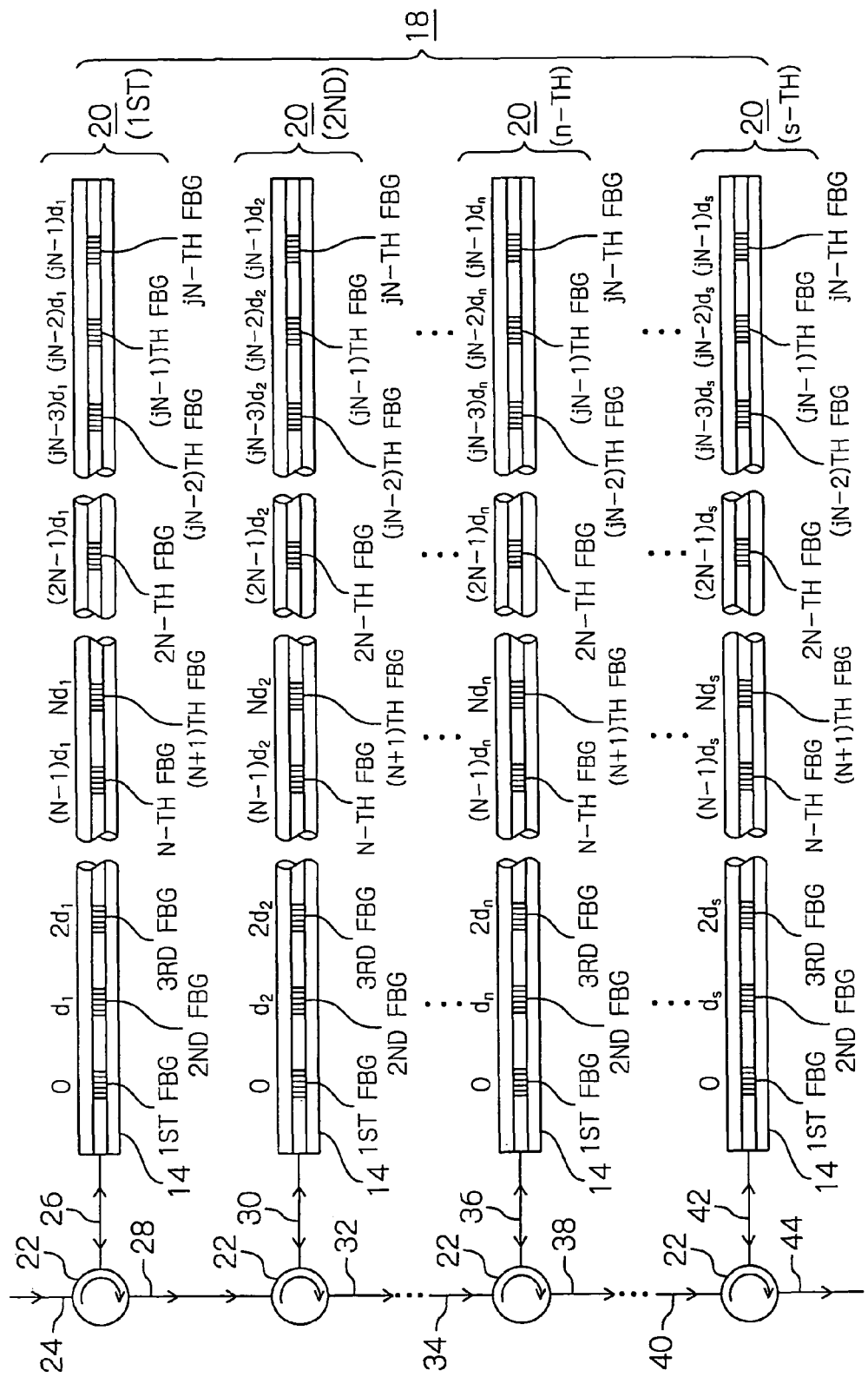
FIG. 13 is a schematic block diagram showing an optical pulse time spreader applied in the alternative embodiment of the optical pulse time spreading apparatus in accordance with the invention.

The optical pulse time spreading apparatus 18 in this embodiment includes as shown in FIG. 13 the first, second, . . . , n-th, . . . and s-th optical pulse time spreaders 20. Each optical pulse time spreader 20 includes the first to jN-th unit FBGs. The first to jN-th unit FBGs correspond to the first to jN-th phase controllers, respectively. Furthermore, the first to jN-th unit FBGs are disposed in the sequential order starting from the input/output end side of each optical pulse time spreader 20 to which an optical circulator 22 is connected. In the figure, the unit FBGs are indicated in abbreviated form, i.e. the first FBG to the jN FBG.

Now, the operation of the optical pulse time spreading apparatus 18 will be described simplistically. An optical pulse 24 enters the optical circulator 22. The optical circulator 22 supplies the first optical pulse time spreader 20 with the input optical pulse 24 as an optical pulse 26. The optical pulse 26 is spread in time into a chip pulse train 26 in which the first to jN-th chip pulses are sequentially arranged on the time axis. The optical circulator 22 then outputs the chip pulse train 26 as an optical pulse 28. The optical chip pulse time spreader 20 gives a relative phase equal to zero to the first chip pulse in the chip pulse train 26. Also, a relative phase equal to $2 \times d_1 = 2\pi a$ is given to the second chip pulse. Likewise, a relative phase equal to $2 \times (N-1)d_1$ is given to the N-th chip pulse. Furthermore, the optical chip pulse time spreader 20 gives a relative phase equal to $2 \times (jN-3)d_1$ to the (jN−3)-th chip pulse, a relative phase equal to $2 \times (jN-2)d_1$ to the (jN−2)-th chip pulse, and a relative phase equal to $2 \times (jN-1)d_1$ to the (jN−1)-th chip pulse.

The second optical pulse time spreader 20 spreads an optical pulse 30 in time into a chip pulse train 30 in which the first to jN-th chip pulses are sequentially arranged on the time axis. A second optical circulator 22 then outputs the chip pulse train 30 as an optical pulse 32. The optical chip pulse time spreader 20 gives a relative phase equal to zero to the first chip pulse in the chip pulse train 30. The optical chip pulse time spreader 20 also gives a relative phase equal to $2 \times d_2$ ($=2\pi(a+(1/N))$) to the second chip pulse. Likewise, a relative phase equal to $2 \times (N-1)d_2$ is given to the N-th chip pulse. Furthermore, the optical chip pulse time spreader 20 gives a relative phase equal to $2 \times (jN-3)d_2$ to the (jN−3)-th chip pulse, a relative phase equal to $2 \times (jN-2)d_2$ to the (jN−2)-th chip pulse, and a relative phase equal to $2 \times (jN-1)d_2$ to the (jN−1)-th chip pulse.

The n-th optical pulse time spreader 20 spreads an optical pulse 36 in time into a chip pulse train 36 in which the first to jN-th chip pulses are sequentially arranged on the time axis. An n-th optical circulator 22 then outputs the chip pulse train 36 as an optical pulse 38. The optical chip pulse time spreader 20 gives a relative phase equal to zero to the first chip pulse in the chip pulse train 30. The optical chip pulse time spreader 20 also gives a relative phase equal to $2 \times d_n (=2\pi\{a+(n-1)/N\})$ to the second chip pulse. Likewise, a relative phase equal to $2 \times (N-1)d_n (=2\pi\{a+(n-1)/N\} \times (N-1))$ is given to the N-th chip pulse. Furthermore, the optical chip pulse time spreader 20 gives a relative phase equal to $2 \times (jN-3) d_n$ to the (jN−3)-th chip pulse, a relative phase equal to $2 \times (jN-2)d_n$ to the (jN−2)-th chip pulse, and a relative phase equal to $2 \times (jN-1)d_n$ to the (jN−1)-th chip pulse.

The s-th optical pulse time spreader 20 spreads an optical pulse 42 in time into a chip pulse train 42 in which the first to jN-th chip pulses are sequentially arranged on the time axis. An s-th optical circulator 22 then outputs the chip pulse train 42 as an optical pulse 44. The optical chip pulse time spreader 20 gives a relative phase equal to zero to the first chip pulse in the chip pulse train 30. The optical chip pulse time spreader 20 also gives a relative phase equal to $2 \times d_s (=2\pi\{a+(s-1)/N\})$ to the second chip pulse. Likewise, a relative phase equal to $2 \times (N-1)d_s = (2\pi\{a+(s-1)/N\} \times (N-1))$ is given to the N-th chip pulse. Furthermore, the optical chip pulse time spreader 20 gives a relative phase equal to $2 \times (jN-3)d_s$ to the (jN−3)-th chip pulse, a relative phase equal to $2 \times (jN-2)d_s$ to the (jN−2)-th chip pulse, and a relative phase equal to $2 \times (jN-1)d_s$ to the (jN−1)-th chip pulse.

In the instant alternative embodiment, each of the first to s-th optical pulse time spreaders 20 comprises unit FBGs for generating a first chip pulse group obtained by setting the parameter j to 1, a second chip pulse group by setting the parameter j to 2 and j-th chip pulse group by setting the parameter j to j. Here, the first chip pulse group is a group of the first to N-th chip pulses. Moreover, the second chip pulse group is a group of the (N+1)-th to 2N-th chip pulses and the j-th chip pulse group is a group of the ((j−2)N+1)-th to jN-th chip pulses.

Reflectivities $R_1$ to $R_{jN}$ of the first to jN-th unit FBGs included in each of the first to s-th optical pulse time spreaders are defined as follows. When the parameter jN is an odd number, the reflectivities in the unit FBGs monotonically increase in the order of reflectivity $R_1$ to reflectivity $R_{\{(1/2)(jN+1)\}}$ while monotonically decreasing in the order of reflectivity $R_{\{(1/2)(jN+1)\}}$ to reflectivity $R_{jN}$. Furthermore, when the parameter jN is an even number, the reflectivities in the unit FBGs monotonically increase in the order of reflectivity $R_1$ to reflectivity $R_{jN/2}$ and monotonically decrease in the order of reflectivity $R_{\{(jN/2)+1\}}$ to reflectivity $R_{jN}$ to thereby equalize the degrees of the reflectivity $R_{jN/2}$ with that of the reflectivity $R_{\{(jN/2)+1\}}$.

In the following, a description will be made on the principle of the optical pulse time spreader 20 employing a set of the SSFBGs 46 and 56 which have the same refractive index modulation structures for generating a train of chip pulses and restoring the optical pulse from the train of chip pulses. The SSFBG 46 works as a chip pulse converter while the SSFBG 56 works as an optical pulse restoring device. In addition to the identical refractive index modulation structures, the input/output ends of the SSFBGs 46 and 56 shown in FIG. 14 have the same codes. If the SSFBGs 46 and 56 have the parameters N=4 and j=2, the number of unit FBGs serving as phase controllers in each SSFBG is eight. However, the principle of generating the train of chip pulses and restoring the optical pulse are the same as above regardless of the number of chip pulses.

In the optical pulse time spreader 20, each of the first to eighth unit FBGs has its reflectivity defined so as to satisfy the conditions $R_1 < R_2 < R_3 < R_4$ and $R_4 = R_5, R_5 > R_6 > R_7 > R_8$.

The instant alternative embodiment is directed to the case that the transmitting end optical pulse time spreader 20 has the parameters n=1, N=4, a=0.25 and j=2. Here, the parameter j is the number of chip pulse groups. The SSFBG 46 is provided with eight unit FBGs 48, 50, 52, 54, 48, 50, 52 and 54 arranged in the wave-propagating direction of the optical fiber. According to the aforementioned arrangement of the unit FBGs, the SSFBG 46 of the optical pulse time spreader generates eight chip pulses on the time axis by repeating modulation patterns 70, 72, 74 and 76 of chip pulse groups twice.

The minimum unit of relative phase in the transmitting end optical pulse time spreader 20 is a+(n−1)/N=0.25+(1−1)/4=0.25. Thus, the sequence of relative phase values (0, 0.25, 0.5, 0.75) set in the unit FBGs included in the SSFBG 46 of the transmitting end optical pulse time spreader 20 is given to the first chip pulse group. The successive second chip pulse group is also given with the values (0, 0.25, 0.5, 0.75). Consequently, the relative phases of the transmitting end in optical pulse time spreader 20 becomes (0, 0.25, 0.5, 0.75, 0, 0.25, 0.5, 0.75).

Furthermore, the SSFBG 56 in the receiving end optical pulse time spreader 20 has the parameters n=2, N=4, a=0.25 and j=2. The SSFBG 56 is provided with eight unit FBGs 58, 60, 62, 64, 58, 60, 62 and 64 arranged in the wave-propagating direction of the optical fiber. According to the aforementioned arrangement of the unit FBGs, the SSFBG 56 of the optical pulse time spreader generates eight chip pulses on the time axis by repeating modulation patterns 78, 80, 82 and 84 of chip pulse groups twice. The minimum unit of relative phases in the receiving end optical pulse time spreader 20 is a+(2−1)/N=0.25+(2−1)/4=0.5. Thus, the sequence of relative phase values (0, 0.5, 0, 0.5) set in the unit FBGs included in the SSFBG 56 of the receiving end optical pulse time spreader 20 is given to the first chip pulse group. The successive second chip pulse group is also given with the values (0, 0.5, 0, 0.5). Consequently, the relative phases of the receiving end in optical pulse time spreader 20 becomes (0, 0.5, 0, 0.5, 0, 0.5, 0, 0.5).

Next, a process of forming an autocorrelation wave will be described with reference to FIGS. 15A and 15B, in which process an encoder encodes an optical pulse 66 as a chip pulse train and a decoder decodes the chip pulse train to form the autocorrelation wave. The SSFBG 46 uses eight unit FBGs to produce the chip pulse train by spreading the optical pulse in time into Bragg-reflected light 70, 72, 74, 76, 70, 72, 74 and 76.

As indicated in FIG. 14 above the optical fiber 86 that connects the transmitting and receiving optical pulse time spreaders 20, the optical circulator 22 on the transmitting end outputs the train of chip pulses 70, 72, 74, 76, 70, 72, 74 and 76, i.e. eight time-spread optical pulses. The phase difference between adjacent ones of the reflected light 70, 72, 74, 76, 70, 72, 74 and 76 is equal to 0.25.

The receiving end optical circulator 22 supplies a chip pulse train 86 to the SSFBG 56 of the decoder. The SSFBG 56 is provided with eight unit FGBs identical to those of the SSFBG 46, the unit FBGs being arranged in sequence from the side of the input/output end. The SSFBG 56 uses eight unit FBGs as shown in FIG. 15A to reflect the chip pulse train 86 to produce a train of chip pulses 78, 80, 82, 84, 78, 80, 82 and

84. FIGS. 15A and 15B show the temporal waveforms along the horizontal axis denoting the progress of time as time points T1 to T15 for descriptive purpose. A time point having a smaller value represents more prior time.

The chip pulse train entering the decoder SSFBG 56 is firstly reflected by the unit FBG 58. The light reflected by the unit FBG 58 is indicated with Bragg-reflected light 78. Similarly, the light reflected by the unit FBGs 60, 62, 64, 58, 60, 62 and 64 is indicated with Bragg-reflected light 80, 82, 84, 78, 80, 82 and 84.

Figure 15A:
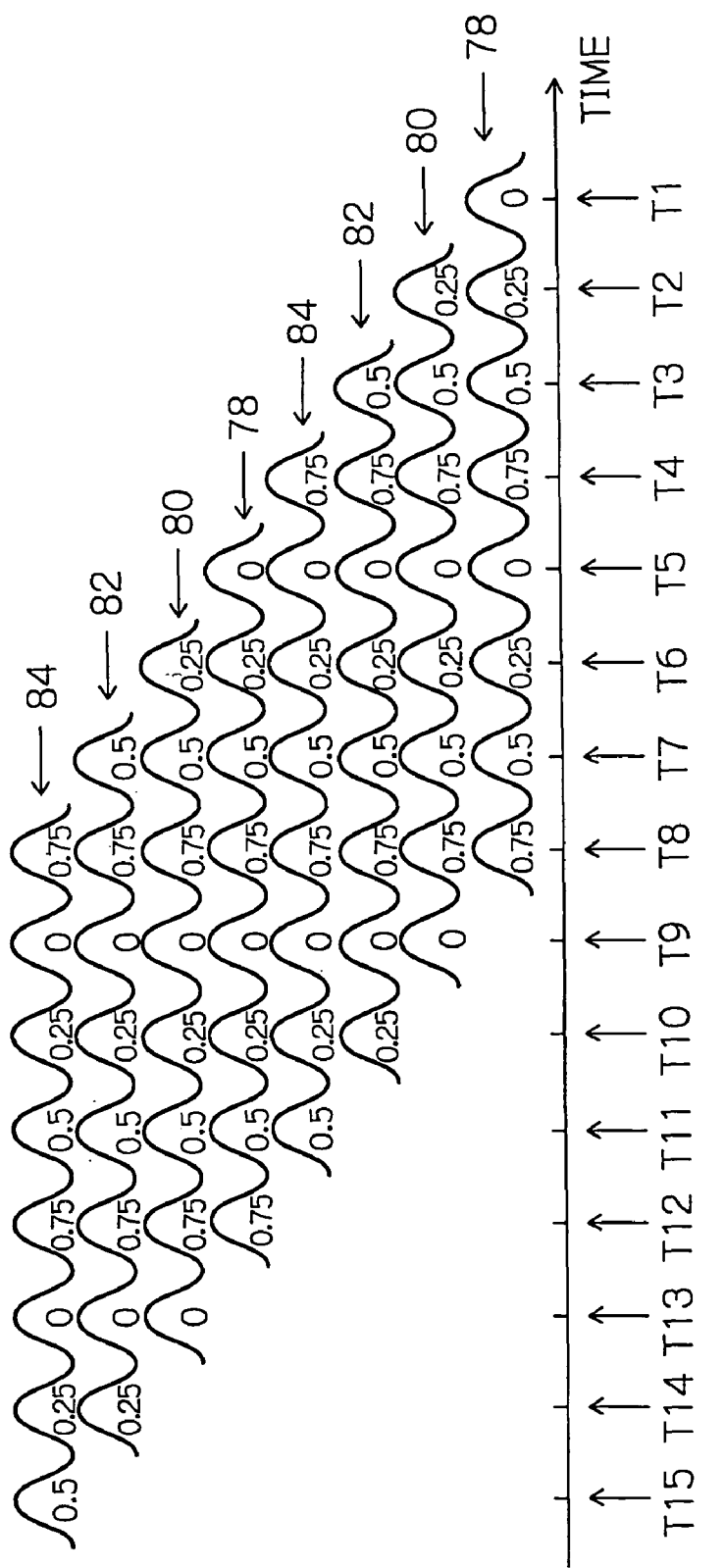
FIG. 15A shows the temporal waveforms of chip pulses reflected by eight unit FBGs arranged on the receiving end SSFBG in FIG. 14.

The unit FBG 58 reflects a chip pulse train 86 to produce the chip pulse train 78 shown in FIG. 15A aligned on the time axis. The chip pulse train 78 reflected by the unit FBG 58 is an optical pulse having its peak at time T1. The chip pulse 80 reflected by the unit FBG 58 is an optical pulse having its peak at time T2. Likewise, the second chip pulse 84 reflected by the unit FBG 58 is an optical pulse having its peak at time T8.

The unit FBG 60 also reflects the optical pulses 70, 72, 74, 76, 70, 72, 74 and 76, which constitute a chip pulse train 80 aligned on the time axis in FIG. 15A. The reflected light 80 thus reflected by the unit FBG 60 becomes greater than the reflected light 78 by 0.25. Thus, in comparison with the chip pulse train 78 on the time axis, the relative phase of each chip pulse of the chip pulse train 80 on the time axis becomes larger by 0.25. That is, the relative phase of the chip pulse train 78 shifts from right to left as (0, 0.25, 0.5, 0.75, 0, 0.25, 0.5, 0.75), whereas the relative phase of the chip pulse train 80 is incremented from right to left by 0.25 so as to be (0.25, 0.5, 0.75, 0, 0.25, 0.5, 0.75, 0).

FIG. 15B illustrates the autocorrelation waveform of the input optical pulse restored by the SSFBG 56. The time axis in FIG. 15B conforms to that in FIG. 15A. Since the autocorrelation wave is formed from the reflected light 78, 80, 82, 84, 78, 80, 82 and 84 which are reflected by the unit FBGs of the SSFBG 56, the autocorrelation wave is the sum of the reflected light 78, 80, 82, 84, 78, 80, 82 and 84 shown in FIG. 15A. All optical pulses corresponding to the reflected light 78, 80, 82, 84, 78, 80, 82 and 84 are combined in phase, so that time T8 in FIG. 15B indicates the maximum peak of the autocorrelation wave.

As described, the autocorrelation wave is produced with 8-bit relative phases of (0, 0.25, 0.5, 0.75, 0, 0.25, 0.5, 0.75) in the alternative embodiment. However, it can be produced with any relative phases other than the above-mentioned one.

The autocorrelation wave shown in FIG. 15B has the same mechanism as the autocorrelation or cross-correlation wave described in relation to FIG. 8B or 9B, so that the description on the mechanism will be omitted here. By using the unit FBGs which have the same relative phases, the SSFBG 46 spreads an optical pulse into a chip pulse train and then sends out the chip pulse train to the SSFBG 56 to form an autocorrelation wave. In FIG. 15B, the magnitude of the amplitudes of the peak waveforms in this case comparing to that of the chip pulses is indicated by the numeric values in parentheses over the corresponding peak positions. The sum of the amplitudes of the peak waveforms sequentially added up from the peak waveform at time T1 to time T15 is 1+2+3+4+5+6+7+8+7+6+5+4+3+2+1=64. By converting the sum of the amplitudes into an energy equivalent, the energy of the sum of the peak waveforms is 4096 times, equal to $64^2$ times, as high as the energy of one chip pulse. That is, the gross energy of the autocorrelation wave is 4096 times as high as the energy of one chip pulse. In addition, the amplitude of the peak of the autocorrelation wave is eight times as large as that of one chip pulse, and therefore it becomes 64 times in terms of energy equivalent.

Figure 16:
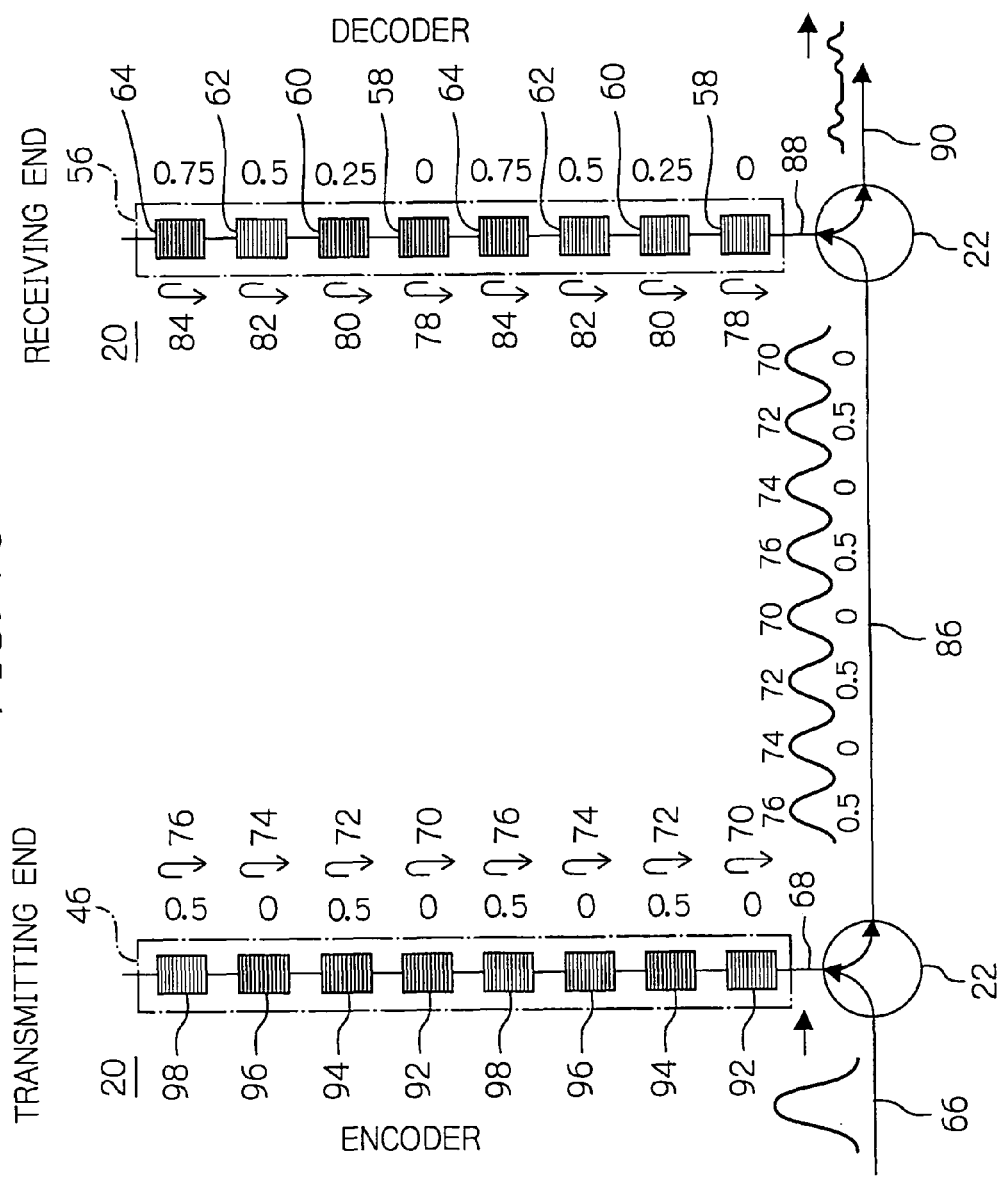
FIG. 16 shows the principle of generating a train of chip pulses and restoring an optical pulse from the chip pulses by the optical pulse time spreading apparatus using the SSFBGs having different codes, the SSFBGs being a set of the optical pulse time spreaders on the transmitting and receiving ends shown in FIG. 13.

Next, a description will be made on a case where the SSFBG 46 working as an encoder and the SSFBG 56 working as a decoder have different codes. The SSFBGs 46 and 56 in FIG. 16 have the same parameters, i.e. N=4 and j=2. In FIG. 16, the SSFBG 46 is provided with eight unit FBGs arranged in the wave-propagating direction of the optical fiber 16. The unit FBGs 92, 94, 96, 98, 92, 94, 96 and 98 included in the SSFBG 46 correspond to the first chip 70 to eighth chip 76 of the optical phase code, respectively.

When an optical pulse 68 enters the SSFBG 46, the unit FBGs 92, 94, 96, 98, 92, 94, 96 and 98 generate the Bragg-reflected light 70, 72, 74, 76, 70, 72, 74 and 76, respectively, and output the reflected light. Since the SSFBG 46 corresponds to the optical pulse time spreader 20, the relative phases of the reflected light 70, 72, 74, 76, 70, 72, 74 and 76 are 0, 0.5, 0, 0.5, 0, 0.5, 0 and 0.5, respectively. It can be expressed in a sequence of relative phase values as (0, 0.5, 0, 0.5, 0, 0.5, 0, 0.5). That is, when the SSFBG 46 has the parameters n=2, N=4 and a=0.25, the minimum unit of relative phase a+(n−1)/N is a+(n−1)/N=0.25+(2−1)/4=0.5. Thus, the sequence of relative phase values set in the unit FGBs is given in the sequence of (0, 0.5, 0, 0.5, 0, 0.5, 0, 0.5).

Correspondingly, as the SSFBG 56 corresponds to the optical pulse time spreader 20 having the aforementioned condition, the sequence of relative phase values of the reflected light 58, 60, 62, 64, 58, 60, 62 and 64 is (0, 0.25, 0.5, 0.75, 0, 0.25, 0.5, 0.75). More specifically, the SSFBG 56 corresponding to the optical pulse time spreader 20 also has the parameters of n=1, N=4 and a=0.5, and the minimum unit of relative phase a+(n−1)/N is a+(n−1)/N=0.25+(1−1)/4=0.25. Thus, the relative phase values set in eight unit FGBs included in the SSFBG 56 are given in the sequence of (0, 0.25, 0.5, 0.75, 0, 0.25, 0.5, 0.75).

Next, a description will be made on the process of forming a cross-correlation wave carried out by the SSFBG 56. In FIG. 16, eight optical pulses illustrated above the optical fiber transmission path 86 have the respective relative phases of (0, 0.5, 0, 0.5, 0, 0.5, 0, 0.5). That is, phase differences between the reflected light are 0.5. When the time-spread reflected light enters the SSFBG 56, the SSFBG 56 reflects the light to produce the chip pulse trains 78, 80, 82, 84, 78, 80, 82 and 84 having the temporal waveforms shown in FIG. 17A.

That is, the reflected light 78 is generated by the unit FBG 58 in the SSFBG 56. Likewise, the reflected light 80, 82, 84, 78, 80, 82 and 84 are produced by the unit FBGs 60, 62, 64 and second unit FBGs 58, 60, 62, 64, respectively.

Figure 17A:
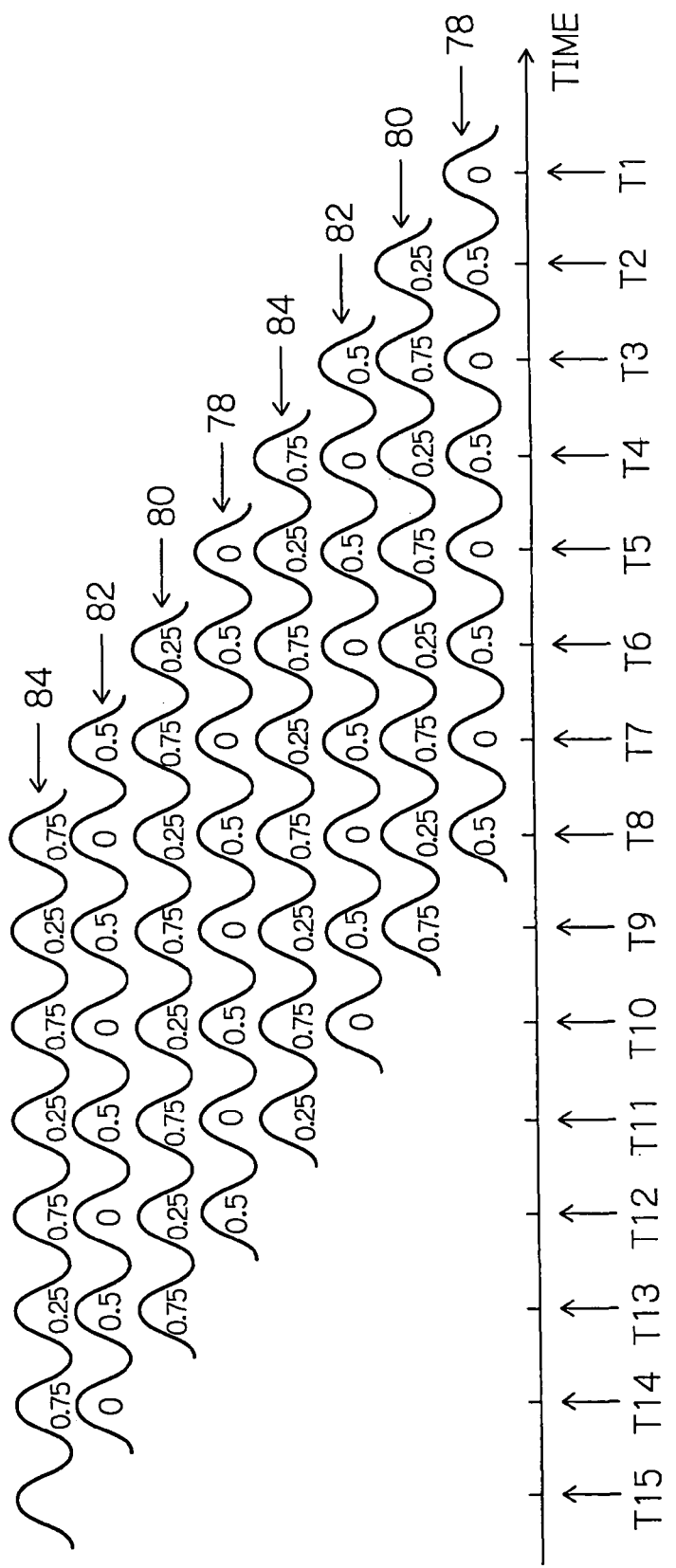
FIG. 17A shows the temporal waveforms of chip pulses reflected by eight unit FBGs arranged to the receiving end SSFBG in FIG. 16.

To be more precise, the chip pulses 78, 80, 82, 84, 78, 80, 82 and 84 contained in the chip pulse train are supplied to the optical pulse time spreader 20, which in turn reflects the pulses by the unit FBG 58 to produce a first chip pulse train 78 shown in FIG. 17A. The chip pulse 78 thus reflected by the unit FBG 58 of the optical pulse time spreader 20 is an optical pulse having its peak at time T1. Likewise, the chip pulse 80 reflected by the unit FBG 58 is an optical pulse having its peak at time T2. In the same way, the chip pulse 82 through the second chip pulse 84 have their peaks at times T3 through T8, respectively.

The unit FBG 60 also reflects the optical pulses 70, 72, 74, 76, 70, 72, 74 and 76, which constitute the first chip pulse train 80 aligned on the time axis in FIG. 17A. The reflected light 80 thus reflected by the unit FBG 60 becomes greater than the reflected light 78 by 0.25. Thus, in comparison with the chip pulse train 78 on the time axis, the relative phase of each chip pulse of the chip pulse train 80 is larger by 0.25. That is, the relative phase of the chip pulse train 78 shifts from right to left as (0, 0.5, 0, 0.5, 0, 0.5, 0, 0.5), whereas the relative phase of the chip pulse train 80 is incremented from right to left by 0.25 so as to be (0.25, 0.75, 0.25, 0.75, 0.25, 0.75, 0.25, 0.75).

Similarly, the relative phase of the chip pulse train 82 on the time axis is incremented the relative phase values (0.5, 0, 0.5, 0, 0.5, 0, 0.5, 0) by adding 0.5 to the relative phase values (0, 0.5, 0, 0.5, 0, 0.5, 0, 0.5) of the chip pulse train 78. The same is true of the chip pulse train 84 to the second chip pulse train 84 aligned on the time axis.

As shown in FIG. 17B, since the cross-correlation wave of the input optical pulse restored by the SSFBG 56 is formed from the reflected light 78, 80, 82, 84, 78, 80, 82 and 84 which are reflected by the unit FBGs, the cross-correlation wave is the sum of the reflected light 78, 80, 82, 84, 78, 80, 82 and 84 shown in FIG. 17A.

As the peak waveform at time T1 is formed from the rightmost chip pulse in the reflected light 78, the amplitude thereof is equal to that of one chip pulse. The peak waveform at time T2 is formed by adding the second right chip pulse in the reflected light 78 and the rightmost chip pulse in the reflected light 80. In this case, the phases of both chip pulses are 0.5 and 0.25, respectively. Thus, the amplitude of the peak waveform produced from the sum of these pulses is smaller than the amplitudes of two chip pulses. This is indicated with "<2" in FIG. 17B.

In FIG. 17B, the magnitude of the amplitudes of the peak waveforms comparing to the amplitudes of the chip pulses is indicated in the parentheses above the corresponding peak positions. The sum of the amplitudes of the peak waveforms sequentially added up from the peak waveforms at time T1 to time T15 is smaller than 1+2+1+0+1+2+1+0+1+2+1+0+1+2+1=16. By converting the sum of the amplitudes into an energy equivalent, it is 256 times, equal to $16^2$ times, smaller than the energy of one chip pulse. It means that the gross energy of the cross-correlation wave takes a value 256 times smaller than the energy of one chip pulse. Furthermore, the amplitude of the peak of the cross-correlation wave or of the peak value of the pulse is nearly twice as large as that of one chip pulse at the maximum, that is about four times as high as the energy of one chip pulse in terms of energy equivalent. In comparison with the aforementioned cross-correlation wave whose peak intensity is almost 64 times as high as that of one chip pulse, the peak intensity of the cross-correlation wave in this case is lower by a factor of 1/16.

Consequently, when an optical pulse is spread by the transmitting end optical pulse time spreader 20 and then decoded by the receiving end optical pulse time spreader 20, the energy of an autocorrelation wave becomes 4096 times as high as the energy of one chip pulse. In contrast to this, when the relative phases of the transmitting end optical pulse time spreader 20 differs from that of the receiving end time spreader 20, the energy of a cross-correlation wave is 256 times as high as the energy of one chip pulse. In other words, if an optical pulse is spread and decoded in the optical pulse time spreading apparatus 18 applying the latter condition, the energy of an autocorrelation wave becomes 16=4096/256 times as high as the energy of a cross-correlation wave.

It proves that the energy caused by the optical pulse time spreading apparatus 18 of the illustrative embodiment is larger than that by the optical pulse time spreading apparatus 18 of the previously described embodiments, and it is possible to achieve a large energy partition ratio in a component of autocorrelation wave in relation to a component of cross-correlation wave as well as peak intensity of the autocorrelation wave sufficiently larger than that of the cross-correlation wave.

The above evaluations of the magnitude of the energy of the autocorrelation and cross-correlation waves were made under the condition that all unit FBGs have the same reflectivity. As in the case of the aforementioned embodiment, the reflectivity modulation of each unit FBG further increases the energetic ratio (S/N ratio) between the energy of the autocorrelation and cross-correlation waves.

Figure 18:
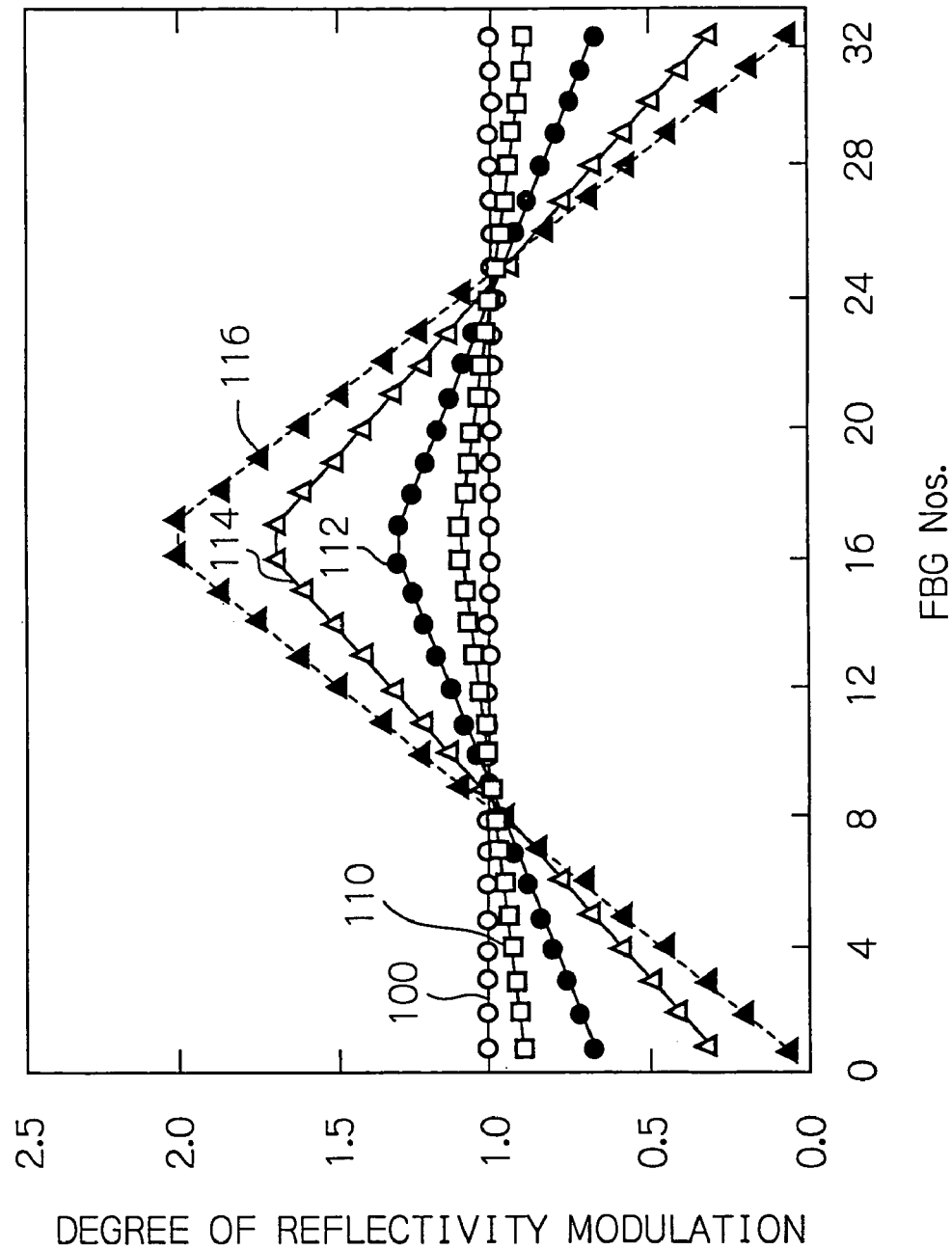
FIG. 18 plots the degrees of reflectivity modulation of the unit FBGs of optical pulse time spreaders used in the alternative embodiment of the optical pulse time spreading apparatus in accordance with the invention.

Next, a description will be made about the apodization of the reflectivities of the unit FBGs of the optical pulse time spreader in the optical pulse time spreading apparatus 18 in accordance with the illustrative embodiment by referring to FIGS. 18 and 19. In the optical pulse time spreading apparatus 18 of the illustrative embodiment, the set of sixteen unit FBGs contained in the optical pulse time spreader 20 in the previously described embodiment is doubled for two cycles. FIG. 18 shows the degrees of reflectivity modulation of the respective first to thirty-second unit FBGs. The horizontal axis in FIG. 18 indicates the FBG Nos. 1-32 that specify the first to thirty-second unit FBGs, and the vertical axis indicating the degrees of reflectivity modulation in an arbitrary scale.

In the instant alternative embodiment, the degree of reflectivity modulation is a relative value of Fresnel reflection defined due to a difference $\Delta n$ between the maximum and minimum values of the refractive index of the core of an optical fiber that is the base body of unit FBGs. When the first to thirty-second unit FGBs have an identical reflectivity, the degrees of reflectivity modulation are values denoted as relative values 1.0 of the reflectivity among the first to thirty-second unit FBGs in the case where the apodization is performed. It means that when the first to thirty-second unit FBGs, which are not apodized, have the same reflectivity, a difference value $\Delta n$ of a unit FBG whose degree of reflectivity modulation is smaller than 1.0 is set to be smaller than the difference value $\Delta n$ of each unit FBG. By contrast, under the condition that the first to thirty-second unit FBGs which are not apodized have the same reflectivity, a difference $\Delta n$ of a unit FBG whose degree of reflectivity modulation is larger than 1.0 is set to be larger than the difference value $\Delta n$ of each unit FBG.

As shown in FIG. 18, the reflectivities of the first to sixteenth unit FBGs are set to monotonically increase in a linear fashion in the order of the unit FBGs, and the reflectivities of the seventeenth to thirty-second unit FBGs monotonically decrease in a linear fashion in the order of the unit FBGs. FIG. 18 illustrates the intensity of the apodization, i.e. four types of differences in reflectivity between the unit FBGs having the maximum reflectivity and the unit FBGs having the minimum reflectivity as well as the reflectivities of the unit FBGs which are not apodized. In the figure, the reflectivity of each unit FBG, which constitutes an optical pulse time spreader on which the apodization is not carried out, is indicated with a modulation pattern 100 of white circle. The reflectivity of each unit FBG constituting the optical pulse time spreader is indicated, in descending order of the intensity of the apodization, with a modulation pattern 110 of white square, a modulation pattern 112 of black circle, a modulation pattern 114 of white triangle and a modulation pattern 116 of black triangle.

As in the case of the optical pulse timer spreading apparatus 18 described before, the reflectivity modulation of the unit FBGs of the optical pulse time spreader 20 which is not apodized is specified by the modulation pattern 100. In addition, FIG. 19 shows the modulation patterns 118, 120, 122 and 124 of the optical pulse time spreader that are indicative of the degrees of the apodization in descending order.

With regard to the case where a pulse signal is encoded and decoded by optical pulse time spreading apparatuses in which the degree of apodization differs from one another, a comparison is made between the power ratio of the autocorrelation wave and cross-correlation wave, i.e. S/N ratio. A simulation result of the comparison is shown in FIG. 19. FIG. 19 illustrates the power values of the autocorrelation wave/cross-correlation wave relative to the degree of apodization. In the figure, the horizontal axis indicates the modulation patterns 100 and 118 to 124, and the vertical axis indicates the power values of the autocorrelation wave/cross-correlation wave.

The cross-correlation wave power is based on that of the cross-correlation wave which is obtained by encoding the optical pulse signal by the transmitting end optical pulse time spreader 20 and decoding the resultant optical pulse signal 86 by the receiving end optical pulse time spreader shown in for example FIG. 14. The value of the autocorrelation wave power/cross-correlation wave power at the modulation pattern 100 in FIG. 19 is about 13. By contrast, all values at the modulation patterns 118 to 126 are larger than 13. It proves that the apodization of the difference value Δn of the unit FBGs in the optical pulse time spreader 20 enables to increase the value of the autocorrelation wave power/cross-correlation wave power. Moreover, although the value of the autocorrelation wave power/cross-correlation wave power at the modulation pattern 120 is the maximum value, it is difficult to generally define an optimum degree of apodization because such degree is dependent on, e.g. the number of unit FBGs or so. The degree of apodization should be determined on the basis of the number of unit FBGs or the like.

Figure 19:
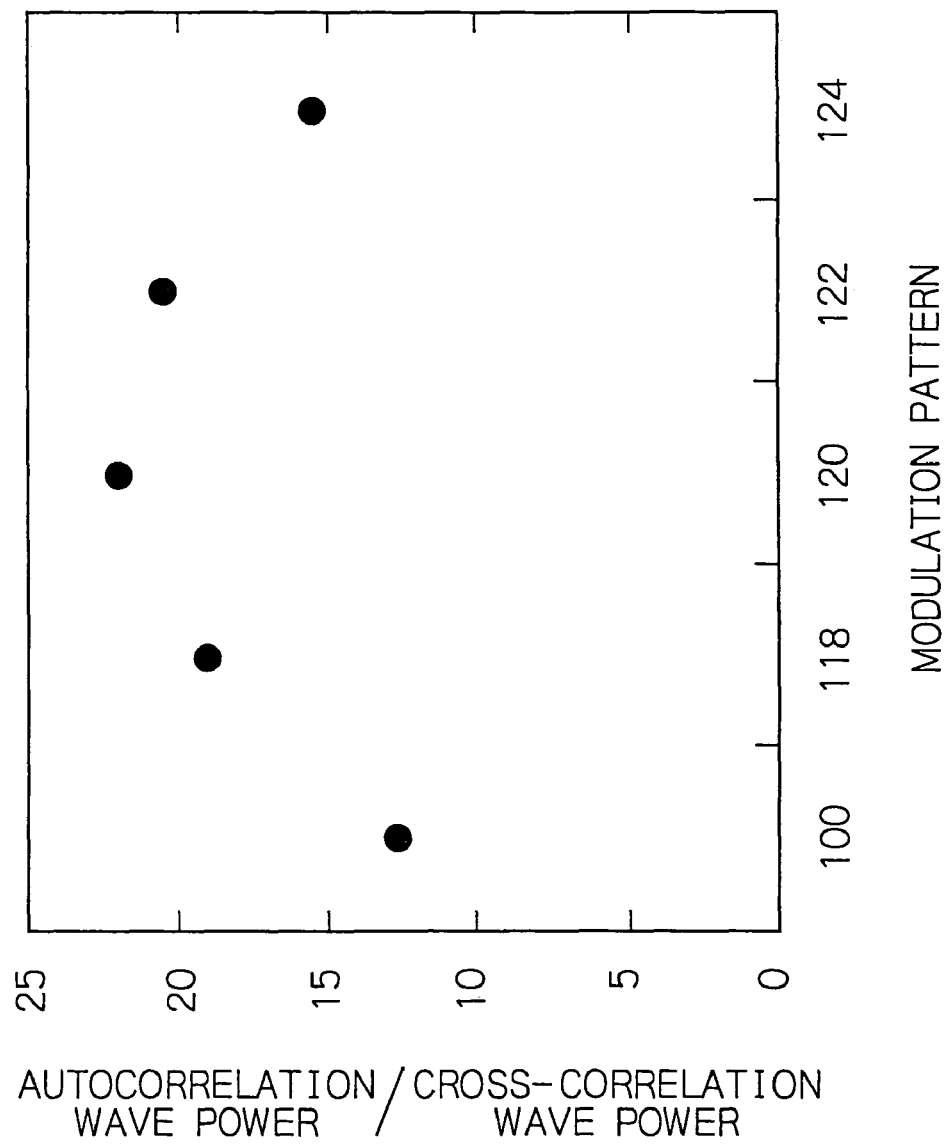
FIG. 19 plots the power values of autocorrelation wave/cross-correlation wave in relation to the degree of apodization to the unit FBGs of optical pulse time spreaders used in the optical pulse time spreading apparatus in accordance with the invention.

As described, the value of the cross-correlation wave power in FIG. 19 is based on the cross-correlation wave power obtained by encoding the optical pulse signal by the transmitting end optical pulse time spreader 20 and decoding the encoded signal 86 by the receiving end optical pulse time spreader 20 shown in FIG. 14. However, if the encoded signal is decoded at the receiving end by the eighth or twenty-fourth time spreader 20 that has the largest difference in the minimum relative phase given by {a+(n−1)/N} against the transmitting end optical pulse time spreader 20, it is possible to obtain a sufficiently large value of the autocorrelation wave power/cross-correlation wave power without performing the apodization. It is therefore advantageous to execute the apodization on the optical pulse time spreading apparatuses 18 to carry out the encoding and decoding in the optical pulse time spreaders that have a small difference in the minimum relative phases between them and cannot obtain a sufficiently large value of the autocorrelation/cross-correlation wave powers.

As is clear from FIG. 19, even in the case where the optical pulse signal is encoded by the transmitting end optical pulse time spreader 20 and the encoded optical pulse signal is decoded by the receiving end optical pulse time spreaders 20 having the small difference in the minimum relative phases, the value of the autocorrelation wave power/cross-correlation wave power can be nearly 1.8 times larger. This is because, in comparison with the autocorrelation wave power/cross-correlation wave power at the modulation pattern 100 whose value is about 13, the value of that at the modulation pattern 122 is about 23, i.e. it is based on the ratio 13/23.

In this way, according to the optical pulse time spreading apparatus 18 having the constituent elements shown in FIG. 14 in which the apodization is performed on the difference Δn between the unit FBGs in the optical pulse time spreader 20, an energy partition ratio of the component of autocorrelation wave to that of cross-correlation wave can be made large, and the peak intensity of the autocorrelation wave can also be larger enough than that of the cross-correlation wave.

Next, an embodiment of optical multiplex transmitting system in accordance with the present invention will be described in detail with reference to FIGS. 20 to 23. An optical multiplex transmitting system 130 is a system to which the above-described optical pulse time spreading apparatus 18 is applied. The optical multiplex transmitting system 130 is implemented by employing the optical pulse time spreading apparatus 18 as an encoder and a decoder.

Figure 20:
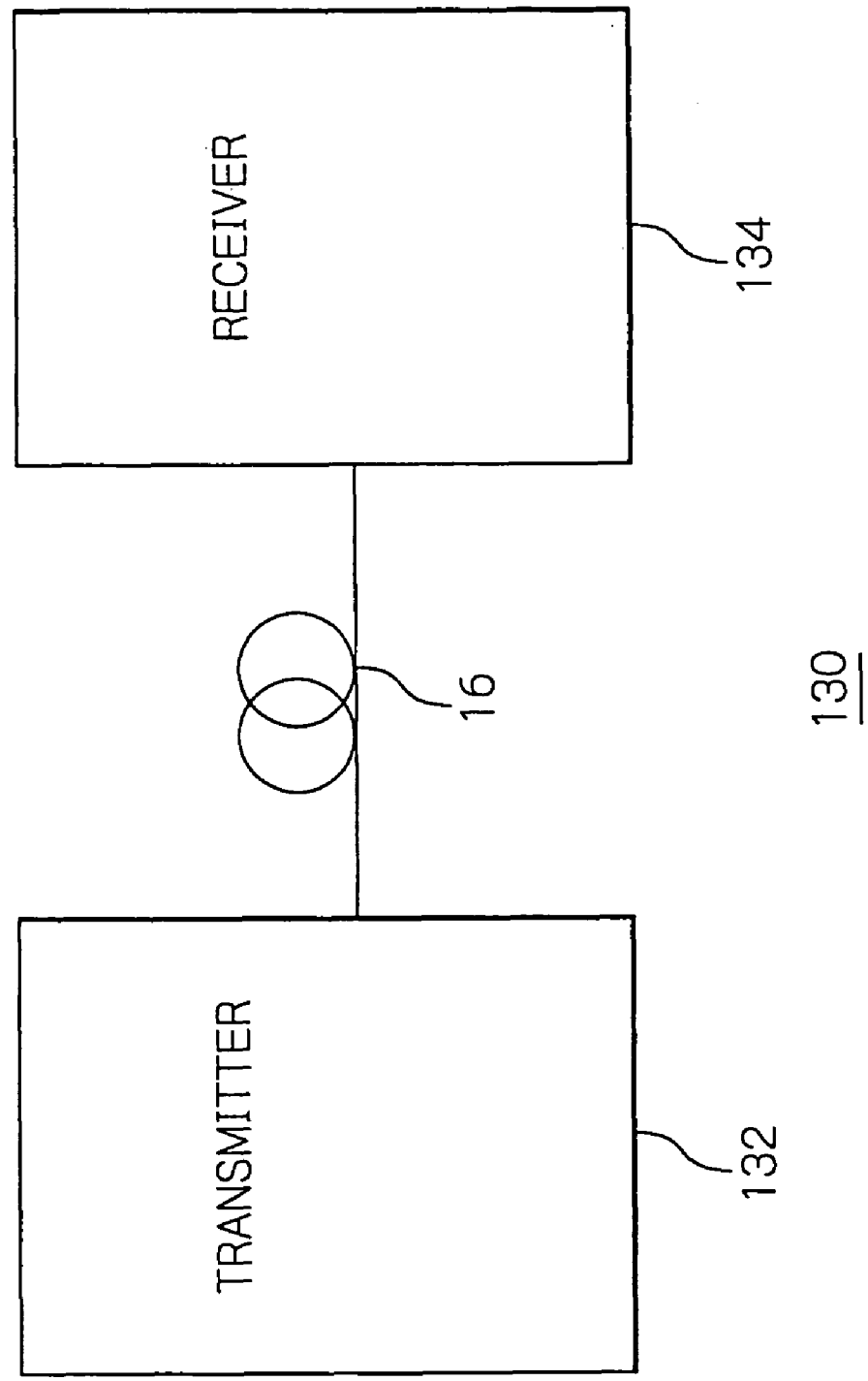
FIG. 20 schematically shows a connection condition between a transmitter and a receiver of an embodiment to which an optical multiplex transmitting system of the invention is applied.
Figure 21:
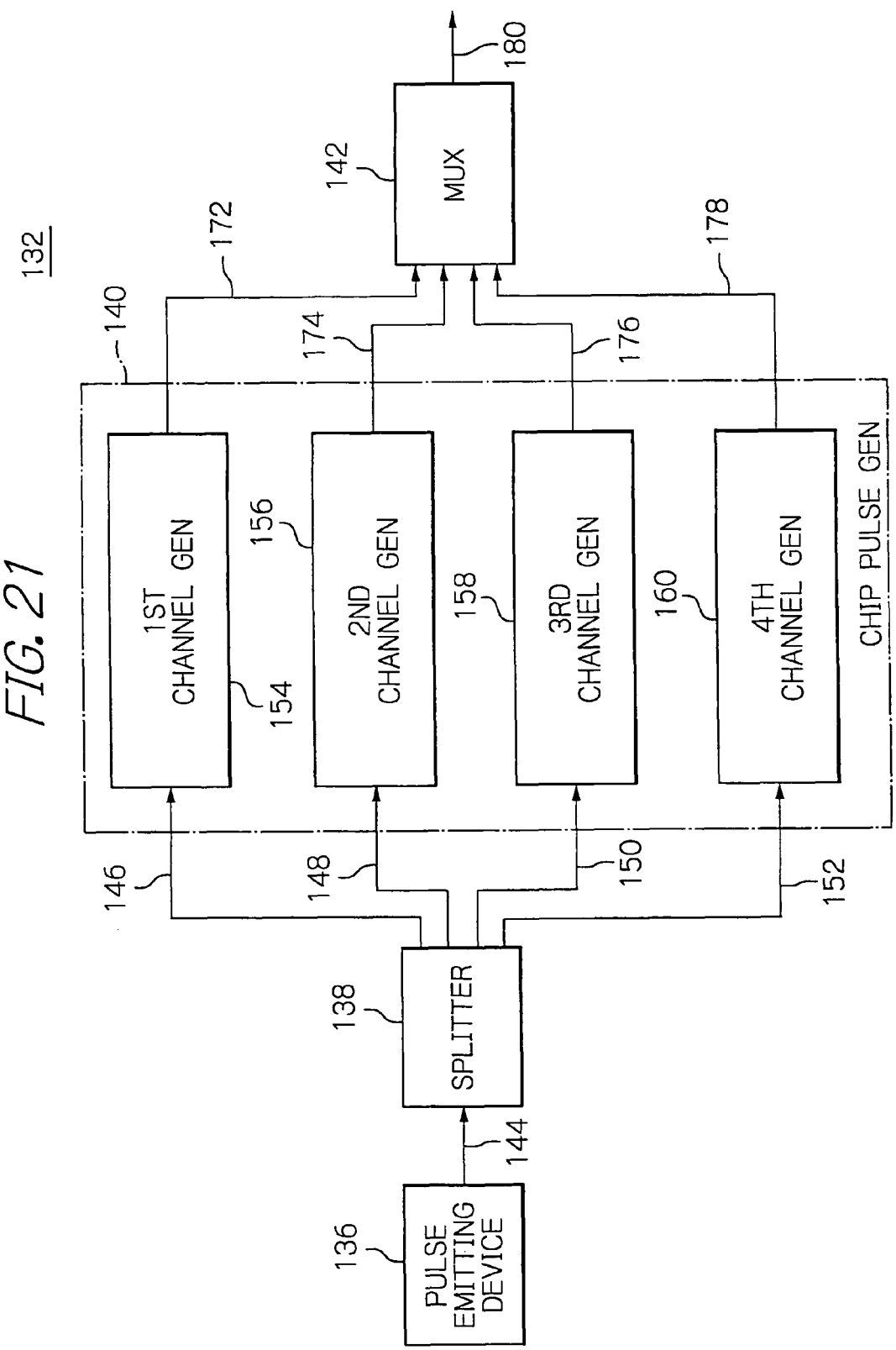
FIG. 21 is a schematic block diagram of the transmitter shown in FIG. 20.

The optical multiplex transmitting system 130 comprises as shown in FIG. 20 a transmitter 132 and a receiver 134. The transmitter 132 and the receiver 134 are interconnected by the optical fiber 16. The transmitter 132 comprises as shown in FIG. 21 a pulse emitting device 136, a splitter 138, a chip pulse generator 140 and a multiplexer 142, which are connected to one another as illustrated.

The pulse emitting device 136 is adapted to generate and supply an optical pulse to be output by the transmitter 132. The pulse emitting device 136 may preferably be implemented by, for example, a distributed feed-back laser diode (DFB-LD). The pulse emitting device 136 converts a continuous light wave fed by the DFB-LD into an optical pulse train 144 by an optical modulator, and then delivers the converted optical pulse train 144 over the optical fiber 16 to the splitter 138 connected to the optical fiber.

The splitter 138 is configured to split in intensity the light 144 coming out from the pulse emitting device 136 or pulse light source into the light beams of which the number is equal to that of channels specifically provided to distribute the split light beams to the respective channels. In this embodiment, the number of channels is four, so that the splitter 138 splits the light in intensity to output four optical pulse trains 146, 148, 150 and 152 to the chip pulse generator 140.

Figure 22:
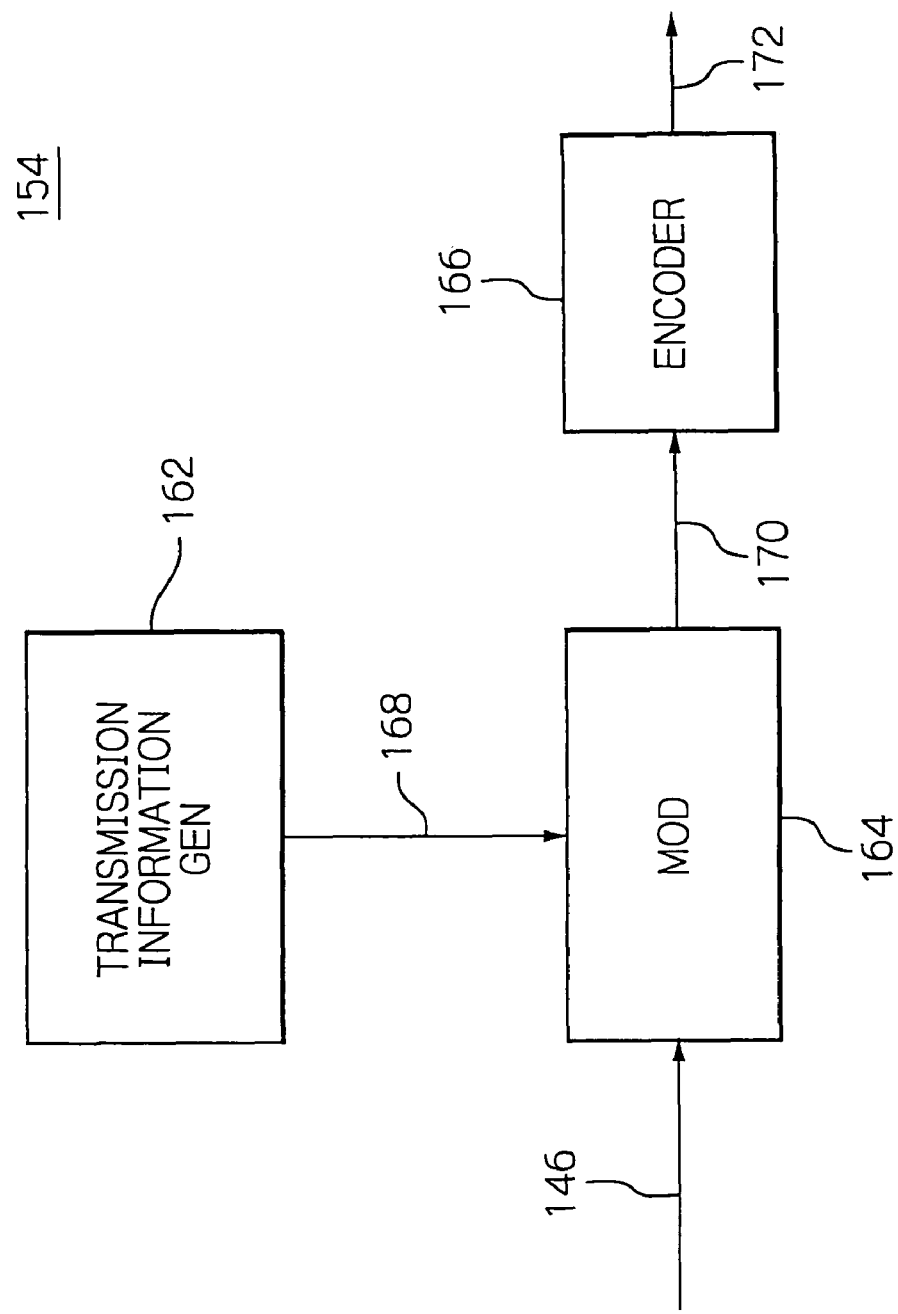
FIG. 22 is a schematic block diagram of a first channel generator shown in FIG. 21.

The chip pulse generator 140 is adapted for generating a chip pulse train on the respective channels. The chip pulse generator 140 comprises a first channel generator 154, a second channel generator 156, a third channel generator 158 and a fourth channel generator 160 in accordance with the number of channels in the illustrative embodiment. The first channel generator 154 to the fourth channel generator 160 may essentially include the same constituent elements. The constituent elements for implementing the above-mentioned functions will accordingly be described below by taking the first channel generator 154 as an example. As shown in FIG. 22, the first channel generator 154 comprises a transmission information generator 162, a modulator (MOD) 164 and an encoder 166.

The transmission information generator 162 is adapted to generate an electric pulse signal carrying transmission information. The transmission information generator 162 supplies the modulator 164 with a binary digital signal 168 reflecting transmission information allotted to the channels. The modulator 164 is adapted to modulate the supplied optical pulse train with the information signal. The modulator 164 intensity-modulates the optical pulse 146 into the pulse 146 of RZ (Return to Zero) format that reflects the binary digital signal 168. The modulator 164 then outputs a resultant optical pulse signal 170 to the encoder 166.

The encoder 166 is designed to spread the received optical pulse signal in time to produce a train of chip pulses. A channel identifier parameter is indicated by the value of a number n. The encoder 166 is the optical pulse time spreader 20 consisting of an SSFBG in which the channel identifier parameter n is set to value 1. The encoder 166 feeds the time-spread chip pulse train 172 to the multiplexer 142.

The first to fourth channel generator 154, 156, 158 and 160 differ from each other in the channel identifier parameter n set in the respective encoders. The channel identifier parameter n varies from channel to channel. For instance, the first to fourth channels are given the parameters n=s=1 to n=s=4, respectively. As the encoders, the optical pulse time spreaders 20 of SSFBGs in which the channel identifier parameters n=2, n=3 and n=4 are set, respectively.

With reference to FIG. 20 again, the second channel generator 156, third channel generator 158 and fourth channel generator 160 also supply the multiplexer 142 with chip pulse trains 174, 176 and 178, respectively, that are independent of one another on the respective generated channels. The multiplexer 142 is configured to multiplex all chip pulse trains on the channels. The multiplexer 142 thus multiplexes the chip pulse trains 172, 174, 176 and 178 to thereby supply a resultant multiplexed optical pulse signal 180 to the optical fiber 16.

Figure 23:
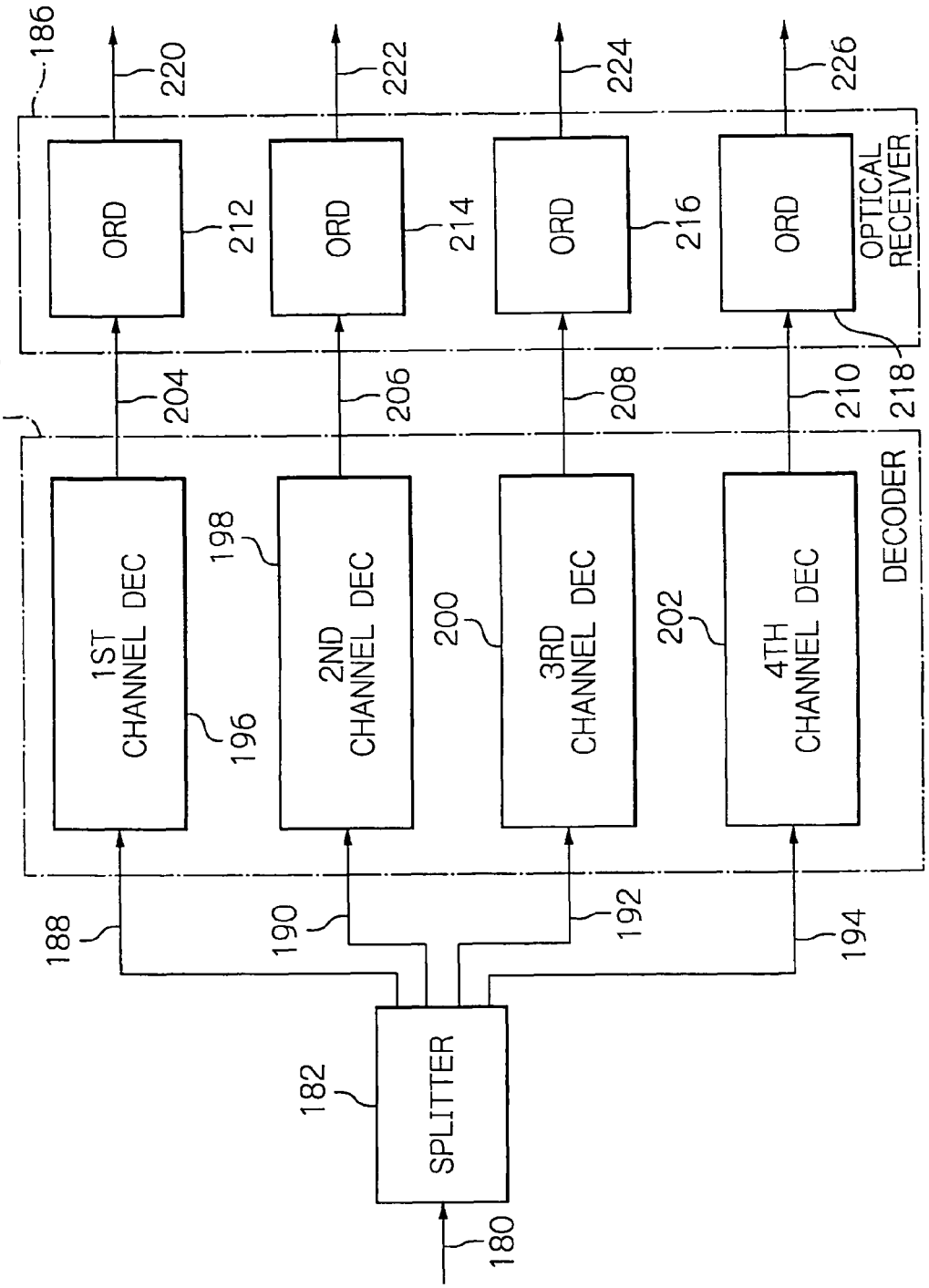
FIG. 23 is a schematic block diagram of the receiver shown in FIG. 20.

The receiver 134 comprises as shown in FIG. 23 a splitter 182, a decoder 184 and an optical receiver 186. The splitter 182 is adapted to split in intensity the multiplexed optical pulse signal 180 into light beams of which the number is equal to that of the channels specifically provided. The splitter 182 then outputs the divided multiplexed optical pulse trains 188, 190, 192 and 194 to the decoder 184.

The decoder 184 is adapted for decoding the multiplexed chip pulse trains channel by channel to reproduce an optical pulse signal. The decoder 184 comprises a first to a fourth channel decoding device 196, 198, 200 and 202. As the first to fourth channel decoding devices 196 to 202, the optical pulse time spreaders 20 on the receiving end are employed. The first to fourth channels correspond to the first to fourth optical pulse time spreaders 20, respectively, which are shown in FIGS. 7 and 13.

By taking the first channel decoding device 196 as an example, further functions of the decoding device will be described. As the first channel decoding device 196, used is the optical pulse time spreader 20 with the SSFBG in which the channel identifier parameter n is set to value 1. The first channel decoding device 196 has the structure in which the relative phase is identical with that in the encoder 166. The first channel decoding device 196 decodes the optical pulse signal 188, which is split in intensity and encoded, to generate a reproduced optical pulse signal 204 that includes the component of autocorrelation wave of the optical pulse signal of the first channel as well as the components of cross-correlation waves of the optical pulse signals of the second to fourth channels.

The first to fourth channel decoding devices 196, 198, 200 and 202 decode channel by channel the supplied multiplexed chip pulse trains 188, 190, 192 and 194, respectively, to thereby, reproduce optical pulse signals of first to fourth channels 204, 206, 208 and 210, respectively, and supply the signals to the optical receiver 186. The optical receiver 186 also comprises optical receiving devices 212, 214, 216 and 218 depending on the number of channels.

The optical receiving device (ORD) 212 executes an optical-to-electrical (O/E) conversion on the component of the autocorrelation wave of the reproduced first channel optical pulse signal 204 into an electric signal to produce and output a first channel received signal 220. The waveform of the received signal 220 presents a signal reflecting electric pulse signal 168 output from the transmission information generator 162 included in the first channel generator 154 of the transmitter 132. In this way, the electric pulse signal 166 to be transmitted on the first channel is received by the receiver 134 as the first channel received signal 220.

The second to fourth channel decoding devices 198, 200 and 202 in the receiver 134 also reproduce the autocorrelation waves from the corresponding multiplexed chip pulse trains 190, 192 and 194 as with the first channel decoding device 196. The process of producing electric pulse signals delivered on the respective channels based on the autocorrelation waves is similar to that in the case of the optical receiving device 212, and therefore a further description about it will be omitted. The optical receiving devices (ORD) 214, 216 and 218 perform the O/E conversion to generate and output the second to fourth channel received signals 222 to 226, respectively.

In this way, the optical multiplex transmitting system 130 is effective in improving the reduction of the S/N ratio otherwise caused by the increase in number of channels.

The optical multiplex transmitting system 130 of the illustrative embodiment presents a specific channel configuration, but the invention is not specifically limited to it. Alternatively, the configuration may include any number of channels.

The entire disclosure of Japanese patent application No. 2008-245380 filed on Sep. 25, 2008, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An optical pulse time spreading apparatus comprising a plurality (s) of optical pulse time spreaders for spreading input optical pulses in time and outputting the optical pulses as a train of chip pulses having a plurality (N) of chip pulses sequentially arranged on a time axis, where N is a parameter of a natural number more than two and s is a parameter of a natural number not exceeding N, wherein with use of a parameter n of a natural number ranging from unity to s, inclusive, each of said n optical pulse time spreaders comprises N phase controllers for controlling phases, said N phase controllers producing a train of chip pulses in which first to N-th chip pulses are arranged on a time axis in sequence, with use of a parameter a of a predetermined real number not less than zero but below unity, the chip pulses being arranged such that a phase difference equal to $2\pi\{a+(n-1)/N\}$ is given between adjacent ones on the time axis of the first to N-th chip pulses, if the parameter N is an odd number, the first to $\{(1/2)(N+1)\}$-th phase controllers being configured to monotonically increase a reflectivity of the optical pulse in numeric order of said phase controllers while the $\{(1/2)(N+1)\}$-th to N-th phase controllers are configured to monotonically decrease the reflectivity of the optical pulse in numeric order of said phase controllers, or if the parameter N is an even number, the first to (N/2)-th phase controllers being configured to monotonically increase the reflectivity of the optical pulse in numeric order of said phase controllers while the $\{(N/2)+1\}$-th to N-th phase controllers are configured to monotonically decrease the reflectivity of the optical pulse in numeric order of said phase controllers, the reflectivities of the optical pulse in said (N/2)-th and $\{(N/2)+1\}$-th phase controllers being equally defined.

2. An optical multiplex transmitting system, to which an optical pulse time spreading apparatus is applied which comprises a plurality (s) of optical pulse time spreaders for spreading input optical pulses in time and outputting the optical pulses as a train of chip pulses having a plurality (N) of chip pulses sequentially arranged on a time axis, where N is a parameter of a natural number more than two and s is a parameter of a natural number not exceeding N, wherein with use of a parameter n of a natural number ranging from 1 to s, inclusive, each of said n optical pulse time spreaders comprises N phase controllers for controlling phases, said N phase controllers producing a train of chip pulses in which first to N-th chip pulses are arranged on a time axis in sequence, with use of a parameter a of a predetermined real number not less than 0 but below 1, the chip pulses being arranged such that a phase difference equal to $2\pi\{a+(n-1)/N\}$ is given between adjacent ones on the time axis of the first to N-th chip pulses, if the parameter N is an odd number, the first to $\{(\frac{1}{2})(N+1)\}$-th phase controllers being configured to monotonically increase a reflectivity of the optical pulse in numeric order of said phase controllers while the $\{(\frac{1}{2})(N+1)\}$-th to N-th phase controllers are configured to monotonically decrease the reflectivity of the optical pulse in numeric order of said phase controllers, or if the parameter N is an even number, the first to (N/2)-th phase controllers being configured to monotonically increase the reflectivity of the optical pulse in numeric order of said phase controllers while the $\{(N/2)+1\}$-th to N-th phase controllers are configured to monotonically decrease the reflectivity of the optical pulse in numeric order of said phase controllers, the reflectivities of the optical pulse in said (N/2)-th and $\{(N/2)+1\}$-th phase controllers being equally defined, wherein said optical pulse time spreaders in said apparatus are arranged to an encoder of a transmitter and a decoder of a receiver, first to n-th channels used for transmission, and reception corresponding to said first to n-th optical pulse time spreaders, respectively, said encoder in said transmitter encoding optical pulse signals delivered on the first to n-th channels to generate encoded optical pulse signals, and then multiplexing the encoded optical pulse signals of the first to n-th channels to generate a multiplex optical pulse signal, said decoder in said receiver decoding the multiplex optical pulse signal channel by channel to reproduce optical pulse signals for the first to n-th channels.

3. An optical pulse time spreading apparatus comprising:

a plurality (s) of optical pulse time spreaders for spreading input optical pulses in time and outputting the optical pulses as a train of chip pulses having a plurality (N) of chip pulses sequentially arranged on a time axis, where N is a parameter of a natural number more than two and s is a parameter of a natural number not exceeding N; and with use of a parameter n of a natural number ranging from unity to s, inclusive, N unit diffraction gratings for diffracting the optical pulses passing through optical waveguides connected to said n optical pulse time spreaders, wherein said N unit diffraction gratings diffracting the optical pulses to produce a train of chip pulses in which first to N-th chip pulses are arranged on a time axis, with use of a parameter a of a predetermined real number not less than zero but below unity, the chip pulses being arranged serially in a direction of said optical waveguide in numeric order of the first to N-th unit diffraction gratings in such a manner that a phase difference equal to $2\pi\{a+(n-1)/N\}$ given between adjacent ones on the time axis of the first to N-th chip pulses, if the parameter N is an odd number, the first to $\{(\frac{1}{2})(N+1)\}$-th unit diffraction gratings being configured to monotonically increase a reflectivity of the optical pulse in numeric order of the unit diffraction gratings while the $\{(\frac{1}{2})(N+1)\}$-th to N-th unit diffraction gratings are configured to monotonically decrease the reflectivity of the optical pulse in numeric order of the unit diffraction gratings, or if the parameter N is an even number, the first to (N/2)-th unit diffraction gratings being configured to monotonically increase the reflectivity of the optical pulse in numeric order of said unit diffraction gratings while the $\{(N/2)+1\}$-th to N-th unit diffraction gratings are configured to monotonically decrease the reflectivity of the optical pulse in numeric order of said unit diffraction gratings, the reflectivities of the optical pulse in the (N/2)-th and $\{(N/2)+1\}$-th unit diffraction gratings being equally defined.

4. The apparatus in accordance with claim 3, wherein said optical waveguides are optical fibers.

5. An optical multiplex transmitting system, to which an optical pulse time spreading apparatus is applied which comprises a plurality (s) of optical pulse time spreaders for spreading input optical pulses in time and outputting the optical pulses as a train of chip pulses having a plurality (N) of chip pulses sequentially arranged on a time axis, where N is a parameter of a natural number more than two and s is a parameter of a natural number not exceeding N; and with use of a parameter n of a natural number ranging from unity to s, inclusive, N unit diffraction gratings for diffracting the optical pulses passing through optical waveguides connected to said n optical pulse time spreaders, wherein said N unit diffraction gratings diffracting the optical pulses to produce a train of chip pulses in which first to N-th chip pulses are arranged on a time axis, with use of a parameter a of a predetermined real number not less than zero but below unity, the chip pulses being arranged serially in a direction of said optical waveguide in numeric order of the first to N-th unit diffraction gratings in such a manner that a phase difference equal to $2\pi\{a+(n-1)/N\}$ given between adjacent ones on the time axis of the first to N-th chip pulses, if the parameter N is an odd number, the first to $\{(\frac{1}{2})(N+1)\}$-th unit diffraction gratings being configured to monotonically increase a reflectivity of the optical pulse in numeric order of the unit diffraction gratings while the $\{(\frac{1}{2})(N+1)\}$-th to N-th unit diffraction gratings are configured to monotonically decrease the reflectivity of the optical pulse in numeric order of the unit diffraction gratings, or if the parameter N is an even number, the first to (N/2)-th unit diffraction gratings being configured to monotonically increase the reflectivity of the optical pulse in numeric order of said unit diffraction gratings while the $\{(N/2)+1\}$-th to N-th unit diffraction gratings are configured to monotonically decrease the reflectivity of the optical pulse in numeric order of said unit diffraction gratings, the reflectivities of the optical pulse in the (N/2)-th and $\{(N/2)+1\}$-th unit diffraction gratings being equally defined, wherein said optical pulse time spreaders in said apparatus are arranged to an encoder of a transmitter and a decoder of a receiver, first to n-th channels used for transmission and reception corresponding to said first to n-th optical pulse time spreaders, respectively, said encoder in said transmitter encoding optical pulse signals delivered on the first to n-th channels to generate encoded optical pulse signals, and then multiplexing the encoded optical pulse signals of the first to n-th channels to generate a multiplex optical pulse signal, said decoder in said receiver decoding the multiplex optical pulse signal channel by channel to reproduce optical pulse signals for the first to n-th channels.

6. An optical pulse time spreading apparatus, comprising a plurality (s) of optical pulse time spreaders for spreading input optical pulses in time and outputting the spread optical pulses as a train of chip pulses having first to jN-th chip pulses sequentially arranged on a time axis, where N is a parameter of a natural number more than two, s is a parameter of a natural number not exceeding N and j is a parameter of a natural number more than unity, wherein with use of a parameter n of a natural number ranging from unity to s, inclusive, each of said n optical pulse time spreaders comprises first to jN-th phase controllers, the first to jN-th phase controllers producing first to jN-th chip pulses to be used for generating a train of chip pulses in which first to jN-th chip pulses are arranged on the time axis in sequence, and with use of a parameter a of a predetermined real number not less than zero but below unity, arranging the chip pulses such that a phase difference equal to $2\pi\{a+(n-1)/N\}$ is given between adjacent ones on the time axis of the first to jN-th chip pulses, if the parameter jN is an odd number, the first to $\{(½)(jN+1)\}$-th phase controllers being configured to monotonically increase a reflectivity of the optical pulse in numeric order of said phase controllers while the $\{(½)(jN+1)\}$-th to jN-th phase controllers are configured to monotonically decrease the reflectivity of the optical pulse in numeric order of said phase controllers, or if the parameter jN is an even number, the first to (jN/2)-th phase controllers being configured to monotonically increase the reflectivity of the optical pulse in numeric order of said phase controllers while the $\{(jN/2)+1\}$-th to jN-th phase controllers are configured to monotonically decrease the reflectivity of the optical pulse in numeric order of said phase controllers, the reflectivities of the optical pulse in the (jN/2)-th and $\{(jN/2)+1\}$-th phase controllers being equally defined.

7. An optical multiplex transmitting system, to which an optical pulse time spreading apparatus is applied which comprises a plurality (s) of optical pulse time spreaders for spreading input optical pulses in time and outputting the spread optical pulses as a train of chip pulses having first to jN-th chip pulses sequentially arranged on a time axis, where N is a parameter of a natural number more than two, s is a parameter of a natural number not exceeding N and j is a parameter of a natural number more than unity, wherein with use of a parameter n of a natural number ranging from unity to s, inclusive, each of said n optical pulse time spreaders comprises first to jN-th phase controllers, the first to jN-th phase controllers producing first to jN-th chip pulses to be used for generating a train of chip pulses in which first to jN-th chip pulses are arranged on the time axis in sequence, and with use of a parameter a of a predetermined real number not less than zero but below unity, arranging the chip pulses such that a phase difference equal to $2\pi\{a+(n-1)/N\}$ is given between adjacent ones on the time axis of the first to jN-th chip pulses, if the parameter jN is an odd number, the first to $\{(½)(jN+1)\}$-th phase controllers being configured to monotonically increase a reflectivity of the optical pulse in numeric order of said phase controllers while the $\{(½)(jN+1)\}$-th to jN-th phase controllers are configured to monotonically decrease the reflectivity of the optical pulse in numeric order of said phase controllers, or if the parameter jN is an even number, the first to (jN/2)-th phase controllers being configured to monotonically increase the reflectivity of the optical pulse in numeric order of said phase controllers while the $\{(jN/2)+1\}$-th to jN-th phase controllers are configured to monotonically decrease the reflectivity of the optical pulse in numeric order of said phase controllers, the reflectivities of the optical pulse in the (jN/2)-th and $\{(jN/2)+1\}$-th phase controllers being equally defined, wherein said optical pulse time spreaders in said apparatus are arranged to an encoder of a transmitter and a decoder of a receiver, first to n-th channels used for transmission and reception corresponding to said first to n-th optical pulse time spreaders, respectively, said encoder in said transmitter encoding optical pulse signals delivered on the first to n-th channels to generate encoded optical pulse signals, and then multiplexing the encoded optical pulse signals of the first to n-th channels to generate a multiplex optical pulse signal, said decoder in said receiver decoding the multiplex optical pulse signal channel by channel to reproduce optical pulse signals for the first to n-th channels.

8. An optical pulse time spreading apparatus, comprising a plurality (s) of optical pulse time spreaders for spreading input optical pulses in time and outputting the spread optical pulses as a train of chip pulses having first to jN-th chip pulses sequentially arranged on a time axis, where N is a parameter of a natural number more than two, s is a is a parameter of a natural number not exceeding N, and j is a parameter of a natural number more than unity, wherein with use of the parameter n of a natural number ranging from unity to s, inclusive, each of said n optical pulse time spreaders comprises first to jN-th unit diffraction gratings formed in optical waveguides, said first to jN-th unit diffraction gratings producing first to jN-th chip pulses to be used for generating a train of chip pulses in which first to jN-th chip pulses are arranged on the time axis in sequence, and with use of a parameter a of a predetermined real number not less than zero but below unity, arranging the chip pulses serially in a direction of said optical waveguide in numeric order of said first to jN-th unit diffraction gratings such that a phase difference equal to $2\pi\{a+(n-1)/N\}$ is given between adjacent ones on the time axis of the first to jN-th chip pulses, if the parameter jN is an odd number, the first to $\{(½)(jN+1)\}$-th unit diffraction gratings being configured to monotonically increase a reflectivity of the optical pulse in numeric order of said unit diffraction gratings while the $\{(½)(jN+1)\}$-th to jN-th unit diffraction gratings are configured to monotonically decrease the reflectivity of the optical pulse in numeric order of said unit diffraction gratings, or if the parameter jN is an even number, the first to (jN/2)-th unit diffraction gratings being configured to monotonically increase the reflectivity of the optical pulse in numeric order of said unit diffraction gratings while the $\{(jN/2)+1\}$-th to jN-th unit diffraction gratings are configured to monotonically decrease the reflectivity of the optical pulse in numeric order of said unit diffraction gratings, the reflectivitie of the optical pulse in said (jN/2)-th and {(jN/2)+1}-th unit diffraction gratings being equally defined.

9. The apparatus in accordance with claim 8, wherein said optical waveguides are optical fibers.

10. An optical multiplex transmitting system, to which an optical pulse time spreading apparatus is applied which comprises a plurality (s) of optical pulse time spreaders for spreading input optical pulses in time and outputting the spread optical pulses as a train of chip pulses having first to jN-th chip pulses sequentially arranged on a time axis, where N is a parameter of a natural number more than two, s is a is a parameter of a natural number not exceeding N, and j is a parameter of a natural number more than unity, wherein
with use of the parameter n of a natural number ranging from unity to s, inclusive, each of said n optical pulse time spreaders comprises first to jN-th unit diffraction gratings formed in optical waveguides,
said first to jN-th unit diffraction gratings producing first to jN-th chip pulses to be used for generating a train of chip pulses in which first to jN-th chip pulses are arranged on the time axis in sequence, and with use of a parameter a of a predetermined real number not less than zero but below unity, arranging the chip pulses serially in a direction of said optical waveguide in numeric order of said first to jN-th unit diffraction gratings such that a phase difference equal to $2\pi\{a+(n-1)/N\}$ is given between adjacent ones on the time axis of the first to jN-th chip pulses,
if the parameter jN is an odd number, the first to {(½)(jN+1)}-th unit diffraction gratings being configured to monotonically increase a reflectivity of the optical pulse in numeric order of said unit diffraction gratings while the {(½)(jN+1)}-th to jN-th unit diffraction gratings are configured to monotonically decrease the reflectivity of the optical pulse in numeric order of said unit diffraction gratings, or if the parameter jN is an even number, the first to (jN/2)-th unit diffraction gratings being configured to monotonically increase the reflectivity of the optical pulse in numeric order of said unit diffraction gratings while the {(jN/2)+1}-th to jN-th unit diffraction gratings are configured to monotonically decrease the reflectivity of the optical pulse in numeric order of said unit diffraction gratings,
the reflectivity of the optical pulse in said (jN/2)-th and {(jN/2)+1}-th unit diffraction gratings being equally defined, wherein
said optical pulse time spreaders in said apparatus are arranged to an encoder of a transmitter and a decoder of a receiver,
first to n-th channels used for transmission and reception corresponding to said first to n-th optical pulse time spreaders, respectively,
said encoder in said transmitter encoding optical pulse signals delivered on the first to n-th channels to generate encoded optical pulse signals, and then multiplexing the encoded optical pulse signals of the first to n-th channels to generate a multiplex optical pulse signal,
said decoder in said receiver decoding the multiplex optical pulse signal channel by channel to reproduce optical pulse signals for the first to n-th channels.

\* \* \* \* \*